US012617974B2

(12) United States Patent
Preuss et al.

(10) Patent No.: US 12,617,974 B2
(45) Date of Patent: May 5, 2026

(54) PARTABLE LAMINATE AND METHOD FOR PARTING LONG-TERM STRUCTURAL BONDS

(71) Applicant: tesa SE, Norderstedt (DE)

(72) Inventors: Philipp Preuss, Norderstedt (DE); Arne Koops, New-Lankau (DE)

(73) Assignee: TESA SE, Norderstedt (DE)

( * ) Notice: Subject to any disclaimer, the term of this patent is extended or adjusted under 35 U.S.C. 154(b) by 381 days.

(21) Appl. No.: 18/178,031

(22) Filed: Mar. 3, 2023

(65) Prior Publication Data

US 2023/0279270 A1 Sep. 7, 2023

(30) Foreign Application Priority Data

Mar. 4, 2022 (DE) .................... 10 2022 105 185.4

(51) Int. Cl.

| | |
|---|---|
| ***C09J 7/24*** | (2018.01) |
| ***C08K 3/04*** | (2006.01) |
| ***C08K 3/22*** | (2006.01) |
| ***C09J 7/25*** | (2018.01) |
| ***C09J 7/38*** | (2018.01) |

(52) U.S. Cl.

CPC . *C09J 7/24* (2018.01); *C09J 7/25* (2018.01); *C09J 7/385* (2018.01); *C08K 3/04* (2013.01); *C08K 2003/2241* (2013.01); *C09J 2301/1242* (2020.08)

(58) Field of Classification Search

None

See application file for complete search history.

(56) References Cited

U.S. PATENT DOCUMENTS

| | | | |
|---|---|---|---|
| 3,018,262 | A | 1/1962 | Schroeder |
| 3,117,099 | A | 1/1964 | Proops et al. |
| 3,635,870 | A | 1/1972 | Thoma et al. |
| 3,640,937 | A | 2/1972 | Thoma et al. |
| 3,640,967 | A | 2/1972 | König et al. |
| 3,658,746 | A | 4/1972 | Rosendabl et al. |
| 4,808,691 | A | 2/1989 | König et al. |
| 6,129,983 | A | 10/2000 | Schümann et al. |
| 6,908,772 | B2 | 6/2005 | Gnadinger |
| 7,438,963 | B2 | 10/2008 | Koops et al. |
| 10,907,076 | B2 | 2/2021 | Koops et al. |
| 11,535,778 | B2 | 12/2022 | Kupsky et al. |
| 2003/0113533 | A1 | 6/2003 | Husemann et al. |
| 2004/0209086 | A1 | 10/2004 | Koops et al. |
| 2023/0203351 | A1 | 6/2023 | Preuss et al. |

FOREIGN PATENT DOCUMENTS

| | | | | |
|---|---|---|---|---|
| DE | 15 70 540 | A1 | 3/1970 | |
| DE | 19 02 931 | A1 | 8/1970 | |
| DE | 19 18 504 | A1 | 10/1970 | |
| DE | 17 70 245 | A1 | 10/1971 | |
| DE | 17 70 591 | A1 | 11/1971 | |
| DE | 81 30 861 | A1 | 10/1981 | |
| DE | 37 17 060 | A1 | 12/1988 | |
| DE | 100 48 665 | A1 | 4/2002 | |
| DE | 101 42 638 | A1 | 5/2003 | |
| DE | 10 2005 061 125 | A1 | 6/2007 | |
| DE | 10 2020 209 557 | A1 | 2/2021 | |
| DE | 10 2021 200 580 | A1 | 5/2022 | |
| DE | 102021134447 | A1 | 6/2023 | |
| EP | 0 894 841 | B1 | 5/2003 | |
| EP | 1 308 492 | B1 | 9/2005 | |
| EP | 3 390 553 | A1 | 10/2018 | |
| EP | 1 550 156 | B1 | 12/2018 | |
| EP | 3 784 742 | A1 | 3/2020 | |
| JP | 2013126723 | A | 6/2013 | |
| WO | 2010/145945 | A1 | 12/2010 | |
| WO | 2013/127697 | A1 | 9/2013 | |
| WO | 2013/174650 | A1 | 11/2013 | |
| WO | 2015/014582 | A1 | 2/2015 | |
| WO | 2017/174303 | A1 | 10/2017 | |
| WO | WO-2023053538 | A1 * | 4/2023 | ............ H01L 21/30 |

OTHER PUBLICATIONS

Ueno et al., WO 2023053538, Apr. 6, 2023 (machine translation) (Year: 2023).*

Fox equation (E1) (cf. T.G. Fox, Bull. Am. Phys. Soc. 1 (1956) 123).

Polyvinylacetale—https://www.spektrum.de/lexikon/chemie/polyvinylacetale/7372 [recherchiert am Jul. 7, 2022].

* cited by examiner

*Primary Examiner* — Cheng Yuan Huang

(74) *Attorney, Agent, or Firm* — Norris McLaughlin, P.A.

(57) ABSTRACT

Laminates separated after long-term bonding and methods for separating laminates after long-term bonding is provided. The laminates comprise (a) a first adhesive layer, (b) a separation layer, and (c) a second adhesive layer, wherein the separation layer comprises a laser-sensitive pigment which at the same time is coloring, and so preferably a black coloration is produced, and consists of a cured coating material, preferably an electron beam-cured or UV-cured coating material, which is at least partly removable by laser irradiation. The first adhesive layer and/or the second adhesive layer may be laser beam-translucent or may comprise a reactive or latent-reactive adhesive.

18 Claims, 2 Drawing Sheets

PARTABLE LAMINATE AND METHOD FOR PARTING LONG-TERM STRUCTURAL BONDS

The present disclosure relates to a laminate designed and equipped to be separated after long-term bonding, comprising a first layer of adhesive, a separation layer, and a second layer of adhesive. The present disclosure further encompasses a method for parting a long-term structural bond produced by means of such a laminate.

In repair shops and in the end-of-life recycling of electronic devices, the desire to be able to repair electronic devices or else automobiles, or to be able as extensively as possible to disassemble and/or recycle them, is gaining in importance for not just environmental reasons but also economic reasons.

There are different kinds of electronic devices here, differing in their recyclability and also in the degree of recycling:

- large household appliances (also called white goods): for example, washing machines, refrigerators and freezers, ovens;
- small household appliances (likewise included as white goods): for example, vacuum cleaners, coffee machines, microwaves;
- information technology and communication devices: for example, computers, monitors, printers, cell phones, telephones;
- consumer electronic devices (also called brown goods): for example, televisions, video recorders, digital cameras.

Electrical and electronic devices in particular contain a multiplicity of substances and materials. If used electrical and electronic devices are disposed of improperly, such as via the household garbage, for example, environmental risks may arise from the pollutants they still contain in some cases. As well as pollutants such as heavy metals and HCFCs, however, used electrical and electronic devices also contain a range of valuable substances, which should be recovered and therefore recirculated. Where, conversely, used electrical and electronic devices are disposed of properly, it is possible to replace primary raw materials (and hence their costly and laborious extraction) and to make a substantial contribution to the preservation of the natural resources.

In order to be able to achieve these objectives, there are specific obligations imposed on all relevant actors (manufacturers, trade, municipalities, owners, waste managers) in Germany by the law governing the sale, return, and environmentally sound disposal of electrical and electronic equipment (Electrical and Electronic Equipment Law—ElektroG) in implementation of Directive 2012/19/EU concerning waste electrical and electronic equipment (WEEE). By avoiding waste, through reasonable tests for possibilities of preparation for the re-use of entire devices or individual components, and by requirements regarding the more extensive recovery of value from wastes, the aim is to achieve a substantial contribution to preserving natural resources and to reducing pollutant emissions.

Corresponding recycling-friendly designs are needed which enable on-demand disassembly ("debonding on demand"). The recycling-friendly designs include repartable adhesive bonds.

The reason is that, in small electronic devices in particular, there is a very sharply increasing trend toward adhesively bonding parts, usually on a long-term basis, rather than connecting them in a way which can be undone mechanically.

Film laminates in the form of double-sided adhesive tapes are employed, for example, for bonding two components to one another. In general the intention is for these components to be bonded to one another on a long-term basis by such a film laminate. This is intended to result in a correspondingly long life and durability of the bond and/or the product. Examples of components joined to one another in this way are touch panels of the kind employed in computer screens or mobile electronic devices. If one of the two components is damaged, it is completely impossible, or possibly only on application of substantial resource (force), to separate the bonded assembly again in order to replace a component. There is also the risk of the component that is not damaged suffering damage in the course of the separation.

DE 10 2020 209 557 A1 discloses a film laminate designed and equipped to be separated after long-term bonding, comprising the following layers:

- a first layer of pressure sensitive adhesive,
- a separation layer,
- a second layer of pressure sensitive adhesive, where the separation layer has a thickness of 40 nm to 500 nm, the first layer of pressure sensitive adhesive is laser beam-translucent, and the separation layer consists of a metal which is at least partly removable by laser irradiation.

In this case a metal is removed by laser, leading to the separation.

Translucency is the partial light transmissiveness of a body. The word derives from the Latin lux for light. Wax, the human skin, leaves, and many other substances are translucent, since they transmit light partially, but are not transparent. In delimitation from transparency, translucency may be described as light transmissiveness. The reciprocal property to translucency is opacity. Hence where a substance possesses high translucency, it has low opacity, and vice versa.

Light transmissiveness in the sense of the disclosure means transmissive at the respective wavelength of the light. This means that, for example, a black body (for example, a black-colored polymer) is opaque in the range of light that is visible for humans, but is translucent in the nonvisible range such as NIR, meaning that radiation in this wavelength range is able to pass through it.

EP 3 390 553 A1 relates to a method for bonding two surfaces by means of a reactive adhesive film system comprising at least two adhesive films (F1 and F2), the adhesive films each comprising at least one reactive component (R1 and R2), the bonding being brought about by a reaction which requires the presence of both reactive components (R1 and R2), where prior to the bonding there is a parting layer (T) which is impervious for the reactive components (R1 and R2) between the adhesive films (F1 and F2) that are to be brought into contact with one another with the reaction. In order to produce the bond, the parting layer (T) is removed over at least part of its area by means of a laser, and so the adhesive films (F1 and F2) come into direct contact with one another and the reaction ensues in the presence of the two reactive components (R1 and R2).

The parting layer may be a metal layer. This may be a metal foil which is introduced between the adhesive films during the production of the adhesive tape, by means of a laminating operation, for example.

DE 81 30 861 U1 discloses laser-writable labels having an outer coating material layer and, disposed below it, a second coating material layer, with the coating material layer being produced from polyurethane acrylate and hexanediol bisacrylate. Building on this, DE 100 48 665 A1 discloses laser-writable labels having an electron beam-cured coating material layer. A method for producing such laser-writable labels is described in DE 101 42 638 A1, wherein an engraving layer with a UV-curable coating material is incorporated. By means of an additional compensation layer, DE 10 2005 061 125 A1 produces labels which attenuate deterioration due to high temperatures above 140° C.

The use of lasers for ablation is widespread—for example, in micromachining, certain laser beam sources can be used for ablative operations. Extremely thin layers can be removed from substrates, since the local heating leads to a particulate debris or to carbonization/evaporation. In order to realize ablation operations as sparingly as possible, lasers in the wavelength range from 800 to 2000 nm are primarily employed. For photochemical reactions with low exposure to heat, excimer lasers are frequently used. Excimer laser means that the laser beams are situated in the UV wavelength range.

The table below lists the typical properties of an Nd:YAG laser.

TABLE 1

Typical properties of an Nd:YAG laser

| | |
|---|---|
| Wavelength: | 1064 nm |
| Pulse duration: | several ps up to several ms |
| Pulse energy: | mJ up to about 100 J |
| Photon energy: | 1.16 eV |
| Applications: | Microscale welding, cutting, and drilling of metals and plastics |
| Note: | Typical plastics and glass possess high transparency → hence poor machining |

Furthermore, USP (ultra-short pulse) lasers have proven particularly suitable.

Ultra-short pulse lasers are laser beam sources which emit pulsed laser light having pulse durations in the range of picoseconds and femtoseconds.

Ultra-short pulse lasers emit pulses of light in which the light energy is compressed to extremely short times, with luminous powers in the megawatt range being achieved during the pulse. By means of appropriate spatial focusing, it is therefore possible to obtain intensities of many gigawatts per square centimeter. At such high intensities, there are nonlinear effects in the interaction between light and matter. One of these effects is that known as multiphoton absorption, which results in virtually any material being ablatable at sufficiently high intensities. This is true particularly of femtosecond lasers. In this case no part is played by their absorption, their hardness or their vaporization temperature, and even challenging materials such as composite materials can be readily machined.

A further advantage of ultra-short pulse lasers is their high precision. Focal diameters in the micrometer range and the low energy input per pulse enable laser ablation with high spatial resolution. The rule here is as follows: the shorter the pulse duration, the less the extent to which the surrounding material is damaged by the laser beam and the more precise the degree of metering with which the material can be ablated. The results are clean cut edges without burring, and so there is no need for reworking. In metal working, nanosecond pulses are usually sufficient; more elaborate machining requires picosecond pulses, while, for nonmetallic materials, such as ceramics, polymers, and many composite materials, femtosecond pulses are employed. The lower level of ablation of material accompanying the shorter pulse duration, however, means that machining takes longer overall. One objective in the current development work on ultra-short pulse lasers, therefore, is to increase the pulse repetition rates (number of laser pulses per second). This will raise the average power and hence the throughput in manufacturing. In the laboratory, femtosecond lasers with an average power of more than 1 kilowatt have already been demonstrated. They have pulse repetition rates of 20 megahertz, pulse energies of 55 microjoules and pulse durations of 600 femtoseconds. Available commercially today there are femtosecond lasers having average powers of not more than a few hundred watts, operating in general with ytterbium-doped laser crystals.

It is an object of the present disclosure, therefore, to provide a laminate which on the one hand enables long-term and reliable bonding of two components with one another, but on the other hand, as and when required, enables clean and reliable separation of the components.

The object is achieved in accordance with the disclosure by means of a film laminate as described in claim 1. Advantageous embodiments are reproduced in the dependent claims. Also part of the disclosure are a method for parting a long-term structural bond produced by means of a laminate of the disclosure, by removing at least part of the area of the separation layer by means of laser irradiation and separating the laminate into a first part-laminate and a second part-laminate, and also proposed uses of the laminate of the disclosure.

DETAILED DESCRIPTION OF THE DISCLOSURE

Figure 1:
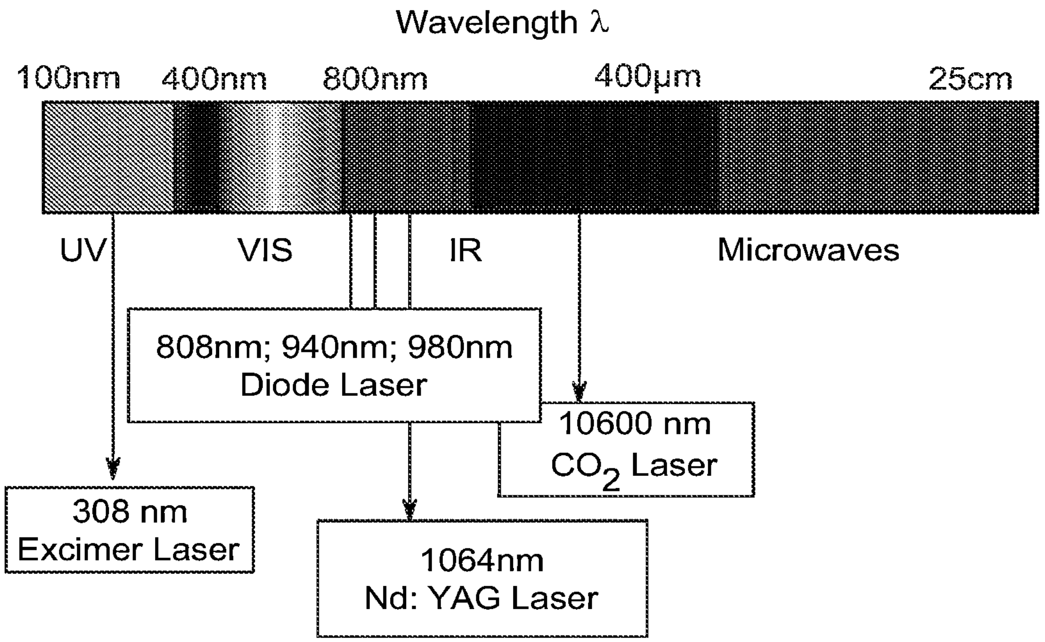
FIG. 1 is a schematic illustration of an overview of the emission wavelengths of the principal lasers.

The present disclosure relates accordingly to a laminate designed and equipped to be separated after long-term structural bonding, comprising the following layers:

a) a first adhesive layer, b) a separation layer, c) a second adhesive layer.

In accordance with the disclosure the separation layer is characterized by the following properties:

- the separation layer has a thickness of preferably 0.5 to 100 μm, more preferably 1 to 30 μm, especially preferably 5 to 25 μm.
- The separation layer comprises a laser-sensitive pigment which at the same time is coloring, preferably producing a black coloration.
- The separation layer consists of a cured coating material, preferably an electron beam-cured or UV-cured coating material, which is at least partly removable by laser irradiation.

The first adhesive layer and/or the second adhesive layer are laser beam-translucent. Furthermore, the first adhesive layer or the second adhesive layer, or the first adhesive layer and the second adhesive layer, comprise a reactive or latent-reactive adhesive or consist of a reactive or latent-reactive adhesive.

With a laminate of this kind it is possible for two substrates—for example, glass/glass, glass/metal, glass/plastic, or plastic/plastic—to be permanently bonded. As a result of the controlled removal of the thin separation layer, the composite adhesion between the two layers of adhesive can be reduced to an extent that enables very easy separation of the layers—in the best case, the composite adhesion is eliminated almost entirely. This makes it possible to achieve what is referred to as reworkability, meaning that an adhesive bond which has actually been made as a connection that can no longer be altered can nevertheless be undone again. This removal of the separation layer is accomplished by ablation.

The present disclosure further relates to a method for parting a long-term structural bond produced by means of a laminate of the disclosure, wherein at least part of the area of the separation layer is removed by means of laser irradiation and the laminate is separated into a first part-laminate and a second part-laminate.

This preferably involves the application, to at least one of the part-laminates, of forces which increase the spacing of the two part-laminates from one another. Accordingly, the laminate can be separated into two part-laminates in a particularly effective and reliable way.

A typical construction of a laminate of the disclosure therefore looks as follows:

a) first layer of adhesive, preferably a reactive or latent-reactive adhesive
b) separation layer
c) second layer of adhesive, preferably a reactive or latent-reactive adhesive.

It is important that either the first layer of adhesive is translucent for the laser radiation used, and/or the second layer of adhesive, so that the laser is able to reach the separation layer. The same applies to the substrate for bonding, at least on the side from which the laser radiation is introduced. This substrate as well must be transmissive for the laser radiation. The separation layer itself absorbs the laser radiation.

The separation layer consists of a cured coating material, preferably a radiation-cured coating material, more particularly of an electron beam-cured or UV-cured coating material.

In accordance with the disclosure, the coating material is admixed with laser absorbers, i.e., laser-absorbing pigments, in order to achieve an extremely efficient take-up of energy during the lasering treatment. These laser-sensitive pigments at the same time produce a coloring of the separation layer. Titanium dioxide and/or carbon black therefore serve as typical laser absorbers which at the same time bring about a coloration.

If a laser-sensitive pigment is present in the separation layer, through the addition of titanium dioxide and/or carbon black, for example, it is also possible, moreover, for other coloring pigments to be added, and so it is possible to produce a coating material layer of any desired color. The actual coloring pigment of the coating material in that case no longer needs to fulfill any particular absorption properties in respect of the laser absorption.

Suitable separation layers comprise radiation-curable systems such as unsaturated polyesters, epoxy acrylates, polyester acrylates, and urethane acrylates, of the kind also used for UV printing inks, and more particularly those composed of base polymers according to DE U 81 30 816, namely aliphatic urethane acrylate oligomers.

In principle for the separation layer of the disclosure it is possible to use in particular four types of coating material—for example, acid-curing alkyd-melamine resins, addition-crosslinking polyurethanes, radically curing styrene coating materials, and similar. Particularly advantageous, however, are radiation-curing coating materials, since they cure very rapidly without laborious evaporation of solvents or exposure to heat. Such coating materials have been described, for example, by A. Vrancken (Farbe and Lack 83, 3 (1977) 171).

According to one preferred embodiment, the separation layer consists of a single coating material layer, which in particular is electron beam-cured.

For this purpose the coating material layer preferably employed is applied to a liner and cured by exposure to an electron beam of high energy (150 to 500 kV) under effectively oxygen-free conditions.

With particular advantage the coating material comprises a cured acrylate coating composition. The cured acrylate coating composition is based, according to one particularly advantageous embodiment, on a composition comprising 30 to 80 wt % of a di- or trifunctional oligomer A,
0 to 20 wt % of a di- or trifunctional monomer B,
1 to 30 wt % of a difunctional monomer C, and
2 to 40 wt % of a laser-sensitive pigment which at the same time is also coloring.

In one preferred embodiment of the present disclosure, the composition on which the acrylate coating composition is based comprises 50 to 60 wt %, preferably 52 to 58 wt %, of the trifunctional oligomer A, 5 to 15 wt %, preferably 8 to 12 wt %, of the trifunctional monomer B, and 5 to 15 wt %, preferably 8 to 12 wt %, of the difunctional monomer C.

The amount of the laser-sensitive pigment within the acrylate coating compositions of preferred embodiments is dependent on the nature of the pigment used.

In principle the laser-sensitive pigments are admixed in an order of magnitude of 1 wt % up to not more than 40 wt %, preferably in amounts of 2 to 28 wt % or in amounts of 5 to 15 wt %, based on the total weight of the coating material layer.

In the case of carbon black as coloring pigment (in order to achieve the preferred black coloration), for example, 2 to 7 wt % are preferred, whereas in the case of $TiO_2$, for whitening, preferably 15 to 40 wt %, more preferably 22 to 28 wt %, are used. Preference is given to using titanium dioxide in the rutile modification ("$TiO_2$", examples being rutile grades from Kronos).

The trifunctional oligomer A, the trifunctional monomer B, and the difunctional monomer C are also referred to below as component A, component B, and component C, respectively.

Compositions comprising components A, B, and C and also the coloring pigment in the stated amount produce particularly temperature-resistant cured acrylate coating compositions.

The separation layer may be provided by curing a composition comprising the components A, B, and C and also the laser-sensitive pigment. For this purpose the composition is crosslinked by means of IR or UV radiation or electron beam curing (hereinafter EBC). Crosslinking by means of EBC is preferred.

The trifunctional oligomer A is an oligomer having three unsaturated (meth)acrylate units per molecule, with a number-average molecular weight $M_n$ (determined by gel permeation chromatography (GPC)) of preferably between 1000 and 5000 g/mol, preferably between 1400 and 3600 g/mol, preferably between 1800 and 2200 g/mol, more preferably between 1900 and 2100 g/mol. Where the molecular weight $M_n$ is within the stated range, this has a positive influence on the long-term temperature resistance of the cured acrylate coating composition, allowing particularly dimensionally stable contrast layers to be obtained.

In one preferred embodiment, the trifunctional oligomer A is selected from the group of polyurethane tri(meth) acrylates and polyester tri(meth)acrylates, of which polyurethane tri(meth)acrylates are particularly preferred. The expression "(meth)acrylate" encompasses acrylates, methacrylates, and mixtures thereof. The trifunctional oligomer A is preferably a polyurethane tri(meth)acrylate, more preferably a polyurethane triacrylate. Polyurethane tri(meth)acrylates are oligomers having in each case three unsaturated (meth)acrylate groups per molecule and also a plurality of, in other words at least two, urethane units. Examples of preferred polyurethane triacrylates are the aliphatic urethane triacrylates CN9260D75® and CN9278D80® from Sartomer, of which CN9260D75® is particularly preferred.

The trifunctional monomer B contains three unsaturated (meth)acrylate units per molecule and in one preferred embodiment of the disclosure has a molecular weight of 300 to 1000 g/mol, preferably 350 to 800 g/mol, preferably 350 to 600 g/mol, more preferably 400 to 450 g/mol. Component B is preferably selected from the group consisting of propoxylated and ethoxylated glycerol tri(meth)acrylates and propoxylated and ethoxylated trimethylolpropane tri (meth)acrylates of the general Formula (I) or mixtures thereof:

Formula I

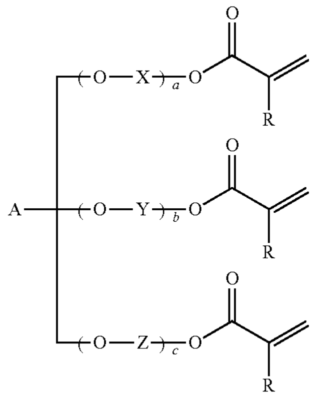

where R in Formula I is hydrogen or a methyl group; A is hydrogen or an ethyl group; X, Y, and Z in each case independently of one another are a propylene or ethylene unit; and a, b, and c in each case independently of one another are an integer from 1 to 4, preferably 1 to 3, and a+b+c is a number between 3 and 12, preferably from 3 to 9. In one particularly preferred embodiment of the disclosure, X, Y, and Z are propylene units. More preferably the trifunctional monomer is a propoxylated glycerol triacrylate. If the trifunctional monomer B is selected such that the molecular weight is within the above-stated ranges and/or such that the monomer B falls within the above-stated Formula I, then component B as well exerts a positive influence on the temperature resistance of the contrast layer and hence of the laser-writable film.

The difunctional monomer C is a monomer having two unsaturated acrylate units per molecule. Component C preferably has a molecular weight of 100 to 1000 g/mol, preferably 180 to 350 g/mol, more preferably 220 to 280 g/mol, and is preferably selected from the group of the ethylene glycol diacrylates of the general Formula (II):

Formula II

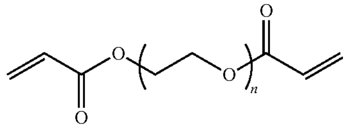

and of the propylene glycol diacrylates of the general Formula (III):

Formula III

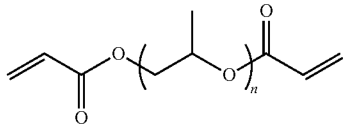

or mixtures thereof, with n in the Formulas II and III in each case independently of one another being an integer from 1 to 15, preferably from 1 to 9, more preferably from 2 to 6, and especially preferably 3 or 4. In one particularly preferred embodiment of the present disclosure, the difunctional monomer C is triethylene glycol diacrylate. If the difunctional monomer C is selected such that the molecular weight falls within the above-stated ranges and/or that the monomer C falls within the above-stated Formula II or III, then component C as well exerts a positive influence on the temperature resistance of the contrast layer and hence of the laser-writable film.

In one particularly preferred embodiment of the disclosure, the separation layer is based on a composition comprising at least one polyurethane triacrylate, preferably CN9260D75® or CN9278D80® from Sartomer as component A, a propoxylated glycerol triacrylate of the Formula I reproduced above as component B, triethylene glycol diacrylate as component C, and also a pigment, an example being titanium dioxide in the rutile modification.

Additionally suitable types of coating material are described in the book "CHEMISTRY & TECHNOLOGY OF UV & EB FORMULATIONS FOR COATINGS, INKS & PAINTS" (VOLUME II: "PREPOLYMERS & REACTIVE DILUENTS FOR UV & EB CURABLE FORMULATIONS" by N S Allan, M S Johnson, P K T Oldring, and S Salim.

The separation layer may consist of a coating material, more particularly a cured coating material, preferably a radiation-cured coating material, more particularly an electron beam-cured polyurethane acrylate coating material. In an alternative embodiment the separation layer is composed of a polybutylene terephthalate.

Suitable separation layers consist of plastics such as polyesters, poly(meth)acrylates, polycarbonate and polyolefins and also radiation-curable systems such as unsaturated polyesters, epoxy acrylates, polyester acrylates and urethane acrylates, as are also used for UV printing inks, especially those composed of a base polymer as in DE 81 30 816 U1, namely aliphatic urethane acrylate oligomers.

In display bonding in particular, a metallically lustrous appearance to adhesive tapes is undesirable. Typically, therefore, adhesive tapes for the securing/mounting of displays are jet black and have a very high opacity. They also serve as a design element in the displays. The black coloration of the separation layer is therefore preferred.

The separation layer is therefore preferably black.

For the coloration, black pigments are added.

Suitable black pigments are, for example, the preferentially employed carbon black, organic azo dyes and/or chromium complexes. Examples of black pigments based on chromium complexes are [1-[(2-hydroxy-4-nitropheny-hazo]-2-naphthalenolato(2-)][1-[(2-hydroxy-5-nitrophenyl) azo]-2-naphthalenolato(2-)]chromate(1-), bis[1-[(2-hydroxy-4-nitrophenyl)azo]-2-naphthalenolato(2-)]chromate (1-), and bis[1-[(2-hydroxy-5-nitrophenyhazo]-2-naphthalenolato(2-)]chromate(1-).

Suitable coloring carbon blacks are as follows:

pigment black
lamp black
furnace black
acetylene black
oxidized gas black
thermal black Mention may be made, illustratively, of the Printex grades from Evonik.

As well as the separation layer, one of the layers of adhesive may also be colored. Where carbon black particles are admixed as black pigments, they are used preferably in an amount of up to 12 wt %, based on the colored adhesive (i.e., the adhesive blended with color pigments). For the coloring achieved to be outstanding, it is advantageous to use carbon black at least in an amount of 1.2 wt %. Very preferably, where carbon black is used as a black pigment, it is employed in an amount such that the adhesive comprises carbon black in a weight fraction of 2.1 to 3.1 wt %.

As already outlined, the separation layer and/or one of the layers of adhesive may also comprise, as well as the coloring and laser-sensitive pigments, other color pigment additives.

Here as well at least one of the two layers of adhesive must be laser beam-translucent, even if this layer of adhesive is to comprise color pigments.

Particularly if the separation layer consists of multiple coating material layers, the individual layers may have different colorations, with laser-sensitive pigments necessarily being present in at least one layer.

Examples of suitable additives, some of them also having a laser-sensitive character, are color pigments and metal salts, especially copper hydroxide phosphate, or else Iriodin, a pearlescent pigment as available commercially from Merck. These additives are admixed to the base polymer (such as, for example, that described in DE U 81 30 861) in particular in an order of magnitude of 0.05 wt % up to not more than 10 wt %, preferably in amounts of 0.1 to 10 wt %, more particularly of 0.5 to 5 wt %, based on the total weight of the coating material layer.

Coloring additives in the sense of the present disclosure encompass, without restriction, all coloring additives which find application as dyes and/or brighteners in paints and coating materials, as are specified, for example, in volume 5 of the Lehrbuch der Lacke and Beschichtungen [Textbook of Paints and Coatings] (Hans Kittel and Jurgen Spille, Hirzel Verlag (Stuttgart), 2003).

With further preference the coating material layer is single-coat. In one variant it is multicoat, and the coats consist of cured, i.e., crosslinked, coating material.

In a preferred configuration, the coating material layers are each arranged directly over one another, meaning that there are no further intermediate layers. This is particularly advantageous in terms in particular of an extremely thin and also cost-effective configuration of the separation layer.

The separation layer is a layer which can be ablated by means of a single laser beam or of multiple laser beams. In this procedure, the engraving layer is ablated at the locations onto which a laser beam is directed with appropriate energy. With sufficient input of energy, the separation layer is locally completely removed.

It is likewise conceivable for the separation layer to be only partly ablated at some locations.

The separation layer provided in accordance with the disclosure is present very preferably over the full area and in the form of a continuous layer between the first layer of adhesive and the second layer of adhesive.

The parting layer provided in accordance with the disclosure is applied advantageously in a thickness of 0.5 to 100 μm, more particularly 1 to 30 μm, more especially 5 to 25 μm.

The separation layer is removed by a laser, more particularly by ablation. The procedure here in particular is such that the laser is beamed through the laminate from one side. In this case the separation layer may be removed over its whole area, or removal takes place only in one or more regions or in portions. In this way it is possible to control the size intended for the contact area that remains. It is possible in this way to generate a predetermined breakage point, at which separation takes place under little further exposure, whereas initially (that is, after the laser irradiation) a connection is still maintained. Likewise, in the case of complete removal of the separation layer, a 100% parting of the laminate is possible within less than a second. Substrates originally joined on a long-term basis can therefore be separated very quickly and cleanly from one another in a simple way.

The lasers used may in principle be customary, standard lasers. The laser wavelength used is preferably selected such that the laser radiation is able to emit with maximum transmission through the (pressure sensitive) adhesive layers and any other layers of the laminate. In the wavelength range from 800 to 2000 nm, for example, customary (pressure sensitive) acrylate adhesives have very little, or no, disposition to absorb. In this range, the adhesive systems used in accordance with the disclosure are also translucent.

Preference is given to using solid state lasers, whose wavelength is outstandingly suitable for the transradiation of customary adhesives and release materials. With particular preference, Nd:YAG solid state lasers are used. An Nd:YAG laser (short for neodymium-doped yttrium aluminum garnet laser) is a solid state laser which as its active medium uses a neodymium-doped YAG crystal and emits mainly infrared radiation with the wavelength 1064 nm. Further transitions exist at 946 nm, 1320 nm and 1444 nm. The wavelength of the light emitted by this laser is situated—as described above—in the region of 1064 nm. This wavelength is not absorbed in general by the adhesive layers used, and so these materials are translucent for the wavelength in question. Moreover, the carrier layers as well—made of polyethylene terephthalate (PET), for example—can have this wavelength beamed through them without suffering damage. Conversion of the radiation to different wavelengths may be performed as and when required by generation of the second (532 nm) and third (355 nm) harmonics. In principle, however, all gas lasers, dye lasers, solids lasers, metal vapor lasers, and excimer lasers having the appropriate wavelengths are suitable.

The sets of laser parameters used for an application, and the associated laser strategy, are dependent on the adhesive systems used (absorbing and nonabsorbing adhesives). Preference is given to using the following parameters:

power: 0.1 to 12 watts
speed: 100 to 12 000 mm/sec frequency: 1 to 200 kHz
focus: 25 to 250 μm
pulse time: 30 to 300 ns According to one preferred embodiment of the disclosure, the first adhesive layer and the second adhesive layer consist of a reactive or latent-reactive adhesive.

According to one variant, one of the two adhesives may be formed by a pressure sensitive adhesive.

A pressure sensitive adhesive is understood in this specification, as is customary within the general usage, as a material which—in particular at room temperature—is permanently tacky and also adhesive. Characteristics of a pressure sensitive adhesive are that it can be applied by pressure to a substrate and remains adhering there, with no further definition of the pressure to be applied or the period of exposure to this pressure. In certain cases, depending on the precise nature of the pressure sensitive adhesive, the temperature, and the atmospheric humidity and also the substrate, exposure to a minimal pressure of short duration, which does not go beyond gentle contact for a brief moment, is enough to achieve the adhesion effect, while in other cases a longer-term period of exposure to a high pressure may be necessary.

Pressure sensitive adhesives have particular, characteristic viscoelastic properties which result in the permanent tack and adhesiveness.

A characteristic of these adhesives is that when they are mechanically deformed, there are processes of viscous flow and there is also development of elastic forces of resilience. The two processes have a certain relationship to one another in terms of their respective proportion, in dependence not only on the precise composition, the structure, and the degree of crosslinking of the pressure sensitive adhesive under consideration, but also on the rate and duration of the deformation, and on the temperature.

The proportional viscous flow is necessary for the achievement of adhesion. Only the viscous components, brought about by macromolecules with relatively high mobility, permit effective wetting and effective flow onto the substrate where bonding is to take place. A high viscous flow component results in high tack (also referred to as surface stickiness) and hence often also in a high peel strength. Highly crosslinked systems, crystalline polymers, or polymers with glasslike solidification lack flowable components and are therefore in general devoid of tack or possess only little tack at least.

The proportional elastic forces of resilience are necessary for the attainment of cohesion. They are brought about, for example, by very long-chain macromolecules with a high degree of coiling, and also by physically or chemically crosslinked macromolecules, and they allow the transmission of the forces that act on an adhesive bond. As a result of these forces of resilience, an adhesive bond is able to withstand a long-term load acting on it, in the form of a long-term shearing load, for example, sufficiently over a relatively long time period. For the more precise description and quantification of the extent of elastic and viscous components, and also of the relationship between the components, it is possible to employ the variables of storage modulus (G') and loss modulus (G"), which can be determined by means of Dynamic Mechanical Analysis (DMA). G' is a measure of the elastic component, G" a measure of the viscous component, of a substance. Both variables are dependent on the deformation frequency and the temperature.

The variables can be determined with the aid of a rheometer. In that case, for example, the material under investigation is exposed in a plate/plate arrangement to a sinusoidally oscillating shearing stress. In the case of instruments operating with shear stress control, the deformation is measured as a function of time, and the time offset of this deformation is measured relative to the introduction of the shearing stress. This time offset is referred to as phase angle δ.

The storage modulus G' is defined as follows: $G'=(\tau/\gamma)\cdot\cos(\delta)$ (τ=shear stress, γ=deformation, δ=phase angle=phase shift between shear stress vector and deformation vector). The definition of the loss modulus G" is as follows: $G''=(\tau/\gamma)\cdot\sin(\delta)$ (τ=shear stress, γ=deformation, δ=phase angle=phase shift between shear stress vector and deformation vector).

A substance is considered in general to be pressure-sensitively adhesive, and is defined as being pressure-sensitively adhesive for the purposes of this specification, if at room temperature, presently by definition 23° C., in the deformation frequency range from $10^0$ to $10^1$ rad/sec, G' is located at least partly in the range from $10^3$ to $10^7$ Pa and if G" likewise is located at least partly within this range. "Partly" means that at least one section of the G' curve lies within the window described by the deformation frequency range from $10^0$ inclusive up to $10^1$ inclusive rad/sec (abscissa) and by the G' value range from $10^3$ inclusive up to $10^7$ inclusive Pa (ordinate), and if at least one section of the G" curve is likewise located within this window.

The layer of pressure sensitive adhesive preferably comprises at least one polymer selected from the group consisting of poly(meth)acrylates, natural rubber, synthetic rubbers, including more particularly vinylaromatic block copolymers, silicones, polyurethanes, and mixtures of two or more of the above-recited polymers. More preferably the layer of pressure sensitive adhesive comprises at least one poly(meth)acrylate. It is preferable, moreover, if the pressure sensitive adhesive layer contains at least 40 wt % of one or more poly(meth)acrylates. More particularly the layer of pressure sensitive adhesive contains no polymers other than one or more poly(meth)acrylates.

"Poly(meth)acrylates" are understood, in line with the general understanding, to be polymers accessible via radical polymerization of acrylic and/or methylacrylic monomers and also, optionally, further copolymerizable monomers. The term "poly(meth)acrylate" in accordance with the disclosure encompasses not only polymers based on acrylic acid and derivatives thereof but also those based on acrylic acid and methacrylic acid and derivatives thereof, and those based on methacrylic acid and derivatives thereof, the polymers always including acrylic esters, methacrylic esters, or mixtures of acrylic and methacrylic esters. The poly(meth) acrylates of the layer of pressure sensitive adhesive preferably have an average molar mass $M_w$ of not more than 2 000 000 g/mol.

The monomers of the poly(meth)acrylates of the layer of pressure sensitive adhesive, and their quantitative composition, are preferably selected such that the so-called Fox equation (E1)

$$\frac{1}{T_g}=\sum_n\frac{w_n}{T_{g,n}} \quad \text{(E1)}$$

(cf. T. G. Fox, Bull. Am. Phys. Soc. 1 (1956) 123) produces a $T_g$ value for the polymer of 25° C. A value of this kind is particularly advantageous for pressure sensitive adhesives which are used substantially at room temperature.

In equation E1, n represents the serial number of the monomers used, $w_n$ the mass fraction of the respective monomer n (wt %), and $T_g$,n the respective glass transition temperature of the homopolymer of the respective monomer n, in kelvins.

The layer of pressure sensitive adhesive preferably comprises one or more poly(meth)acrylates which can be traced back to the following monomer composition:

a) acrylic esters and/or methacrylic esters of the Formula (F1)

$$CH2=C(R^{I})(COOR^{II}) \quad (F1),$$

where $R^{I}$=H or $CH_3$ and $R^{II}$ is an alkyl radical having 1 to 30 C atoms, more preferably having 4 to 14 C atoms, and very preferably having 4 to 9 C atoms;

b) olefinically unsaturated monomers having functional groups which exhibit reactivity with crosslinker substances;

c) optionally further olefinically unsaturated monomers, which are copolymerizable with the monomers (a) and (b).

Examples of monomers a) are methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and their branched isomers, such as, for example, isobutyl acrylate, 2-ethylhexyl acrylate, 2-ethylhexyl methacrylate, isooctyl acrylate, isooctyl methacrylate. More preferably $R^{II}$ is a methyl, an n-butyl, and a 2-ethylhexyl group, more particularly an n-butyl and a 2-ethylhexyl group, or the monomers a) are selected from n-butyl acrylate and 2-ethylhexyl acrylate.

The monomers b) are preferably olefinically unsaturated monomers having functional groups which are able to enter into a reaction with epoxide groups. More preferably the monomers b) each contain at least one functional group selected from the group consisting of hydroxyl, carboxyl, sulfonic acid and phosphonic acid groups, acid anhydride functions, epoxide groups, and substituted or unsubstituted amino groups. More particularly the monomers b) are selected from the group consisting of acrylic acid, methacrylic acid, itaconic acid, maleic acid, fumaric acid, crotonic acid, aconitic acid, dimethylacrylic acid, p-acryloyloxpropionic acid, trichloracrylic acid, vinylacetic acid, vinylphosphonic acid, maleic anhydride, 2-hydroxyethyl acrylate, 3-hydroxypropyl acrylate, 2-hydroxyethyl methacrylate, 3-hydroxypropyl methacrylate, 6-hydroxyhexyl methacrylate, allyl alcohol, glycidyl acrylate, and glycidyl methacrylate. Especially preferably the monomers b) are acrylic acid and/or methacrylic acid, more particularly acrylic acid.

Suitable monomers c) include in principle all vinylically functionalized compounds which are copolymerizable with the monomers a) and the monomers b). Through selection and amount of the monomers c) it is possible advantageously to regulate properties of the pressure sensitive adhesive of the disclosure.

The monomers c) are more preferably selected from the group consisting of methyl acrylate, ethyl acrylate, n-propyl acrylate, methyl methacrylate, ethyl methacrylate, benzyl acrylate, benzyl methacrylate, sec.-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, methyl 3-methoxyacrylate, 3-methoxybutyl acrylate, phenoxyethyl acrylate, phenoxyethyl methacrylate, 2-phenoxyethyl methacrylate, butyl diglycol methacrylate, ethylene glycol acrylate, ethylene glycol monomethyl acrylate, methoxy-polyethylene glycol methacrylate 350, methoxy-polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl) methacrylamide, N-(ethoxymethyl)acrylamide, N-(n-octadecyl)acrylamide, N,N-dialkyl-substituted amides, especially N,N-dimethylacrylamide, N,N-dimethylmethacrylamide, N-benzylacrylamide, N-isopropylacrylamide, N-tert-butylacrylamide, N-tert-octylacrylamide, N-methylolacrylamide, N-methylolmethacrylamide; additionally acrylonitrile, methacrylonitrile; vinyl ethers such as vinyl methyl ether, ethyl vinyl ether, and vinyl isobutyl ether; vinyl esters such as vinyl acetate; vinyl chloride, vinyl halides, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene, 2-polystyrene-ethyl methacrylate (molecular weight $M_w$ from 4000 to 13 000 g/mol), and poly(methyl methacrylate)-ethyl methacrylate ($M_w$ from 2000 to 8000 g/mol). More particularly the monomer c) is methyl acrylate.

The monomers c) may advantageously also be selected such that they contain functional groups which support radiation-chemical crosslinking (by electron beams or UV, for example). Suitable copolymerizable photoinitiators are, for example, benzoin acrylate and acrylate-functionalized benzophenone derivatives. Monomers which support crosslinking by electron bombardment are, for example, tetrahydrofurfuryl acrylate, N-tert-butylacrylamide, and allyl acrylate.

With particular preference, where the layer of pressure sensitive adhesive comprises a plurality of poly(meth)acrylates, all of the poly(meth)acrylates in the layer of pressure sensitive adhesive can be traced back to the above-described monomer composition. More particularly, all of the poly(meth)acrylates in the layer of pressure sensitive adhesive can be traced back to a monomer composition consisting of acrylic acid, n-butyl acrylate, 2-ethylhexyl acrylate, and methyl acrylate.

With very particular preference, the poly(meth)acrylate or all of the poly(meth)acrylates in the layer of pressure sensitive adhesive can be traced back to the following monomer composition:

acrylic acid 1 to 10 wt %
methyl acrylate 1 to 15 wt %
2-ethylhexyl acrylate 30 to 60 wt %
n-butyl acrylate 25 to 50 wt %, the proportions of the monomers adding up to 100 wt %.

According to one variant of the disclosure, a pressure sensitive adhesive is selected which comprises at least the following two components:

at 60 wt % to 90 wt %, preferably 65 wt % to 80 wt % in the adhesive, a first polymer component based on polyacrylate (called polyacrylate component hereinafter)

at 10 wt % to 40 wt %, preferably 15 wt % to 30 wt % in the adhesive, a second polymer component, substantially immiscible with the polyacrylate component, based on elastomer, more particularly on a synthetic rubber (called elastomer component hereinafter).

The weight percentage figures above are based on the sum total of polyacrylate component and elastomer components as 100 wt %.

The second polymer component is substantially immiscible with the first polymer component, and so the adhesive in the layer of adhesive is present in at least two separate phases. More particularly, one phase forms a matrix and the other phase forms a multiplicity of domains arranged in the matrix.

Homogeneous mixtures are substances mixed at a molecular level; homogeneous systems, correspondingly, are single-phase systems. The substances on which they are based are referred to synonymously as being "homogeneously miscible" and "compatible" with one another. Correspondingly, two or more components are synonymously "not homogeneously miscible" and "not compatible" if after intimate combination they form at least two phases rather than one homogeneous system. Components regarded as synonymously "partly homogeneously miscible", "partly compatible" and "partially compatible" are those which on intimate combination with one another (for example, by shearing, in the melt or in solution, and subsequent elimination of the solvent) form at least two phases which are each rich in one of the components, but where one or both of the phases may in each case comprise a greater or lesser part of the other components, incorporated homogeneously.

The polyacrylate component per se is preferably a homogeneous phase. The elastomer component may be present homogeneously in itself, or may have a multi-phase nature in itself, as known for microphase-separating block copolymers. Polyacrylate component and elastomer component are presently selected such that—after intimate combination—at 23° C. (i.e., the customary usage temperature for adhesives) they are substantially immiscible. "Substantially immiscible" means that the components either are not homogeneously miscible with one another at all, meaning that none of the phases contains a homogeneously incorporated fraction of the second component, or that the components have so little partial compatibility—in other words, that one or both components can homogeneously accommodate only so small a fraction of the other respective component.

The components in question are then regarded as being "substantially free" from the other respective component.

The adhesive used, accordingly, is in at least two-phase morphology at least at room temperature (23° C.). Very preferably the polyacrylate component and the elastomer component are substantially not homogeneously miscible in a temperature range from 0° C. to 50° C., more preferably still from −30° C. to 80° C.

The first, polyacrylate-based polymer component can preferably be traced back predominantly to acrylic and/or methacrylic monomers, more particularly to an extent of at least 50 wt %.

The second, elastomer-based polymer component can preferably be traced back predominantly to one or more synthetic rubbers, more particularly to an extent of more than 60 wt %.

The synthetic rubbers are further preferably selected from the group of the thermoplastic block copolymers whose structure may be represented by one of the following formulas:

A-B (II)

A-B—X-(A'-B')$_n$ (IIIa)

A-B—X-(A'-A')$_n$ (IIIb)

$Q_mY$ (IV)

where

A or A' is a polymer formed by polymerizing a vinylaromatic, such as styrene or α-methylstyrene, for example, B or a is a polymer obtained from an isoprene, butadiene or a mixture of butadiene and isoprene, or a mixture of butadiene and styrene, or containing, entirely or partly, ethylene, propylene, butylene and/or isobutylene, and X and Y are each an optional linking group, Q in each case is an arm of a multiarm block copolymer and is bonded to Y, and advantageously each Q independently is formed by (A*-B*)$_n$, and A* and B* independently of one another are selected in accordance with the above definition of A and B, n is an integer between 1 and 4, and m is an integer greater than 2.

This adhesive is described comprehensively and in particularly suitable embodiments in WO 2015/014582 A1, which is hereby expressly referenced.

In one embodiment of the disclosure, the layer of pressure sensitive adhesive comprises at least one tackifying resin, which is selected from the group consisting of pinene resins, indene resins, and rosins, and also their disproportionated, hydrogenated, polymerized, and esterified derivatives and salts; aliphatic and aromatic hydrocarbon resins, terpene resins, terpene-phenol resins, and also mixtures of two or more of the above-recited tackifying resins. Of the hydrocarbon resins, it is possible to employ all resins that are compatible (soluble) with the poly(meth)acrylate in question; reference may be made more particularly to all aliphatic, aromatic, and alkylaromatic hydrocarbon resins, hydrocarbon resins based on pure monomers, hydrogenated hydrocarbon resins, functional hydrocarbon resins, and natural resins, and especially to $C_5$ to $C_9$ hydrocarbon resins. With particular preference the layer of pressure sensitive adhesive comprises at least one tackifying resin selected from terpene-phenol resins and $C_5$ to $C_9$ hydrocarbon resins. More particularly the layer of pressure sensitive adhesive comprises a terpene-phenol resin.

The first adhesive layer and/or the second adhesive layer consist preferably of a reactive or latent-reactive adhesive. These two adhesives may have an identical composition; they may also be differently embodied.

Suitable in principle are all known reactive or latent-reactive adhesives.

Described hereinafter are various reactive or latent-reactive adhesives especially suitable for use as an adhesive system.

The first adhesive layer and/or the second adhesive layer are preferably formed of or consist of the adhesives described below.

Preferably these adhesive layers are identical.

Reactive adhesive or latent-reactive adhesive refers to an adhesive which under an external influence, more particularly under the influence of moisture or high-energy radiation, cures to a technically relevant extent, or with a significant change in at least one application-related property, and does so to attain bond strengths which go well beyond the level of customary pressure sensitive adhesives or customary pressure sensitive adhesive tapes.

Heat-activatable adhesives may be differentiated fundamentally into two categories, namely thermoplastic heat-activatable adhesives and reactive heat-activatable adhesives.

a) Thermoplastic Heat-Activatable Adhesives, Preferably with Chemical Solidification In the sense of this disclosure, thermoplastic heat-activatable adhesives are included among the reactive adhesives. These adhesives have little or no self-adhesiveness at room temperature. The adhesive is activated only by heat, becoming self-adhesive. The factor responsible for this is an appropriately high glass transition temperature of the adhesive, and so the activation temperature for achieving sufficient tack—generally several tens to a hundred degrees Celsius—lies above room temperature. An adhesive effect occurs even before the adhesive has set, owing to the self-adhesive properties. After the adherends have been assembled, the thermoplastic heat-activatable adhesive sets physically on cooling with solidification (use of suitable thermoplastic materials as adhesive; resulting generally in reversible bonding), more preferably chemically as well (use of suitable thermoplastically reactive materials as adhesives; resulting generally in irreversible bonding), and so in the cooled state the adhesive effect is retained and the actual adhesion forces have formed there.

The greater the extent to which heat, pressure and/or time are expended for the bonding, the stronger, generally, the connection between the two materials to be bonded. By this means it is possible regularly to realize maximum bonding strengths under technically easy processing conditions.

Thermoplastics are compounds as defined in Römpp (online version; 2008 edition, document code RD-20-01271).

b) Reactive Heat-Activatable Adhesives

This designation refers to polymer systems which have functional groups such that on supply of heat, a chemical reaction occurs, with the adhesive undergoing chemical setting and thus bringing forth the adhesive effect. Reactive heat-activatable adhesives generally do not become self-adhesive on supply of heat, and so the adhesive effect ensues only after setting has taken place. Reactive heat-activatable adhesives are frequently not thermoplastic, being instead realized through an elastomer/reactive resin system (compare, however, the heat-activatable films by means of thermoplastically reactive materials; see above).

The glass transition temperature is not significant for the functionality of reactive systems.

A suitable reactive and at the same time pressure sensitive adhesive is a light-curing, reactive, pressure sensitive film of adhesive, which is disclosed in DE 10 2021 125 429.9. This film of adhesive comprises (a) at least one reactive monomer or reactive resin, (b) an initiator, (c) a photoredox catalyst, (d) a polymer obtained by radical polymerization of monomers containing carbon-carbon double bonds and comprising N-vinyl compounds, and (e) a film-forming polymer. The light-curing, reactive, pressure sensitive film of adhesive is preferably based on acrylic monomers. The curing is initiated by blue LED light or UV-LED light.

As used herein, the reactive monomer or reactive resin is intended to represent a monomer or resin which is capable in particular of a radical chain polymerization.

A suitable reactive monomer or reactive resin is selected from at least one representative selected from acrylic esters (such as, for example, 2-ethylhexyl acrylate), methacrylic esters, vinyl compounds and/or oligomeric or polymeric compounds having carbon-carbon double bonds, and also crosslinking reactive monomers such as diacrylates, dimethacrylates, triacrylates, trimethacrylates, acrylates of higher functionality, and methacrylates of higher functionality. The reactive resin(s) selected may comprise oligomeric substances with acrylate or methacrylate function, where the functionalization may be single or multiple. They are used very advantageously in a mixture with at least one reactive monomer.

Preferred monomers in terms of a high bond strength are acrylic esters and/or methacrylic esters in which the alcohol part of the ester comprises aromatic structural elements, heteroatoms or functional groups. Preference is given to urethane groups, urea groups, oxygen or nitrogen heterocycles, ether groups, ester groups, acid functions and/or hydroxyl functions. With a view to good heat-and-humidity resistance, preference is likewise given to acrylic esters and/or methacrylic esters in which the alcohol part of the ester is a fatty alcohol. Moreover, with a view to high crosslinking density, crosslinking monomers are preferred.

Examples of preferred monomers are 2-phenoxyethyl acrylate (CAS No.: 48145-04-6), 2-phenoxyethyl methacrylate (CAS No.: 10595-06-9), 2-hydroxy-3-phenoxy-propyl acrylate (CAS No.: 16969-10-1), 2-hydroxy-3-phenoxy-propyl methacrylate (CAS No.: 16926-87-7), 2-[2-(methacryloyloxy)ethoxycarbonyl]benzoic acid (CAS No.: 27697-00-3), 2-[[(phenylamino)carbonyl]oxy]ethyl methacrylate (CAS No.: 51727-47-0), 2-tert-butyl-6-[(3-tert-butyl-2-hydroxy-5-methylphenyl)methyl]-4-methylphenyl prop-2-enoate (CAS No.: 61167-58-6), (5-ethyl-1,3-dioxan-5-yl)methyl acrylate (CAS-Nr. 66492-51-1), (2-oxo-1,3-dioxolan-4-yl)methyl methacrylate (CAS No.: 13818-44-5), di(ethylene glycol)-2-ethylhexyl ether acrylate (CAS No.: 117646-83-0), (2,2-dimethyl-1,3-dioxolan-4-yl)methyl prop-2-enoate (CAS No.: 13188-82-4), succinic acid mono-[2-(acryloyloxy)ethyl ester] (CAS No.: 50940-49-3), succinic acid mono-[2-(methacryloyloxy)ethyl ester] (CAS No.: 20882-04-6), (2,2-pentamethylene-1,3-oxazolid-3-yl) ethyl methacrylate (CAS No.: 4203-89-8), 2-hydroxy-3-(prop-2-enoyloxy)propyl 2-methyl-2-propylhexanoate (CAS No.: 444649-70-1), 2-[[(butylamino)carbonyl]oxy] ethyl acrylate (CAS No.: 63225-53-6), stearyl acrylate (CAS No.: 4813-57-4), stearyl methacrylate (CAS No.: 32360-05-7), and also the crosslinking reactive monomers diurethane dimethacrylate (isomer mixture) (CAS No.: 72869-86-4), bisphenol A glycerolate dimethacrylate (BIS-GMA, CAS No.: 1565-94-2), bisphenol A dimethacrylate (BIS-DMA, CAS No.: 3253-39-2), ethylene glycol diacrylate (CAS No.: 2274-11-5), ethylene glycol dimethacrylate (CAS No.: 97-90-5), trimethyloylpropane propoxylate triacrylate (CAS No.: 53879-54-2), trimethyloylpropane triacrylate (CAS No.: 15625-89-5) and/or di(trimethylolpropane) tetraacrylate (CAS No.: 94108-97-1). Particularly preferred are 2-hydroxy-3-phenoxy-propyl acrylate, 2-[[(butylamino)carbonyl]oxy]ethyl acrylate, and diurethane dimethacrylate.

The fraction of the reactive monomer/reactive monomers or of the reactive resin/reactive resins is preferably in the range from about 10 to 80 weight percent (wt %), more preferably about 20 to 60 wt %, based on the total mixture of the constituents of the reactive adhesive film. The most greatly preferred is the use of about 30 to 50 wt % of the reactive monomer/reactive monomers or of the reactive resin/reactive resins, based on the total mixture of the constituents of the reactive adhesive film. The total mixture of the constituents of the reactive adhesive film stands here for the total amount of the (a) reactive monomers/reactive resins used, (b) the initiator, (c) the photoredox catalyst, (d) the polymer of monomers comprising n-vinyl compounds, (e) the film-forming polymer, and also any further constituents, present optionally, this amount being obtained as a sum total in weight percent (wt %). Solvents and/or water serve only for preparation and in this consideration are not included in the total mixture of the constituents of the reactive adhesive film. The same is true of solvents which may already be present in the commercially available raw materials.

As used herein, the term "initiator", more particularly radical initiator or radical-forming substance, stands for a compound which is able to initiate a polymerization reaction or crosslinking polymerization reaction of the adhesive film. However, the initiator, more particularly radical initiator, takes part to a very small degree in the reaction events and, consequently, does not form a polymer fraction determining the properties of the adhesive bond.

The reactive adhesive film is admixed with an initiator, more particularly radical initiator. The initiator is preferably selected such that in the mixture with the reactive monomers or reactive resins at temperatures up to 90° C. it does not trigger any polymerization, not even if the mixture is irradiated with UV or blue light. This is the case provided no photoredox catalyst or other activating substance is added to the mixture.

Radical initiators are preferred. In one preferred embodiment, therefore, the light-curing, reactive, pressure sensitive adhesive film comprises a radical initiator as initiator (b). All of the radical initiators known in the prior art may be used. Preferred radical initiators are peroxides, especially hydroperoxides.

In one particularly preferred embodiment the radical initiator is an organic peroxide, such as peroxycarboxylic acids and hydroperoxides. Particularly preferred are hydroperoxides, especially diisopropylbenzene hydroperoxide (CAS No. 26762-93-6). Diisopropylbenzene hydroperoxide is used preferably in the form of a 50 weight percent solution of diisopropyl hydroperoxide in diisopropylbenzene, available under the trade name Peroxan® IHP-50 (from Pergan GmbH, Bocholt, Germany). It is likewise possible to use α,α-dimethylbenzyl hydroperoxide, which is also known as cumene hydroperoxide (CAS No. 80-15-9). Additionally it is possible as well to make use, for example, of p-menthane hydroperoxide (CAS No. 26762-92-5), tert-amyl hydroperoxide (CAS No. 3425-61-4), tert-butyl hydroperoxide (CAS No. 75-91-2) or 1,1,3,3-tetramethylbutyl hydroperoxide (CAS No. 5809-08-5).

The fraction of the radical initiator is preferably in the range from about 0.1 to 10 wt %, more preferably about 0.2 to 4 wt %, based on the total mixture of the constituents of the reactive adhesive film. Most preferably about 0.5 to 2 wt % of radical initiator, based on the total mixture of the constituents of the reactive adhesive film, is used. The total mixture of the constituents of the reactive adhesive film here represents the total amount of the (a) reactive monomers/reactive resins used, (b) of the initiator, (c) of the photoredox catalyst, (d) of the polymer of monomers comprising N-vinyl compounds, (e) of the film-forming polymer, and also, optionally, of further constituents optionally present, which is obtained as the sum total in weight percent (wt %). Solvents and/or water serve only for production and in this consideration are not counted as part of the total mixture of the constituents of the reactive adhesive film. The same is also true of solvents which may already be included in the raw materials available commercially.

As used here, the term "photoredox catalyst" represents a light-sensitive or UV light-sensitive compound which, when excited by light or UV light, is able to mediate the transfer of electrons between chemical compounds that would otherwise react more slowly or not at all. In contrast to a photoinitiator, a photoredox catalyst does not break down into reactive cleavage products on irradiation with light or UV light, but is instead merely placed into an excited state, which in general is relatively long-lived and from which redox processes can be initiated or mediated. In the mixture with the reactive monomers and/or reactive resins at temperatures up to 90° C., the photoredox catalyst preferably does not trigger a polymerization, not even if the mixture is irradiated with UV or blue light. This is the case as long as no radical initiator or other initiating substance is added to the mixture. The photoredox catalyst is therefore not an initiator. On irradiation with UV or blue light, it merely activates the initiator, which then triggers the polymerization.

Photoredox catalysts used may be the photoredox catalysts known to the skilled person. Many of the most frequently used photoredox catalysts are polypyridyl transition metal complexes, of ruthenium and iridium, for example, such as, for example, $Ru(bpm)_3^{2+}$ (e.g. tris(2,2'-bipyrimide) ruthenium(II) dichloride), $Ru(bpz)_3^{2+}$ (e.g., tris(2,2'-bipyrazine)ruthenium bis(hexafluorophosphate)), $Ru(bpy)_3^{2+}$, $Ru(phen)_3^{2+}$ (e.g., dichlorotris(1,10-phenanthroline)ruthenium(II) chloride), $Ir[dF(CF_3)ppy]_2(dtbbpy)^+$ (e.g., [4,4'-bis (1,1-dimethylethyl)-2,2'-bipyridine-N1,N1'] bis[3,5-difluoro-2-[5-(trifluoromethyl)-2-pyridinyl-N]phenyl-C]iridium (III) hexafluorophosphate), $Ir(ppy)_3$, $Ir(ppy)_2(dtbbpy)^+$ (e.g., [Ir(dtbbpy)(ppy)2] [PF6]), $Ir(Fppy)_3$ or fac-$Ir(ppy)_3$ (fac-tris (2-phenylpyridine)iridium(III)). Copper complexes can also be used, however, such as $Cu(dap)^{2+}$ (e.g., copper 2,9-bis (4-methoxyphenyl)-1,10-phenanthroline chloride).

In one preferred embodiment, the photoredox catalyst is a transition metal complex with ruthenium as central atom and bipyridine or a singularly or multiply substituted bipyridine derivative as ligand. In another preferred embodiment, the photoredox catalyst is a transition metal complex with iridium as central atom and phenylpyridine or a singly or multiply substituted phenylpyridine derivative as ligand.

In one particularly preferred embodiment, the photoredox catalyst is selected from the following:

i. [Tris(2,2'-bipyridyl)ruthenium(II)]$^{2+}$, [Ru(bpy)$_3$]$^{2+}$—Formula (Ia):

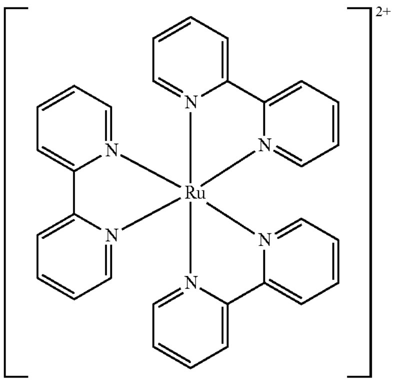

ii. Tris[2-(2,4-difluorophenyl)pyridine]iridium(III), Ir(Fppy)$_3$; CAS No.: 387859-70-3—Formula (Ib):

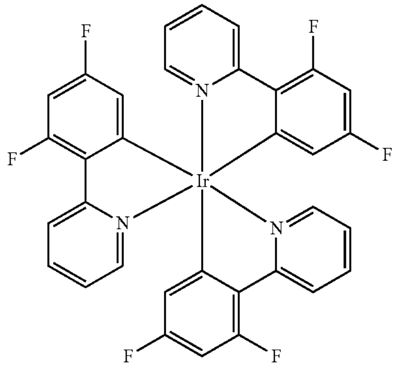

iii. Tris(2-phenylpyridinato)iridium(III), Ir(ppy)$_3$; CAS No.: 94928-86-6—Formula (Ic):

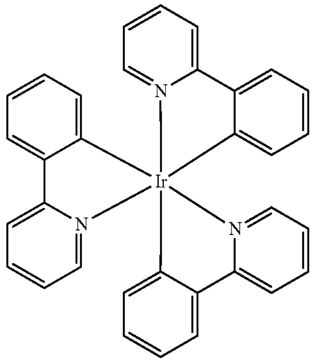

The preferred counterion to the cation of the Formula (Ia) is chloride. The corresponding commercially available product includes water of crystallization. The particularly preferred embodiment of the photoredox catalyst of the Formula (Ia) is therefore tris(2,2'-bipyridyl)ruthenium(II) chloride hexahydrate, (CAS No.: 50525-27-4), available from CHEMOS GmbH & Co. KG (Altdorf, Germany, http://www.chemos.de), and of the photoredox catalysts of the Formula (Ic). The photoredox catalyst having the Formula (Ib) is available from Strem (Europe) (Bischheim, France, http://www.strem.com).

The fraction of the photoredox catalyst is preferably in the range of up to about 1 wt %, more preferably up to 0.5 wt %, based on the total mixture of the constituents of the reactive adhesive film. Most preferably about 0.01-0.1 wt % of photoredox catalyst, based on the total mixture of the constituents of the reactive adhesive film. The total mixture of the constituents of the reactive adhesive film here represents the total amount of the (a) reactive monomers/reactive resins used, (b) of the initiator, (c) of the photoredox catalyst, (d) of the polymer of monomers comprising N-vinyl compounds, (e) of the film-forming polymer, and also, optionally, of further constituents optionally present, which is obtained as the sum total in weight percent (wt %). Solvents and/or water serve only for production and in this consideration are not counted as part of the total mixture of the constituents of the reactive adhesive film. The same is also true of solvents which may already be included in the raw materials available commercially.

The light-curing, reactive, pressure sensitive adhesive film preferably contains no activating or initiating constituents, or constituents influencing the activation and initiation process, other than those stated in this specification.

The reactive adhesive film comprises a polymer obtained by radical polymerization of monomers containing carbon-carbon double bonds, characterized in that these monomers comprise N-vinyl compounds. Typically 10 wt %, 20 wt %, 30 wt %, 40 wt %, 50 wt %, 60 wt %, 70 wt %, 80 wt %, 90 wt % or 100 wt % of the monomers of the polymer consist of N-vinyl compounds. Advantageously at least 50 wt % or at least 80 wt %, preferably at least 90 wt %, more preferably 100 wt % of the monomers of the polymer are N-vinyl compounds. One preferred embodiment of the light-curing, reactive, pressure sensitive adhesive film is characterized in that at least 50 wt % of the monomers of the polymer (d) are N-vinyl compounds. More preferably, at least 50 wt % or at least 80 wt %, and more preferably still 100 wt %, of the monomers of the polymer (d) are N-vinyl compounds. The term "polymer" here is a generic term both for homopolymers and for copolymers. The polymer obtained by radical polymerization of monomers containing carbon-carbon double bonds itself contains no carbon-carbon double bond(s), or only such bonds as are formed as a result of chain termination reactions (disproportionation reactions). It is not a reactive resin. In particular, it is not capable of a radical chain polymerization.

The monomers containing carbon-carbon double bonds are preferably selected from acrylic acid, acrylic esters, methacrylic acid, methacrylic esters and/or vinyl compounds. Particularly preferred are linear alkyl acid esters having 2 to 10 carbon atoms in the alkyl radical. These are ethyl acrylate, n-propyl acrylate, n-butyl acrylate, n-pentyl acrylate, n-hexyl acrylate, n-heptyl acrylate, n-octyl acrylate, n-nonyl acrylate, and n-decyl acrylate. Especially preferred is n-butyl acrylate.

Branched noncyclic acrylic esters having 4 up to and including 12 carbon atoms in the alkyl radical of the alcohol are likewise preferably selected. Especially preferred are 2-ethylhexyl acrylate (EHA), 2-propylheptyl acrylate, isooctyl acrylate, isobutyl acrylate, isoamyl acrylate and/or isodecyl acrylate.

The N-vinyl compounds of the polymer are advantageously compounds corresponding to the Formula (II) or comprise a structural unit of the Formula (II), (II)

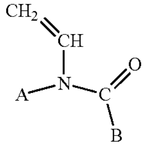

where

A is an organic radical R or H,

B is an organic radical R or H or OR or OH or $NR_2$ or NHR or $NH_2$,

R independently at each occurrence is a substituted or unsubstituted branched, cyclic or linear $C_{1-20}$ alkyl radical or $C_{2-20}$ alkenyl radical; or is a substituted or unsubstituted aryl or heteroaryl, A and B may form a ring, for example lactam or oxazolidinone.

Examples of such N-vinyl compounds are N-vinylacetamide (CAS No. 5202-78-8), N-vinylcaprolactam (CAS No.: 2235-00-9), N-vinylpyrrolidone (CAS No.: 88-12-0), N-vinyl-N-methylacetamide (CAS No. 3195-78-6), 5-methyl-3-vinyl-2-oxazolidinone (CAS No. 3395-98-0) or N-vinylisobutyramide. Preferred are N-vinyl-containing lactams and N-vinyl-containing oxazolidinones. It is advantageous if the N-vinyl compounds of the polymer (d) are N-vinylcaprolactam (CAS No.: 2235-00-9), N-vinylpyrrolidone (CAS No.: 88-12-0) or 5-methyl-3-vinyl-2-oxazolidinone (CAS No.: 3395-98-0). Preferred are N-vinylcaprolactam or N-vinylpyrrolidone, and in one particularly preferred implementation the light-curing, reactive, pressure sensitive adhesive film is characterized in that the N-vinyl compounds of the polymer (d) comprise N-vinylcaprolactam.

The fraction of the polymer of monomers comprising N-vinyl compounds is preferably in the range from about 1 to 50 wt %, more preferably approximately in the range from 5 to 30 wt %, based on the total mixture of the constituents of the reactive adhesive film. Even more preferably, 8 to 25 wt %, most preferably about 10 to 20 wt %, of the polymer of monomers comprising N-vinyl compounds is used, based on the total mixture of the constituents of the reactive adhesive film.

The total mixture of the constituents of the reactive adhesive film here represents the total amount of the (a) reactive monomers/reactive resins used, (b) of the initiator, (c) of the photoredox catalyst, (d) of the polymer of monomers comprising N-vinyl compounds, (e) of the film-forming polymer, and also, optionally, of further constituents optionally present, which is obtained as the sum total in weight percent (wt %). Solvents and/or water serve only for production and in this consideration are not counted as part of the total mixture of the constituents of the reactive adhesive film. The same is also true of solvents which may already be included in the raw materials available commercially.

The reactive adhesive film comprises a film-forming polymer. Without wishing to be tied to a particular theory, it is thought that the film-forming polymer physically binds the reactive monomers/reactive resins and the rest of the substances, or restricts their mobility. The film-forming polymer appears to act, as it were, like a sponge and to prevent or retard the flow of the reactive monomers/reactive resins and of the rest of the substances. The polymer is therefore intended to give the reactive adhesive film its film form and to stabilize that form. The film-forming polymer is to be substantially inert towards the reactive monomers/reactive resins and the rest of the substances. Inert in this context means that the reactive monomers/reactive resins, before the light curing under suitably chosen conditions, more particularly at room temperature (23° C.), substantially do not react with the film-forming polymer.

Suitable film-forming polymers for use are thermoplastic polymers, such as polyurethanes, polyesters or copolyesters, polyamides or copolyamides, polyacrylic esters, acrylic acids/acrylic ester copolymers (such as a copolymer of n-butyl acrylate, ethyl acrylate and acrylic acid), polymethacrylic esters, and methacrylic acid/methacrylic ester copolymers. Chemically or physically crosslinked substances of the aforesaid compounds are likewise conceivable. It is also possible, furthermore, to use blends of different thermoplastic polymers. In addition, elastomers, thermoplastic elastomers and thermosets are also conceivable, alone or in a mixture, as film-forming polymers.

Preference is given to thermoplastic polymers having a crystalline melting temperature of less than 100° C. and/or a softening temperature of less than 100° C. The term "softening temperature" in this context represents the temperature beyond which the thermoplastic pellets stick to themselves. If the film-forming polymer is a semicrystalline thermoplastic polymer, then as well as its softening temperature (which is related to the melting of the crystallites) it very preferably has a glass transition temperature of at most 25° C., preferably at most 0° C.

In one preferred embodiment a thermoplastic polyurethane is used. Examples of commercially available thermoplastic polyurethanes include Desmocoll® 530/1 and Desmocoll® 540/3 and also Desmomelt® 530 from Covestro AG (Leverkusen, Germany) or IROSTIC® S-6558-06 and IROSTIC® S 8612 from Huntsman (Huntsman Holland B.V., Botlek-Rotterdam, Netherlands) or alternative variants from these product lines. Additionally, there are the product lines Elastollan® from BASF (Ludwigshafen, Germany) or Pearlbond from Lubrizol (Lubrizol Advanced Materials Europe BVBA, Brussels, Belgium). The thermoplastic polyurethane preferably possesses a softening temperature of less than 100° C., more particularly less than 80° C. Preferred examples of such thermoplastic polyurethanes are Desmomelt® 530 and IROSTIC® S-6558-06. Desmomelt® 530 is a hydroxyl-terminated, largely linear, thermoplastic, highly crystallizing polyurethane elastomer. IROSTIC® S-6558-06 according to manufacturer indication is a linear thermoplastic polyurethane for solvent-based adhesives. The features according to manufacturer indication are as follows: very low crystallization rate, long open time, very low activation temperature.

Particular preference is given to thermoplastic polyurethanes having a very low crystallization rate. Especially preferred are thermoplastic polyurethanes which in their DSC diagram in the temperature range between minus 140° C. and plus 250° C. in the second heating curve show no signal (peak) for a crystalline melting point. In one preferred embodiment, the light-curing, reactive, pressure sensitive adhesive film is characterized in that the film-forming polymer (e) is a thermoplastic polyurethane whose DSC diagram in the temperature range between minus 140° C. and plus 250° C. in the second heating curve shows no signal for a crystalline melting point. The heating, cooling and reheating here take place each at a heating rate of 10 kelvins per minute (for 10 mg sample quantity). The abbreviation DSC stands for the known thermoanalytical method of Differential Scanning calorimetry according to DIN EN ISO 11357-1 to -8. The method for determining the melting and crystallization temperatures and also the enthalpies of fusion and of crystallization is laid down in DIN EN ISO 11357-3.

In one particularly preferred embodiment, therefore, IROSTIC® S-6558-06 is used as film-forming polymer since it has a very low crystallization rate and in the DSC diagram in the temperature range between minus 140° C. and plus 250° C. in the second heating curve shows no signal (peak) of a crystalline melting point.

The fraction of the film-forming polymer is preferably in a range from about 10 to 90%, more preferably about 20 to 60 wt %, based on the total mixture of the constituents of the reactive adhesive film. Even more preferably, 30 to 50 wt %, most preferably about 35 to 45 wt %, of the film-forming polymer is used, based on the total mixture of the constituents of the reactive adhesive film. The total mixture of the constituents of the reactive adhesive film here represents the total amount of the (a) reactive monomers/reactive resins used, (b) of the initiator, (c) of the photoredox catalyst, (d) of the polymer of monomers comprising N-vinyl compounds, (e) of the film-forming polymer, and also, optionally, of further constituents optionally present, which is obtained as the sum total in weight percent (wt %). Solvents and/or water serve only for production and in this consideration are not counted as part of the total mixture of the constituents of the reactive adhesive film. The same is also true of solvents which may already be included in the raw materials available commercially.

The reactive adhesive film may optionally comprise further additives and/or auxiliaries which are known in the prior art. The fraction of the further additives and/or auxiliaries may be in the range from about 0 to about 20 wt %, preferably 0 to about 15 wt %, more preferably 0 to about 10 wt %, and most preferably 0 to about 5 wt %, based on the total mixture of the constituents of the reactive adhesive film. Examples of further additives and/or auxiliaries include fillers, dyes, nucleating agents, rheological additives (for example fumed silica), expandants, adhesion-boosting additives (adhesion promoters, especially silanes and tackifier resins), compounding agents, plasticizers and/or aging inhibitors, light stabilizers and UV protectants, in the form of primary and secondary antioxidants, for example. The further constituents of the reactive adhesive films may at the same time also be reactive monomers. This may be the case, especially preferably, with silane adhesion promotors. Mention may be made in this context for example of 3-trimethoxysilylpropyl methacrylate (CAS No.: 2530-85-0), available under the trade name Dynasylan® MEMO (Evonik AG, Essen, Germany).

The light-curing, reactive, pressure-sensitive adhesive film is present in the form of a film. As used herein, the term "adhesive film" (or else film of adhesive or layer of adhesive) is intended to embrace a completely or incompletely provided application of the light-curing reactive adhesive mixture as described hereinafter. For example, application of the adhesive in the form of dots, not fully covering the substrate surface(s) to be bonded, may likewise lead to permanent bonding.

In one preferred embodiment, the light-curing, reactive, pressure sensitive film of adhesive comprises (a) 10 to 80 wt % of at least one reactive monomer or reactive resin, (b) 0.1 to 10.0 wt % of initiator, (c) up to 1.0 wt % of photoredox catalyst, (d) 1.0 to 50.0 wt % of polymer obtained by radical polymerization of monomers containing carbon-carbon double bonds, characterized in that these monomers comprise N-vinyl compounds, and (e) 10 to 90 wt % of film-forming polymer and also optionally (f) 0 to about 15 wt % of further additives and/or auxiliaries. More preferred still are (a) 20 to 60 wt % of at least one reactive monomer or reactive resin, (b) 0.2 to 4.0 wt % of initiator, (c) up to 0.5 wt % of photoredox catalyst, (d) 5.0 to 30.0 wt % of polymer obtained by radical polymerization of monomers containing carbon-carbon double bonds, characterized in that these monomers comprise N-vinyl compounds, and (e) 20 to 60 wt % of film-forming polymer and also optionally (f) 0 to about 10 wt % of further additives and/or auxiliaries. Most preferred are (a) about 39 wt % of at least one reactive monomer or reactive resin, (b) 1.3 wt % of initiator, (c) about 0.03 wt % of photoredox catalyst, (d) about 15 wt % of polymer obtained by radical polymerization of monomers containing carbon-carbon double bonds, characterized in that these monomers comprise N-vinyl compounds, (e) about 41 wt % of film-forming polymer, and (f) about 4% by weight of additive.

In one particularly preferred embodiment, the light-curing, reactive, pressure sensitive adhesive film comprises a mixture of the following constituents: thermoplastic polyurethane, especially Irostic® S-6558-06 or Desmomelt® 530, poly(N-vinylcaprolactam) or poly(N-vinylpyrrolidone), 2-hydroxy-3-phenoxypropyl acrylate or 2-[[(butylamino)carbonyl]oxy]ethyl acrylate, rheological additive, especially fumed silica, diisopropyl hydroperoxide and tris(2,2'-bipyridyl)ruthenium(II) chloride hexahydrate.

A particularly preferred embodiment contains about 35-45 wt % of the film-forming polymer, 10-20 wt % of poly(N-vinylcaprolactam) or poly(N-vinylpyrrolidone), 30-50 wt % of 2-hydroxy-3-phenoxypropyl acrylate or 2-[[(butylamino)carbonyl]oxy]ethyl acrylate, 2-5 wt % of rheological additive, 0.5-2.0 wt % of diisopropyl hydroperoxide and 0.01-0.1 wt % of tris(2,2'-bipyridyl)ruthenium(II) chloride hexahydrate, based on the total mixture of the constituents of the reactive adhesive film.

The total mixture of the constituents of the reactive adhesive film as used herein represents the total amount of the (a) reactive monomers/reactive resins used, (b) of the initiator, (c) of the photoredox catalyst, (d) of the polymer of monomers comprising N-vinyl compounds, (e) of the film-forming polymer, and also, optionally, of the further constituents optionally present, which is obtained as the sum total in weight percent (wt %). Solvents and/or water serve only for production and in this consideration are not counted as part of the total mixture of the constituents of the reactive adhesive film. The same is also true of solvents which may already be included in the raw materials available commercially.

The reactive adhesive film preferably possesses a layer thickness (measured using a standard commercial thickness-measuring instrument, e.g. DM 2000 from Wolf Messtechnik GmbH) in the range from about 20 to 200 μm, preferably about 30 to 100 μm, more preferably about 40 to 60 μm and very preferably about 50 μm. For producing greater layer thicknesses, it may be advantageous to laminate multiple adhesive-film layers together.

The reactive adhesive film is further characterized in that before the light curing it possesses pressure sensitive adhesive properties. Pressure sensitive adhesive compounds according to Römpp (Römpp Online 2013, document code RD-08-00162) are those viscoelastic adhesive films whose set dry film at room temperature is permanently tacky and remains adhesive. The pressure sensitive adhesion is accomplished by gentle applied pressure immediately on virtually all substrates. A gentle applied pressure here refers to an applied pressure of greater than 0 bar exerted for a time of greater than 0 seconds.

A suitable reactive adhesive according to one variant of the disclosure is an adhesive film comprising at least one layer of an adhesive, with the adhesive comprising a polymer component and at least one peroxide, and with the polymer component comprising at least 50 wt % of thermoplastic polymers which have no C═C double bonds and no CEC triple bonds.

An adhesive film of this kind is disclosed and comprehensively described in EP 3 784 742 A1.

Peroxides selected accordingly are those for which the 1-minute half-life temperature $T(t_{1/2}=1\ \mathrm{min})$ in solution (0.1 molar in monochlorobenzene) does not exceed 200° C., with preferably 190° C. and very preferably 180° C. not being exceeded.

The peroxides are more particularly those which, as well as satisfying the above definition, also carry an organyl group on each oxygen atom. Peroxides used accordingly are compounds of the general structure R—O—O—R', where the radicals R and R' are organyl groups, which are chosen independently of one another or else may be identical, and where R and R' may also be joined to one another, such that via the peroxy group (—O—O—) a ring is formed, resulting in a structure of the type

Organyl groups are organic radicals—irrespective of which functional group they contain—having one or, less commonly, two or more free valences on one carbon atom. Examples thereof are acetonyl groups, acyl groups (e.g., acetyl groups, benzoyl groups), alkyl groups (e.g., methyl groups, ethyl groups), alkenyl groups (e.g., vinyl groups, allyl groups), alkynyl groups (propargyl groups), aminocarbonyl groups, ampicilloyl groups (radicals derived from ampicillin), aryl groups (e.g., phenyl groups, 1-naphthyl groups, 2-naphthyl groups, 2-thiophenyl groups, 2,4-dinitrophenyl groups), alkylaryl groups (e.g., benzyl groups, triphenylmethyl groups), benzyloxycarbonyl groups (Cbz), tert-butoxycarbonyl groups (Boc), carboxyl groups, fluoren-9-ylmethoxy)carbonyl groups (Fmoc), furfuryl groups, glycidyl groups, haloalkyl groups (e.g., chloromethyl groups, 2,2,2-trifluoroethyl groups), indolyl groups, nitrile groups, nucleosidyl groups, trityl groups, to name but a few.

In comparison to the hydroperoxides, for example, peroxides of the general structure R—O—O—R' (including in cyclic form) have the advantage that on thermal activation of the adhesive they do not liberate any water in the sense of primary cleavage products. It is desirable as far as possible to reduce volatile constituents having boiling points above 150° C., preferably having boiling points above 120° C., and preferably to avoid them entirely, in order in particular to prevent bubbling at the bond site and hence weakening of that site. Accordingly, R and R' in the peroxides should with particular preference be selected such that they too do not lead to the formation of highly volatile primary cleavage products—such as, for example, carbon dioxide, isopropanol.

The adhesive films have emerged as being outstandingly amenable to prelamination and amenable to activation in the hot injection step to develop the ultimate bond strength, meaning that they have the capacity for chemical reaction, in particular for a rapid crosslinking and/or curing reaction, after appropriate activation. Activation is accomplished, in particular, thermally, in other words by supply of heat. In principle, however, other methods of activation are also known for latent-reactive adhesive tapes, such as, for example, by induction, by microwaves, by irradiation with UV radiation, laser treatment, plasma treatment. Very preferably, however, the activation takes place by means of thermal supply of energy, and the other methods of activation may be used, in particular and optionally, in a supplementary (additive) way, such as by the mixing of UV photoinitiators into the adhesive.

During the supply of heat, the adhesive melts and is able to wet the substrate surfaces to be bonded, outstandingly, and the crosslinking or curing reaction results in an increase in cohesion of the adhesive. This is achieved through use of thermoplastic base polymers. As a result of the reactive bonding, therefore, the adhesive films are capable of generating high bonding strengths to the underlying substrates to which they are bonded. These bonding strengths may take on orders of magnitude, for example, which exceed by a factor of 10 or more those of customary pressure sensitive adhesives.

The adhesives used and the corresponding adhesive films have latent reactivity. Latent reactivity refers to those activatable adhesive systems which can be stored stably over prolonged periods without activation. Latent-reactive adhesive films are those which under standard conditions (23° C. [296.15 K]; 50% rh) and especially at elevated storage temperatures (in particular up to 40° C. [316.15 K]) do not cure or cure only over a period of months and are therefore storage-stable, but which at significantly higher temperatures can be activated and undergo curing and/or crosslinking. The latent reactivity offers the advantage that these adhesive films can be stored, transported and further processed (converted, for example) under standard conditions and in particular at elevated temperatures of up to 40° C., before then being employed at the bonding site and cured.

During the storage time, the adhesives are not to undergo significant alteration, so that the bonding properties of an adhesive system employed for bonding freshly after production are not substantially different from the corresponding properties of an adhesive system employed after prolonged storage for otherwise comparable bonding.

The compositions are notable for the fact that on the one hand they have latent reactivity and on the other hand are curable rapidly at elevated temperature.

The at least one peroxide, or the two or more peroxides used, is or are selected such as to possess comparatively high decomposition rates or low half-lives $[t_{1/2}]$ at elevated temperatures—temperatures above their activation temperature. The decomposition rate of the peroxides is a characteristic criterion of their reactivity and is quantified by the statement of the half-lives at certain temperatures $[t_{1/2}(T)]$, with the half-life, as usual, representing the time after which half of the peroxide has undergone decomposition under the specified conditions. The higher the temperature, the lower in general the half-life of decomposition. Consequently, the higher the decomposition rate, the lower the half-life. The half-life temperature $[T(t_{1/2})]$ is the temperature at which the half-life corresponds to a specified value—for example, the 10-hour half-life temperature $[T(t_{1/2}=10\ \mathrm{h})]$ is the temperature at which the half-life of the compound under investigation amounts to exactly hours, and the 1-minute half-life temperature $[T(t_{1/2}=1\ \mathrm{min})]$ is the temperature at which the half-life of the compound under investigation is exactly 1 minute, and so on.

The at least one peroxide, or the two or more peroxides used, is or are selected such that the 1-minute half-life temperature $T(t_{1/2}=1\ min)$ in solution does not exceed 200° C., preferably does not exceed 190° C., and very preferably does not exceed 180° C.

The above condition is deemed to have been met in particular if the peroxide in question has a corresponding half-life temperature value at least in monochlorobenzene (0.1 molar solution).

Such half-lives may be ascertained experimentally (determination of concentration by means of DSC or titration) and can also be found in the relevant literature. The half-lives are additionally obtainable by calculation from the constants of Arrhenius frequency factor and decomposition activation energy that are specific to the particular peroxide, for the specified conditions in each case. The relations here are as follows:

$$dc/dt=k\cdot c \quad [1]$$

$$\ln(c_1/c_0)=-k\cdot t \quad [2]$$

$$t_{1/2}=\ln 2/k \text{ for } c_t(t_{1/2})=c_0/2 \quad [3]$$

$$k=A\cdot e^{-Ea/RT} \quad [4]$$

where $c_0$=initial concentration
- $c_t$=concentration at time t
- $c_t(t_{1/2})$=concentration at the half-life time
- $t_{1/2}$=half-life
- k=decomposition constant
- A=Arrhenius frequency factor
- Ea=activation energy for peroxide decomposition
- R=general gas constant (R=8.3142 J/(mol·K))
- T=absolute temperature The half-lives and half-life temperatures stated in this specification are based in each case on a 0.1 molar solution of the corresponding peroxide in monochlorobenzene, unless individually indicated otherwise.

By way of the constants of Arrhenius frequency factor and decomposition activation energy that can be researched or calculated from researchable values for the respective conditions such as the solvent used, for instance—it is possible to convert the half-lives and the half-life temperatures for other respective conditions—such as in different solvents, for instance and so to make them comparable.

Preference is given, moreover, to using those peroxides which at moderate temperatures—particularly those well below their activation temperatures—possess high half-lives. In this way it is possible to achieve good latency, i.e., an effective storage stability on the part of the thermally activatable adhesive films comprising the peroxides. Correspondingly, the at least one peroxide, or the two or more peroxides used, is or are selected such that the half-life thereof at 80° C.—i.e., after a preliminary laminating operation, for instance—is at least 13.5 hours, more particularly at least 22.5 hours, preferably at least 69 hours, more preferably at least 700 hours. This allows the thermally activatable adhesive tape at 80° C. to have a sufficient working time and application time, in that after an hour at least 95% of the peroxide originally used (corresponding to $t_{1/2}$=13.5 h), more particularly at least 97% (corresponding to $t_{1/2}$=22.5 h), more preferably at least 99% (corresponding to $t_{1/2}$=69 h), and very preferably at least 99.9% of the peroxide used is still present and therefore has not yet been available for a reaction.

In order to guarantee a storage-stable system, the half-life under customary storage conditions—which may customarily be approximately up to 40° C.—ought to be high. The peroxides used ought therefore preferably to be selected such that their half-life at the storage temperature, more preferably up to 40° C., is still sufficient that after 9 months (274 days) at least 75%, preferably 85%, more preferably 95% or very preferably more than 95% of the peroxide is still available for crosslinking. The corresponding half-lives may be ascertained using the relations stated above.

Examples of suitable peroxides are representatives from the following groups: dialkyl peroxides, diacyl peroxides, peroxy esters, peroxydicarbonates, peroxyketals, cyclic peroxides, for which the stated values in respect of 1-minute half-life temperature, preferably also in respect of half-life at 80° C., more preferably also in respect of half-life at 40° C., are realized.

Stated below illustratively are a number of representatives, advantageously employable, from the various groups, for which this applies:

Dialkyl peroxides: di-tert-amyl peroxide, di-tert-butyl peroxide, tert-butyl cumyl peroxide, dicumyl peroxide, 2,5-dimethyl-2,5-di(tert-butylperoxy)hexane, 2,5-dimethyl-2,5-di(tert-butylperoxy)hex-3-yne, di-(2-tert-butylperoxyisopropyl)benzene;

Diacylperoxides: dibenzoyl peroxide, dilauroyl peroxide, diisobutyryl peroxide, didecanoyl peroxide, di(3,5,5-trimethylhexanoyl) peroxide;

Ketone peroxides: acetylacetone peroxide, cyclohexanone peroxide, methyl ethyl ketone peroxide, methyl isobutyl ketone peroxide;

Peroxyesters: tert-butyl peroxyacetate, tert-butyl peroxybenzoate, tert-butyl peroxydiethylacetate, tert-amyl peroxy-2-ethylhexyl carbonate, tert-butyl peroxyisopropyl carbonate, tert-butyl peroxy-2-ethylhexyl carbonate, tert-amyl peroxy-2-ethylhexanoate, tert-butyl peroxy-2-ethylhexanoate, 1,1,3,3-tetramethylbutyl peroxy-2-ethylhexanoate, tert-butyl peroxy-3,5,5-trimethylhexanoate, tert-butyl-peroxyisobutyrate, tert-butyl monoperoxymaleate, tert-amyl peroxyneodecanoate, tert-butyl peroxyneodecanoate, cumene peroxyneodecanoate, 1,1,3,3-tetramethylbutyl peroxyneodecanoate, tert-butyl peroxyneoheptanoate, tert-amyl peroxypivalate, tert-butyl peroxypivalate, 1,1,3,3-tetramethylbutyl peroxypivalate, 2,5-dimethyl-2,5-di(2-ethylhexanoylperoxy)hexane; Peroxydicarbonates: di-n-amylperoxydicarbonate, di-(2-ethylhexyl) peroxydicarbonate, di-n-butyl peroxydicarbonate, dicetyl peroxydicarbonate, dimyristyl peroxydicarbonate, di-(4-tert-butylcyclohexyl) peroxydicarbonate; Peroxyketals: 1,1-di(tert-butylperoxy)-3,3,5-trimethylcyclohexane, 1,1-di(tert-butylperoxy)-cyclohexane, 2,2-di(tert-butylperoxy) butane; Cyclic peroxides: 3,6,9-triethyl-3,6,9-trimethyl-1,4,7-triperoxononane.

Used with particular advantage is dicumyl peroxide (bis (1-methyl-1-phenylethyl) peroxide), which has the following half-lives: 812 h at 80° C. (corresponding to less than 0.1% of the original amount of peroxide at 80° C. within one hour), 10 h at 112° C.; 1 h at 132° C.; 0.1 h=6 min at 154° C.; 1 min at 172° C.; all aforesaid values in solution (0.1 molar, monochlorobenzene).

Dicumyl peroxide is selected with particular preference since it allows particularly storage-stable adhesive films to be obtained which are also resistant to combined heat and humidity. Two or more peroxides may also be used. In that case, preferably, dicumyl peroxide is selected as one of the two or more peroxides.

The peroxide or peroxides used, especially dicumyl peroxide, are selected preferably—depending in particular on their reactivity—in an amount such that the resultant bond produced with the adhesive film has the desired properties and more particularly fulfils the specifications defined in more detail later on below, in the push-out tests (as a fresh sample at least 4 MPa, preferably at least 3 MPa even after defined heat/humidity storage, more preferably not more than 10% detraction after six-week storage under standard conditions, and also, furthermore, not more than 10% detraction after six-week storage and heat/humidity storage; for the details, see the respective information later on below). In order to meet these requirements peroxide amounts—for example, the amount of dicumyl peroxide of not less than 0.5 wt % have emerged as being very advantageous, advantageously not less than 1 wt %, more advantageously not less than 2 wt %, especially advantageously not less than 3 wt %, and not more than 10 wt %, preferably not more than 8 wt %, very preferably not more than 7 wt %.

Peroxides which do not satisfy the requirements are, for example, a multiplicity of hydroperoxides, these being compounds of the general formula R—O—O—H, in which R is an organyl group.

The list of hydroperoxides not leading to the desired success includes, for example, cumene hydroperoxide, tert-butyl hydroperoxide, p-menthane hydroperoxide, 1,1,3,3-tetramethylbutyl hydroperoxide, tert-amyl hydroperoxide, and diisopropylbenzene monohydroperoxide.

It has emerged that these hydroperoxides are not capable of developing effective crosslinking within a sufficiently short processing time on thermal activation of the adhesives, and of bringing about the desired advantages. Under thermal stress, moreover, hydroperoxides may give off highly volatile primary cleavage products (see also above).

The adhesive additionally has a polymer component which consists of a single polymer or is composed of two or more polymers. At least one of the polymers forming the polymer component is a thermoplastic polymer which has no carbon-carbon double bonds, and is thus a saturated polymer.

Saturated thermoplastic polymers make up at least 50 wt % of the polymer component and may amount to up to 100 wt % of the polymer component, which in the latter case is therefore formed exclusively by one or more saturated thermoplastic polymers. Where only one thermoplastic polymer is present, it is present at from 50 wt % to 100 wt % in the polymer component.

In a first variant embodiment in this case, the adhesive may be composed exclusively of the polymer component and of the peroxide or peroxides.

Great preference is given to using those polymers whose glass transition temperature is not more than −25° C., more preferably not more than −35° C. All glass transition temperature data within this specification relate to the determination of the static glass transition temperature TG by means of dynamic scanning calorimetry (DSC) according to DIN 53765, and specifically to the glass transformation temperature Tg according to DIN 53765:1994-03, unless otherwise stated in a specific case.

Low glass transition temperatures in the polymers used have had beneficial effects on good shock resistance properties of the assemblies produced using the corresponding adhesive films.

Suitable saturated thermoplastic polymers may be selected advantageously from the group of the polyolefins (for example, ethylene-vinyl acetate copolymers (EVA)), polyethers, copolyethers, polyesters, copolyesters, polyamides, copolyamides, polyacrylic esters, acrylic ester copolymers, polymethacrylic esters, methacrylic ester copolymers, thermoplastic polyurethanes, and also chemically or physically crosslinked substances of the aforesaid compounds. It is also possible, furthermore, to use blends of different thermoplastic polymers, more particularly from the classes of compound above. Particular preference is given to using semicrystalline thermoplastic polymers.

Preferred examples are polyolefins, especially semicrystalline polyolefins. Preferred polyolefins are produced from ethylene, propylene, butylene and/or hexylene, where in each case the pure monomers may be polymerized, or mixtures of the stated monomers are copolymerized. Through the polymerization process and through the selection of the monomers it is possible to direct the physical and mechanical properties of the polymer, such as the softening temperature and/or specific mechanical properties, for example.

As thermoplastic polymers it is possible with preference to use thermoplastic elastomers, either alone or else in combination with one or more thermoplastic polymers from the abovementioned classes of compound. Particular preference is given to using saturated semicrystalline thermoplastic elastomers.

Particularly preferred are thermoplastic polymers having softening temperatures of less than 100° C. In this context the term "softening point" stands for the temperature beyond which the thermoplastic pellets stick to themselves. If these are semicrystalline thermoplastic polymers, then the pellets advantageously have not only their softening temperature (which is associated with the melting of the crystallites)—more particularly as characterized above—but also a glass transition temperature of at most 25° C.

Very advantageous examples of thermoplastic elastomers in the sense of the thermoplastic polymers are thermoplastic polyurethanes (TPUs). Polyurethanes are polycondensates constructed typically of polyols and isocyanates and containing soft and hard segments. The soft segments consist, for example, of polyesters, polyethers, polycarbonates, in each case preferably aliphatic in nature, and polyisocyanate hard segments. Depending on the nature and the ratio in which the individual components are used, materials are obtainable which can be used advantageously. Raw materials available to the formulator for this purpose are given for example in EP 0 894 841 B1 and EP 1 308 492 B1.

One preferred embodiment according to the disclosure uses a thermoplastic polyurethane without C—C multiple bonds. The thermoplastic polyurethane preferably possesses a softening temperature of less than 100° C., more particularly less than 80° C.

In a further preferred embodiment, a mixture of two or more saturated thermoplastic polyurethanes is used. The mixture of the thermoplastic polyurethanes preferably possesses a softening temperature of less than 100° C., more particularly less than 80° C.

One particularly preferred embodiment uses Desmomelt® 530 as saturated thermoplastic polymer. Desmomelt® 530 is a largely linear, thermoplastic, highly crystalline polyurethane elastomer which is available commercially from Covestro AG, (formerly Bayer Material Science AG). Desmomelt may also be used in unison with other polymers—especially saturated thermoplastic polymers, preferably further saturated thermoplastic polyurethanes.

The adhesive is admixed preferably with at least one adhesion-boosting additive, also referred to as an adhesion promoter. Adhesion promoters are substances which improve the strength of adhesion of the adhesive film on the substrate to be bonded. This may be accomplished in particular through an increase in the wettability of the substrate surfaces and/or through the formation of chemical bonds between the substrate surface and the adhesive or components of the adhesive.

One advantageous version concerns an adhesive which is composed exclusively of the polymer component, the peroxides, and the adhesion promoter—the latter more particularly in the form of the silanes described below—and more particularly such that the polymer component used comprises exclusively one or more—especially semicrystalline—saturated thermoplastic polymers.

Silane adhesion promoters can be used advantageously as adhesion promoters. Silane adhesion promoters utilized are, in particular, compounds of the general form $RR'_aR''_bSiX_{(3-a-b)}$, where R, R' and R" are selected independently of one another and each denote a hydrogen atom bonded to the Si atom, or an organic functionalized radical bonded to the Si atom, X denotes a hydrolyzable group, a and b are each 0 or 1, and where R, R' and R" or two representatives of this group may also be identical.

As adhesion promoters it is also possible to utilize compounds for which two or more hydrolyzable groups X, when present, are not identical, but instead differ from one another [corresponding to the formula $RR'_aR''_bSiXX'_cX''d$, with X, X' and X" as hydrolyzable groups selected independently of one another (of which in turn, however, two may also be identical), c and d are each 0 or 1, with the proviso that a+b+c+d=2].

Hydrolyzable groups utilized are, in particular, alkoxy groups, and so alkoxysilanes in particular are used as adhesion promoters. The alkoxy groups of one silane molecule are preferably the same, though in principle they may also be selected differently.

Alkoxy groups selected are, for example, methoxy groups and/or ethoxy groups. Methoxy groups are more reactive than ethoxy groups. Methoxy groups may therefore exhibit a better adhesion-promoting effect through quicker reaction with the substrate surfaces, and it may therefore be possible to reduce the amount used. Ethoxy groups, on the other hand, have the advantage that because of the lower reactivity they have less of a (possibly negative) effect on the processing time, not least in relation to the desired heat-and-humidity stability.

Adhesion promoters used are preferably trialkoxysilanes $R—SiX_3$. Examples of suitable trialkoxysilanes are trimethoxysilanes—such as N-(2-aminoethyl)-3-aminopropyl-trimethoxysilane, N-cyclohexyl-3-aminopropyl-trimethoxysilane, 3-aminopropyl-trimethoxysilane, 3-ureidopropyl-trimethoxysilane, vinyltrimethoxysilane, 3-glycidyloxypropyl-trimethoxysilane, 3-methacryloyloxypropyl-trimethoxysilane, methacryloyloxymethyl-trimethoxysilane, N-methyl-[3-(trimethoxysilyl)propyl]carbamate, N-trimethoxysilylmethyl-O-methylcarbamate, Tris-[3-(trimethoxysilyl) propyl]-isocyanurate, 3-glycidyloxypropyl-trimethoxysilane, methyltrimethoxysilane, isooctyltrimethoxysilane, hexadecyltrimethoxysilane, 3-mercaptopropyl-trimethoxysilane, 3-aminopropyl-trimethoxysilane, N-(2-aminoethyl)-3-aminopropyl-trimethoxysilane, N-phenyl-3-aminopropyl-trimethoxysilane, N-ethyl-3-aminoisobutyl-trimethoxysilane, bis[3-(trimethoxysilyl)propyl]amine, 3-isocyanatopropyl-trimethoxysilane, 2-(3,4-epoxycyclohexyl)ethyl-trimethoxysilane; 3-methacryloyloxypropyl-trimethoxysilane, 3-methacrylamidopropyl-trimethoxysilane, p-styryltrimethoxysilane, 3-acryloyloxypropyl-trimethoxysilane, N-(vinylbenzyl)-2-aminoethyl-3-aminopropyltrimethoxysilane hydrochloride—, triethoxysilanes—such as N-cyclohexylaminopropyl-triethoxysilane, 3-aminopropyl-triethoxysilane, 3-ureidopropyl-triethoxysilane, 3-(2-aminomethyl-amino) propyl-triethoxysilane, vinyltriethoxysilane, 3-glycidyloxypropyl-triethoxysilane, methyltriethoxysilane, octyltriethoxysilane, isooctyltriethoxysilane, phenyltriethoxysilane, 1,2-bis(triethoxysilane)ethane, 3-octanonylthio-1-propyl-triethoxysilane; 3-aminopropyl-triethoxysilane, bis[3-(triethoxysilyl)propyl]amine, 3-isocyanatopropyl-triethoxysilane, 2-(3,4-epoxycyclohexyl)ethyl-triethoxysilane, 3-methacryloyloxypropyl-triethoxysilane, 3-methacrylamidopropyl-triethoxysilane, 3-triethoxysilyl-N-(1,3-dimethylbutadiene)-propylamide—, triacetoxysilanes—such as vinyltriacetoxysilane, 3-methacryloyloxypropyl-triacetoxysilane, triacetoxyethylsilane—, mixed trialkoxysilanes—such as 3-methacrylamidopropyl-methoxy-diethoxysilane, 3-methacrylamidopropyl-dimethoxy-ethoxysilane—.

Examples of suitable dialkoxysilanes are dimethoxysilanes—such as N-(2-aminoethyl)-3-aminopropyl-methyldimethoxysilane, vinyldimethoxy-methylsilane, (methacryloyloxymethyl)-methyldimethoxysilane, methacryloyloxymethyl-methyl-dimethoxysilane, 3-methacryloyloxypropyl-methyldimethoxysilane, dimethyldimethoxysilane, (cyclohexyl)methyldimethoxysilane, dicyclopentyl-dimethoxysilane, 3-glycidyloxypropyl-methyldimethoxysilane, 3-mercaptopropyl-methyldimethoxysilane diethoxysilanes—such as dimethyldiethoxysilane, gamma-aminopropyl-methyl-diethoxysilane; 3-glycidyloxypropyl-methyldiethoxysilane, 3-methacryloyloxypropyl-methyldiethoxysilane—.

An example of a monooxysilane is trimethyloxysilane.

The amount of adhesion promoters added may be selected in principle within a wide spectrum, according to the desired properties of the product and with account being taken of the raw materials selected for the adhesive film. It has emerged, however, as being very advantageous if the amount of adhesion promoter used, based on the adhesive used, is selected in the range from 0.5 to 20 wt %, preferably in the range from 1 to 10 wt %, more preferably from 1.5 to 5 wt %, very preferably in the range from 2.5 to 3.5 wt %.

Very large amounts of adhesion promoters used may have a strongly plasticizing effect, and so, in particular with regard to films of sufficient stability, it may be advantageous to select as small as possible an amount of adhesion promoter, so that while, on the one hand, the desired positive effect on the heat-and-humidity resistance is sufficiently great, the properties of the adhesive film in terms of its dimensional integrity and stability, on the other hand, are not too adversely affected.

Details regarding the processing and the production of the adhesive film may be found in EP 3 784 742 A1.

A suitable reactive adhesive according to a further variant of the disclosure is an adhesive film which is disclosed and comprehensively described in WO 2017/174303 A1.

Suitable accordingly is a pressure sensitive adhesive film which comprises or consists of a radiation-activatable polymerizable composition comprising or consisting of:

A 5 to 60 parts by weight of at least one film former component;

B 40 to 95 parts by weight of at least one epoxide component;

C 0.1 to 10 parts by weight of at least one photoinitiator, and

D optionally 0.1 to 200 parts by weight of at least one adjuvant, based in each case on the radiation-activatable polymerizable composition, where the parts by weight of components A and B add up to 100, and where the radiation-activatable polymerizable composition is characterized in that the film former component A comprises or consists of at least one polyurethane polymer.

Film Former Component A

The polyurethane polymer used in the film former component A may in principle be any polyurethane polymer known per se. In the context of the present disclosure, polyurethane polymers are understood to mean reaction products obtainable by the reaction of (A1) polyisocyanates and (A2) polyols.

Suitable polyisocyanates (A1) are aromatic, araliphatic, aliphatic or cycloaliphatic polyisocyanates. It is also possible to use mixtures of such polyisocyanates. Examples of suitable polyisocyanates are butylene diisocyanate, hexamethylene diisocyanate (HDI), isophorone diisocyanate (IPDI), 2,2,4 and/or 2,4,4-trimethylhexamethylene diisocyanate, the isomeric bis(4,4'-isocyanatocyclohexyl)methanes or mixtures thereof with any isomer content, isocyanatomethyl octane 1,8-diisocyanate, cyclohexylene 1,4-diisocyanate, phenylene 1,4-diisocyanate, tolylene 2,4- and/or 2,6-diisocyanate, naphthylene 1,5-diisocyanate, diphenylmethane 2,4'- or 4,4'-diisocyanate, triphenylmethane 4,4',4"-triisocyanate or derivatives thereof having urethane, isocyanurate, allophanate, biuret, uretdione, iminooxadiazinedione structure and mixtures thereof. Preference is given to hexamethylene diisocyanate, isophorone diisocyanate and the isomeric bis(4,4'-isocyanatocyclohexyl)methanes and mixtures thereof.

Preference is given to polyisocyanates or polyisocyanate mixtures of the type specified having exclusively aliphatically and/or cycloaliphatically bonded isocyanate groups. Also preferred are tolylene 2,4- and/or 2,6-diisocyanate. Very particularly preferred starting components (A1) are polyisocyanates or polyisocyanate mixtures based on HDI, IPDI and/or 4,4'-diisocyanatodicyclohexylmethane.

Also suitable as polyisocyanates (A1) are any polyisocyanates that are prepared by modification of simple aliphatic, cycloaliphatic, araliphatic and/or aromatic diisocyanates, are formed from at least two diisocyanates and have uretdione, isocyanurate, urethane, allophanate, biuret, iminooxadiazinedione and/or oxadiazinetrione structure, as described, for example, in J. Prakt. Chem. 336 (1994) p. 185-200.

Suitable polyols (A2) have an OH functionality of 1.5 to 4. The polyols (A2) are preferably polymeric polyols, for example polyacrylate polyols, polyester polyols, polylactone polyols, polyether polyols, polycarbonate polyols, polyestercarbonate polyols, polyetherestercarbonate polyols, polyacetal polyols, polyolefin polyols and polysiloxane polyols. Preference is given to polyols within a molar mass range from ≥400 g/mol to ≤2500 g/mol with an OH functionality of ≥1.9 to ≤3.

The useful polycarbonates having hydroxyl groups are obtainable by reaction of carbonic acid derivatives, for example diphenyl carbonate, dimethyl carbonate or phosgene, with diols. Useful diols of this kind include, for example, ethylene glycol, propane-1,2- and -1,3-diol, butane-1,3- and -1,4-diol, hexane-1,6-diol, octane-1,8-diol, neopentyl glycol, 1,4-bishydroxymethylcyclohexane, 2-methylpropane-1,3-diol, 2,2,4-trimethylpentane-1,3-diol, dipropylene glycol, polypropylene glycols, dibutylene glycol, polybutylene glycols, bisphenol A, tetrabromobisphenol A, but also lactone-modified diols. Preferably, the diol component contains 40% by weight to 100% by weight of hexanediol, preferably hexane-1,6-diol and/or hexanediol derivatives, preferably those that have not only terminal OH groups but also ether or ester groups, for example products that have been obtained by reaction of 1 mol of hexanediol with at least 1 mol, preferably 1 to 2 mol, of caprolactone according to DE-A 1 770 245 or by etherification of hexanediol with itself to give di- or trihexylene glycol. The preparation of derivatives of this kind is known, for example, from DE-A 1 570 540. It is also possible to use the polyether-polycarbonate diols described in DE-A 3 717 060.

The hydroxyl polycarbonates should preferably be linear. However, they may optionally be lightly branched through the incorporation of polyfunctional components, especially low molecular weight polyols. Suitable examples of these are glycerol, trimethylolpropane, hexane-1,2,6-triol, butane-1,2,4-triol, trimethylolpropane, pentaerythritol, quinitol, mannitol, and sorbitol, methylglycoside, 1,3,4,6-dianhydrohexitols.

Suitable polyether polyols are the polytetramethylene glycol polyethers that are known per se in polyurethane chemistry and can be prepared, for example, by polymerization of tetrahydrofuran by cationic ring opening.

Additionally suitable polyether polyols (A2) are the polyaddition products of ethylene oxide, propylene oxide, butylene oxide, styrene oxide or epichlorohydrin that have been prepared using starter molecules, and the mixed and graft polyaddition products thereof and the polyethers obtained by condensation of polyhydric alcohols or mixtures thereof and those obtained by alkoxylation of water, polyhydric alcohols, amines or amino alcohols used. Preference is given to homopolyaddition and/or mixed polyaddition compounds of ethylene oxide and/or propylene oxide having a number-average molecular weight of 400 to 4000 Da, more preferably of 400 to 2500 Da, most preferably of 800 to 2000 Da. The average functionality of the polyether polyols is greater than 1.85, preferably from 1.88 to 3. Particular preference is given to difunctional polyethers having a functionality of 1.92 to 2.05.

The proportion of ethylene oxide in the homopolyaddition and/or mixed polyaddition compounds of ethylene oxide and/or propylene oxide is 0% to 100%, preferably 0% to 30%, more preferably 0% to 10%.

In a particularly preferred embodiment of the present disclosure, the polyether polyol (A2) is a homopolyaddition product of propylene oxide having a molecular weight of 800 to 2000 Da and a functionality of 1.92 to 2.05.

Suitable polyester polyols are, for example, reaction products of polyhydric, preferably dihydric and optionally additionally trihydric, alcohols with polybasic, preferably dibasic, carboxylic acids. Rather than the free carboxylic acids, it is also possible to use the corresponding polycarboxylic anhydrides or corresponding polycarboxylic esters of lower alcohols or mixtures thereof to prepare the polyesters. The polycarboxylic acids may be aliphatic, cycloaliphatic, aromatic and/or heterocyclic in nature and may optionally be substituted, for example by halogen atoms, and/or unsaturated.

Particularly preferred polymeric polyols (A2) are polycarbonates and polyethers, most preferably polyethers.

Possible short-chain polyols, especially for chain extension and/or termination of the polyurethane prepolymer, may be monofunctional alcohols and monoamines. Preferred monoalcohols are aliphatic monoalcohols having 1 to 18 carbon atoms, for example ethanol, n-butanol, ethylene glycol monobutyl ether, 2-ethylhexanol, 1-octanol, 1-dodecanol or 1-hexadecanol. Preferred monoamines are aliphatic monoamines, for example diethylamine, dibutylamine, ethanolamine, N-methylethanolamine or N,N-diethanolamine and amines from the Jeffamine® M series (Huntsman Corp. Europe, Belgium) or amino-functional polyethylene oxides and polypropylene oxides.

Short-chain polyols that are likewise suitable are aminopolyols or polyamines having a molar mass below 400 g/mol, which are described in a large number in the corresponding literature. These are, for example:

a) alkanediols or -triols, such as ethanediol, propane-1,2- and -1,3-diol, butane-1,4- and -2,3-diol, pentane-1,5-diol, dimethylpropane-1,3-diol, hexane-1,6-diol, neopentyl glycol, cyclohexane-1,4-dimethanol, 2-methylpropane-1,3-diol, 2-ethyl-2-butylpropanediol, trimethylpentanediol, positionally isomeric diethyloctanediols, cyclohexane-1,2- and -1,4-diol, hydrogenated bisphenol A [2,2-bis(4-hydroxycyclohexyl)propane], 2,2-dimethyl-3-hydroxypropyl 2,2-dimethyl-3-hydroxypropionate, trimethylolethane, trimethylolpropane or glycerol, b) ether diols, such as diethylene diglycol, triethylene glycol, tetraethylene glycol, dipropylene glycol, tripropylene glycol, 1,3-butylene glycol or hydroquinone dihydroxyethyl ether, c) ester diols of the general Formulas (I) and (II)

$$HO—(CH2)x\text{-}CO—O—(CH2)y\text{-}OH \quad (I)$$

$$HO—(CH2)x\text{-}O—CO—R—CO—O(CH2)xOH \quad (II)$$

in which

R is an alkylene or arylene radical having 1 to 10 carbon atoms, preferably 2 to 6 carbon atoms, x is 2 to 6 and y is 3 to 5, for example δ-hydroxybutyl ε-hydroxycaproate, ω-hydroxyhexyl γ-hydroxybutyrate, β-hydroxyethyl adipate and bis(β-hydroxyethyl) terephthalate and d) di- and polyamines, for example 1,2-diaminoethane, 1,3-diaminopropane, 1,6-diaminohexane, phenylene-1,3- and -1,4-diamine, 4,4'-diphenylmethanediamine, isophoronediamine, isomer mixture of 2,2,4- and 2,4,4-trimethylhexamethylenediamine, 2-methylpentamethylendiamine, diethylenetriamine, 1,3- and 1,4-xylylenediamine, tetramethyl-1,3- and -1,4-xylylenediamine, 4,4-diaminodicyclohexylmethane, amino-functional polyethylene oxides or polypropylene oxides obtainable under the Jeffamine® name, D series (from Huntsman Corp. Europe, Belgium), diethylenetriamine and triethylenetetramine. Suitable diamines in the context of the disclosure are also hydrazine, hydrazine hydrate and substituted hydrazines, for example N-methylhydrazine, N,N'-dimethylhydrazine and homologs thereof, and also acid dihydrazides, adipic acid, β-methyladipic acid, sebacic acid, hydracrylic acid and terephthalic acid, semicarbazido-alkylene hydrazides, for example β-semicarbazidopropionic hydrazide (described, for example, in DE-A 1 770 591), semicarbazidoalkylene carbazine esters, for example 2-semicarbazidoethyl carbazine ester (described, for example, in DE-A 1 918 504) or else aminosemicarbazide compounds, for example β-aminoethyl semicarbazidocarbonate (described, for example, in DE-A 1 902 931).

Preparation of the polyurethane polymer of the film former component A can be accomplished using all methods known from the prior art. Typically, the constituents are reacted with one another in stoichiometrically suitable ratios and preferably heated up to higher temperatures, especially in the range from 50 to 120° C.

The reaction can be effected in neat form or in solution. Suitable solvents are, for example, acetone, butanone, tetrahydrofuran, dioxane, acetonitrile, dipropylene glycol dimethyl ether and 1-methyl-2-pyrrolidone, which can be added not just at the start of the preparation, but can optionally also be added later in portions. Preference is given to acetone and butanone. It is possible to conduct the reaction under standard pressure or elevated pressure, for example above the standard pressure boiling temperature of a solvent such as acetone, for example.

In addition, it is possible to include the catalysts known for acceleration of the isocyanate addition reaction in the initial charge, or to meter them in at a later stage, examples of these being triethylamine, 1,4-diazabicyclo[2.2.2]octane, dibutyltin oxide, tin dioctoate, dibutyltin dilaurate, tin bis (2-ethylhexanoate), zinc dioctoate, zinc bis(2-ethylhexanoate) or other organometallic compounds. Preference is given to dibutyltin dilaurate, zinc dioctoate and zinc bis(2-ethylhexanoate), particular preference to zinc bis(2-ethylhexanoate).

In the preparation of the polyurethane polymer, the molar ratio of isocyanate groups to isocyanate-reactive groups is, for example, 0.90 to 3. It is possible to use either OH-functional or isocyanate-functional polyurethane polymers. The functionality can be controlled via the adjustment of the molar ratio of isocyanate groups to isocyanate-reactive groups.

The degree of reaction is typically monitored by following the NCO content of the reaction mixture. For this purpose, it is possible to undertake spectroscopic measurements, for example infrared or near infrared spectra, determinations of the refractive index or else chemical analyses, such as titrations, of samples taken. Polyurethane polymers containing free isocyanate groups are obtained in neat form or in solution.

In an advantageous development, the polyurethane polymer of the film former component A has a weight-average molecular weight $M_w$ of at least 40 000 g/mol, determined via gel permeation chromatography (GPC). Further preferably, the weight-average molecular weight $M_w$ is at least 50 000 g/mol, especially 50 000 to 1 000 000 g/mol. The use of such polyurethane polymers in the film former component A is particularly advantageous since this can prolong the open time after exposure of the polymerizable composition to radiation. Particularly suitable for this purpose are OH-functional polyurethane polymers. In gel permeation chromatography (GPC), THF (tetrahydrofuran) is used as eluent and is used with 0.1% by volume of trifluoroacetic acid. The measurement temperature is 25° C. A pre-column used is PSS-SDV, 5μ, $10^3$ Å, ID 8.0 mm×50 mm. For separation, the columns PSS-SDV, 5μ, $10^3$ and $10^5$ and $10^6$ each with ID 8.0 mm×300 mm are used. The sample concentration is 4 g/L; the flow rate is 1.0 mL per minute. Measurement is effected against polystyrene standards.

Moreover, the aforementioned polyurethane polymers advantageously contribute to the initial tackiness of the adhesive tape. Within the time window of the open time, this enables preliminary fixing of the components to be bonded to one another. This prevents the components from moving of their own accord from the desired bonding position. The aforementioned positive properties of the polyurethane polymer in the film former component A are especially marked in the case of use of linear polyurethane polymers, especially of linear OH-functional polyurethane polymers.

The radiation-activatable polymerizable composition contains 5 to 60 parts by weight of at least one film former component A, especially 10 to 50 parts by weight, preferably 15 to 40 parts by weight, where the parts by weight of components A and B add up to 100.

Epoxide Component B

Epoxide components B used may be epoxy-containing materials or epoxy resins, these being any organic compounds having at least one oxirane ring that are polymerizable by a ring-opening reaction. Such materials, which are generally referred to as epoxides, include both monomeric and polymeric epoxides and may be aliphatic, cycloaliphatic or aromatic. These materials generally have an average of at least two epoxy groups per molecule, preferably more than two epoxy groups per molecule. The "average" number of epoxy groups per molecule is defined as the number of epoxy groups in the epoxy-containing material divided by the total number of epoxy molecules present.

The polymeric epoxides include linear polymers having terminal epoxy groups (e.g. a diglycidyl ether of a polyoxyalkylene glycol), polymers having skeleton oxirane units (e.g. polybutadiene polyepoxide) and polymers having epoxy side groups (e.g. a glycidyl methacrylate polymer or copolymer). The molecular weight of the epoxy-containing material may vary from 58 to about 100 000 g/mol or more. Mixtures of various epoxy-containing materials may also be used in the hotmelt compositions of the disclosure. Useful epoxy-containing materials include those that contain cyclohexene oxide groups, such as the epoxycyclohexane carboxylates, exemplified by 3,4-epoxycyclohexylmethyl 3,4-epoxycyclohexanecarboxylate, 3,4-epoxy-2-methylcyclohexylmethyl 3,4-epoxy-2-methylcyclohexanecarboxylate and bis(3,4-epoxy-6-methylcyclohexylmethyl) adipate. For a more detailed list of useful epoxides of this kind, reference may be made to U.S. Pat. No. 3,117,099.

Further epoxy-containing materials that are particularly useful in the application include glycidyl ether monomers. Examples are the glycidyl ethers of polyhydric phenols that are obtained by reaction of a polyhydric phenol with an excess of chlorohydrin, such as epichlorohydrin (e.g. the diglycidyl ether of 2,2-bis(2,3-epoxypropoxyphenol)propane). Further examples of epoxides of this type that can be used in the application of this disclosure are described in U.S. Pat. No. 3,018,262.

There is a multitude of commercially available epoxy-containing materials that can be used. Especially suitable are epoxides, which are readily available, such as octadecylene oxide, epichlorohydrin, styrene oxide, vinylcyclohexene oxide, glycidol, glycidyl methacrylate, diglycidyl ethers of bisphenol A (for example those available under the trade names EPON 828, EPON 1004 and EPON 1001F from Shell Chemical Co. and DER-332 and DER-334 from Dow Chemical Co.), diglycidyl ethers of bisphenol F (e.g. ARALDITE GY281 from Ciba-Geigy), vinylcyclohexene dioxide (e.g. ERL 4206 from Union Carbide Corp.), 3,4-epoxycyclohexylmethyl 3,4-epoxycyclohexenecarboxylate (e.g. ERL-4221 from Union Carbide Corp.), 2-(3,4-epoxycyclohexyl-5,5-spiro-3,4-epoxy)cyclohexane metadioxane (e.g. ERL-4234 from Union Carbide Corp.), bis(3,4-epoxycyclohexyl) adipate (e.g. ERL-4299 from Union Carbide Corp.), dipentene dioxide (e.g. ERL-4269 from Union Carbide Corp.), epoxidized polybutadiene (e.g. OXIRON 2001 from FMC Corp.), silicone resin-containing epoxy functionality, epoxysilanes (e.g. beta-(3,4-epoxycyclohexyl)ethyltrimethoxysilane and gamma-glycidoxypropyltrimethoxysilane, commercially available from Union Carbide), fire-retardant epoxy resins (e.g. DER-542, a brominated bisphenol-type epoxy resin, available from Dow Chemical Co.), butane-1,4-diol diglycidyl ether (e.g. ARALDITE RD-2 from Ciba-Geigy), hydrogenated epoxy resins based on bisphenol A epichlorohydrin (e.g. EPONEX 1510 from Shell Chemical Co.) and polyglycidyl ethers of phenol-formaldehyde novolac (e.g. DEN-431 and DEN-438 from Dow Chemical Co.).

In a further configuration, the epoxide component B contains at least 10 wt % of epoxy resins that are liquid at 25° C., based on the epoxy component B. The proportion of such liquid epoxy resins in the epoxide component B is especially 10 to 90 wt %, further preferably 20 to 75 wt %. Adhesives having such ratios of liquid and solid epoxy components, in the uncured state, have particularly balanced adhesive properties. If what is desired is an adhesive tape having particularly good adaptation properties, the proportion of liquid epoxy components is preferably 50 to 80 wt %. It is possible to use one such resin or else a mixture of different resins.

A measure of flowability is dynamic viscosity. Dynamic viscosity in the present context is determined in a cylinder rotary viscometer with a standard geometry according to DIN 53019-1 (2008-09). Viscosity is measured at a measurement temperature of 25° C. and a shear rate of $1\times s^{-1}$. Fluid refers to a substance having a viscosity of less than 500 Pa·s.

In addition, it is envisaged in the context of the present disclosure that the epoxide component B contains not more than 60 wt % of epoxycyclohexyl-based epoxy resins, especially from 5 to 80 wt %, further preferably from 15 to 60 wt %, based in each case on the epoxy component B. The use of liquid epoxycyclohexyl-based resins has an advantageous effect on the adhesive properties of the adhesives in the uncured state especially when 10 to 40 wt % thereof are used. If proportions of 50 to 80 wt % are used, it is possible by virtue of the high reactivity of the epoxycyclohexyl derivatives in combination with component A to achieve fast-curing pressure sensitive adhesives having short open times (>1 minute).

The epoxycyclohexyl-based epoxy resin may be selected, for example, from the group comprising or consisting of 3,4-epoxycyclohexylmethyl 3,4-epoxycyclohexanecarboxylate, 3,4-epoxy-2-methylcyclohexylmethyl 3,4-epoxy-2-methylcyclohexanecarboxylate and bis(3,4-epoxy-6-methylcyclohexylmethyl) adipate, bis((3,4-epoxycyclohexyl) methyl) adipate, dicyclopentadiene dioxide, and combinations of these. These compounds are advantageous owing to their high reactivity. These compounds are frequently liquid, which leads to very soft adhesive tapes for high proportions of component B. If what are desired are firmer adhesive tapes, this can be achieved through the use of polymers having epoxycyclohexyl groups, obtainable, for example, via radical polymerization of 3,4-epoxycyclohexylmethyl methacrylate, optionally with comonomers.

The epoxide component B may have an average functionality based on the alkylene oxide groups of at least 1.0 to 6.0, especially of 1.75 to 3.2, in order to achieve high bond strength. The network density can be reduced by means of reactive diluents, which leads to less brittle adhesives, especially in the case of high proportions of component B. Such reactive diluents typically have a functionality of 1.0.

The radiation-activatable polymerizable composition contains 40 to 95 parts by weight of at least one epoxide component B, especially 50 to 90 parts by weight, preferably 60 to 85 parts by weight, where the parts by weight of components A and B add up to 100.

In a preferred embodiment, the epoxide component B contains at least two different epoxy resins B1 and B2, of which a. the first epoxy resin B1 has a dynamic viscosity at 25° C. of less than 500 Pa*s, measured according to DIN 53019-1 at a measurement temperature of 25° C. and a shear rate of $1\times s^{-1}$, and
b. of which the second epoxy resin B2 has a softening temperature of at least 45° C. or a dynamic viscosity at 25° C. of at least 1000 Pa*s, measured according to DIN 53019-1 at a measurement temperature of 25° C. and a shear rate of $1\times s^{-1}$, where, in particular, the proportion of the first epoxy resin B1 is 10 to 90 wt %, preferably 20 to 75 wt %, and the proportion of the second epoxy resin B2 is 10 to 90 wt %, preferably to 80 wt %, based on the epoxide component B.

Photoinitiators C

Among the photoinitiators C for cationic UV-induced curing, especially sulfonium-, iodonium- and metallocene-based systems are usable. By way of examples of sulfonium-based cations, reference is made to the remarks in U.S. Pat. No. 6,908,722 B1 (especially columns to 21).

Examples of anions that serve as counterions for the abovementioned cations include tetrafluoroborate, tetraphenylborate, hexafluorophosphate, perchlorate, tetrachloroferrate, hexafluoroarsenate, hexafluoroantimonate, pentafluorohydroxyantimonate, hexachloroantimonate, tetrakispentafluorophenylborate, tetrakis(pentafluoromethyl-phenyl)borate, bi(trifluoromethylsulfonyl)amide and tris(trifluoromethylsulfonyl)methide. Also conceivable as anions, especially for iodonium-based initiators, are chloride, bromide or iodide, but preference is given to initiators that are essentially free of chlorine and bromine.

The skilled person is aware of further systems which can likewise be used. Photoinitiators are used uncombined or as a combination of two or more photoinitiators.

In a particularly preferred embodiment, the photoinitiator C contains a compound having tetrakis(pentafluorophenyl) borate anions. The photoinitiator C may also consist of at least one such compound. Compounds having the aforementioned anion are particularly advantageous since such a photoinitiator gives a distinctly elevated dark reaction, i.e. the adhesive tape cures more quickly after exposure to radiation. Surprisingly, in spite of the use of such rapid photoinitiators, a comparatively long open time of at least three minutes, especially at least five minutes, can be achieved, which—without being bound to a theory—is attributed to the interaction of these specific photoinitiators and the film former component with at least one polyurethane polymer.

The radiation-activatable polymerizable composition contains 0.1 to 10 parts by weight of at least one photoinitiator C, especially 0.25 to 7.5 parts by weight, preferably 0.5 to 5 parts by weight.

A particularly preferred adhesive comprises or consists of a radiation-activatable polymerizable composition having the following constituents:

A 5 to 60 parts by weight, preferably 15 to 40 parts by weight, of the at least one film former component and/or
B 40 to 95 parts by weight, preferably 60 to 85 parts by weight, of the at least one epoxy component and/or
C 0.1 to 10 parts by weight, preferably 0.5 to 5 parts by weight, of the at least one photoinitiator and/or optionally D 0.1 to 200 parts by weight, preferably 10 to 100 parts by weight, of the at least one additive, where the parts by weight of components A and B add up to 100.

It is preferably a feature of the adhesive that the radiation-activatable polymerizable composition exhibits a dark reaction after radiative activation and especially has an open time of at least one minute after exposure to UV light, preferably an open time of 1 to 5 minutes, where the dark reaction at a temperature of 25° C. has concluded especially after 24 hours. A reaction is referred to as "concluded" when the bond strength after 24 h is at least 2 MPa.

Adjuvants D

Useful adjuvants D include all additives known to the person skilled in the art for adhesive tapes and pressure sensitive adhesives, for example tackifying resins, called tackifiers, polymers, rheology modifiers, foaming agents, fillers, adhesion promoters, polyols, aging stabilizers, light stabilizers, dyes, impact modifiers, phenoxy resins or mixtures of these.

It is possible to use tackifying resins, but a tackifying resin is dispensable for the adhesives. Even without addition of tackifying resin, the desired tackiness of the adhesive is achieved.

If tackifying resins are used, suitable tackifying resins for this purpose are those as known to the person skilled in the art, for example from the Satas. The pressure sensitive adhesive in this case may contain at least one kind of a preferably at least partly hydrogenated tackifying resin, for example those that are compatible with the elastomer component or, if a copolymer formed from hard and soft blocks is used, mainly with the soft block (plasticizing resins).

A corresponding tackifying resin may have a softening temperature measured by means of the ring & ball method of greater than 25° C., and additionally include at least one kind of tackifying resin having a softening temperature of less than 20° C. In this way, if necessary, it is first possible to finely adjust the adhesive characteristics, but secondly also the adaptation characteristics on the bonding substrate.

For comparatively nonpolar elastomers, the resins used in the pressure sensitive adhesive may be partially or fully hydrogenated resins based on rosin and rosin derivatives, hydrogenated polymers of dicyclopentadiene, partially, selectively or fully hydrogenated hydrocarbon resins based on $C_5$, $C_5/C_9$ or $C_9$ monomer streams, polyterpene resins based on α-pinene and/or β-pinene and/or δ-limonene and/or $\Delta^3$-carene, hydrogenated polymers of preferably pure $C_8$ and $C_9$ aromatics. The aforementioned tackifying resins can be used either alone or in a mixture.

It is possible here to use either resins that are solid at room temperature or liquid resins. In order to assure high aging stability and UV stability, preference is given to hydrogenated resins having a hydrogenation level of at least 90%, preferably of at least 95%.

Fillers used may, for example, be chalks, kaolins and silicates. Suitable thixotropic fillers are Aerosil and Soccal chalks. The amounts used should be chosen such that the UV radiation required for curing can still penetrate sufficiently deep into the bond.

Further additives that may typically be utilized include:

plasticizers, for example plasticizer oils, or low molecular weight liquid polymers, for example low molecular weight polybutenes, preferably with a proportion of 0.2 to 5 wt % based on the total weight of the pressure sensitive adhesive primary antioxidants, for example sterically hindered phenols, preferably with a proportion of 0.2 to 1 wt % based on the total weight of the pressure sensitive adhesive secondary antioxidants, for example phosphites or thioethers, preferably with a proportion of 0.2 to 1 wt % based on the total weight of the pressure sensitive adhesive process stabilizers, for example C radical scavengers, preferably with a proportion of 0.2 to 1 wt % based on the total weight of the pressure sensitive adhesive processing auxiliaries, preferably with a proportion of 0.2 to 1 wt % based on the total weight of the pressure sensitive adhesive end block reinforcer resins, preferably with a proportion of 0.2 to 10 wt % based on the total weight of the pressure sensitive adhesive, and optionally further polymers that are preferably elastomeric in nature; correspondingly utilizable elastomers include those based on pure hydrocarbons, for example unsaturated polydienes such as natural or synthetic polyisoprene or polybutadiene, essentially chemically saturated elastomers, for example saturated ethylene-propylene copolymers, α-olefin copolymers, polyisobutylene, butyl rubber, ethylene-propylene rubber, and chemically functionalized hydrocarbons, for example halogen-containing, acrylate-containing, allyl ether- or vinyl ether-containing polyolefins, preferably with a proportion of 0.2 to 10 wt % based on the total weight of the pressure sensitive adhesive.

The radiation-activatable polymerizable composition optionally contains 0.1 to 200 parts by weight of at least one adjuvant D, especially 50 to 150 parts by weight, preferably 10 to 100 parts by weight.

A suitable reactive adhesive in a further variant of the disclosure is an adhesive which is disclosed and comprehensively described in DE 10 2021 200 580 A1.

The preparation for producing the adhesive comprises i) a thermoplastic, preferably (semi)crystalline, polymer component, formed of at least one polymer containing functional groups that are able to react with isocyanate, ii) a crosslinker component, formed of at least one isocyanate-containing particulate compound, x) a solvent component formed of at least one organic solvent, where the polymer component is substantially in solution in the organic solvent and where, in addition, the isocyanate-containing component at room temperature (23° C.) is substantially soluble neither in the solvent-free polymer component nor in the organic solvent.

The components (i) and (ii) here are constituents of the adhesive obtainable from the preparation, whereas component (x) serves primarily as a process aid for the preparation (precursor of the adhesive).

The term "at least one" is to be understood—as usual—such that the thermoplastic, preferably (semi)crystalline, polymer component is formed of one or more polymers having functional groups that are able to react with isocyanate, and that the crosslinker component is formed of one or more isocyanate-containing, particulate compounds, and that the solvent component is formed of one or more organic solvents. Where reference is made below to the properties "of the at least one" representative of the respective component, the properties described apply in particular to all representatives of the respective component, if two or more of them are present.

The terms "substantially" and "significantly" are used here such that the meaning for the disclosure is the critical factor. If the polymer component is in solution "substantially" in the organic solvent, there may be slight undissolved fractions of the polymer, especially insofar as they do not jeopardize the implementation of the teaching of the disclosure. If a reaction "substantially" does not take place, then minor reaction events already ensuing are not detrimental to the disclosure. Accordingly, any reaction mechanisms occurring under hot conditions usually already exhibit minor reaction processes even at lower temperatures (in this regard, see the theory of equilibrium reactions).

By means of the preparation it is possible to make available a latent-reactive adhesive, more particularly in film form, from an organically dissolved polymer in a new way, this adhesive having particularly advantageous adhesive properties.

This is especially surprising to the skilled person, as it applies not only to the use of superficially deactivated, isocyanate-containing, particulate compounds, but also to the use of particulate, isocyanate-containing compounds which have not been superficially deactivated, in their capacity as crosslinker components, despite the fact that the skilled person rules this out expressly as a result of the publications "Lagerstabile latent-reaktive Klebfolien" [Storage-stable latent-reactive adhesive films] (Jörg Büchner, Wolfgang Henning, Horst Stepanski, Bolko Raffel; Adhäsion 7-8.05) and "Latent reaktiv and lagerfähig" [Latently reactive and storable] (Jörg Büchner, Wolfgang Henning; Adhäsion June/2007).

Similarly to the prior art, the preparations for producing adhesives (especially latent-reactive adhesives) and latent-reactive adhesive films obtainable from them comprise a thermoplastic component, which has a melting temperature, T(melt), and contains functional groups that are able to react with isocyanate, and also an isocyanate-containing component, which is in particulate form, more particularly finely divided particulate form (preferably having a particle size distribution with $d_{50}$<50 μm, more particularly <15 μm). In contrast to the prior art, however, the polymer component and the isocyanate component are not in dispersion in an aqueous medium, with the polymer instead being present in solution in an organic solvent, and the isocyanate compound is in finely divided dispersion in this solvent.

The composition therefore contains a polymer component (component (i)), formed of at least one polymer containing functional groups that are able to react with isocyanate (hereinafter also referred to as isocyanate-reactive polymer). This polymer component constitutes the polymeric basis for the adhesive producible from the composition. The polymeric component (i) is in organic solution in the composition of the disclosure.

Polymer components employed are, for example, compounds functionalized with OH and $NH_2$ groups and/or urethane groups.

In one very preferred procedure, the at least one isocyanate-reactive polymer comprises an at least partly crystalline polymer, i.e., a semicrystalline or crystalline polymer. (Semi)crystalline substances may be determined by differential scanning calorimetry (DSC) according to DIN 53765: 1994-03. In the case of amorphous substances, glass transition temperatures occur; in the case of (purely) crystalline substances, melting temperatures occur. Glass transition temperatures here are recognizable as steps, and melting temperatures as a peak, in the thermogram. Semicrystalline substances may have glass transition temperatures as well as melting temperatures. In the case of (semi)crystalline substances, at any rate, there is at least one melting temperature evident, whereas these do not occur in the case of amorphous substances.

For (semi)crystalline polymers it has emerged that the requirement of non-solubility of the particulate isocyanate-containing compound therein—in the state of the preparation, in other words in particular at room temperature—is generally met more effectively than in the case of amorphous systems. Only on heating of the subsequent adhesive obtained, particularly to the melting and/or decrystallization temperature, is sufficient compatibility brought about between polymer component and crosslinker component.

In a further preferred embodiment, the at least one isocyanate-reactive polymer is a polyurethane polymer, and more preferably still, in conjunction with the aforesaid advantageous embodiment, it is a crystalline or semicrystalline polyurethane polymer, polyurethane esters being an example.

The thermoplastic polyurethane preferably possesses a softening temperature and/or decrystallization temperature of less than 90° C., more preferably less than 80° C., more preferably still less than 70° C.

One particularly preferred embodiment uses a hydroxyl-terminated, largely linear, thermoplastic, highly crystalline polyurethane elastomer as isocyanate-reactive polymer. A polymer of this kind is available for instance under the name Desmomelt 5300 commercially from Covestro Deutschland AG.

However, less highly crystalline and/or branched and/or polyfunctional polymers may also be advantageous, if a higher crosslinking density is advantageous in respect for example of even better chemical stability and/or bonding strength and/or hardness.

The preparation further comprises a crosslinker component for the polymers to be crosslinked, this component being formed of at least one isocyanate-containing particulate component (component (ii)).

The isocyanate compounds used here may be surface-deactivated or non-surface-deactivated. This is an advantage over the prior art, which necessarily requires surface-deactivated isocyanate compounds for latent-reactive adhesives.

Since the preparation represents an at least two-phase system, namely the polymer solution and the particulate isocyanate-containing component, there is no substantial onset of the curing reaction in this state. Even after the preparation has been coated out onto a temporary or permanent carrier and dried, namely stripped of its solvent, completely or down to a low residual solvent fraction of a few percent, the composition is storable over a long period without significant onset of the curing reaction, and so the usefulness of the latent-reactive adhesive film obtained from this preparation is ensured within at least 3 months, preferably at least 6 months, more preferably still at least 9 months or longer with the attainment of the required profile of properties (>=2 MPa in the push-out test on anodized aluminum and/or polycarbonate and >=1 MPa in the push-out test [very good PSA without heat-humidity storage or after chemical exposure] after heat-humidity storage [72 h at 60° C. and 95% relative humidity and/or 72 h at 85° C. and 85% relative humidity], preferably also >=1 MPa in the push-out test after 72 h of storage at 60° C. in oleic acid, more preferably also >=1 MPa in the push-out test after 72 h of storage at 60° C. in a mixture of ethanol and water [75 volume fractions: 25 volume fractions]).

In a preferred procedure use is made wholly or partly of tolylene diisocyanate compounds (TDI compounds) as isocyanate-containing component, such as TDI dimers (available for instance as Dispercoll BL XP 2514® (aqueous dispersion of a reactive isocyanate based on TDI dimer; useful in the present context preferably after removal of the water) or as Dancure 999® (1,3-bis(3-isocyanato-4-methylphenyl)-1,3-diazetidine-2,4-dione; solid)), and/or isophorone diisocyanates (IPDI).

In an extremely simple embodiment, the formulation consists only of a polymer and of an isocyanate-containing compound in a solvent. The ratio between the polymer and the isocyanate-containing compound is selected such that the resultant latent-reactive film has the desired profile of properties.

The skilled person advantageously employs the at least necessary amount of isocyanate-containing compound stoichiometrically required in order to crosslink the isocyanate-reactive groups of the polymer of the disclosure.

With further advantage the skilled person employs more than this necessary amount of isocyanate-containing compound, particularly for the purpose of compensating unintended reactions of the isocyanate-containing compound with, for example, residual moisture from the solvent used and/or moisture introduced via the atmospheric humidity, during storage and/or transport and/or application of the latent-reactive adhesive film of the disclosure, for example, or if, for example, further isocyanate-reactive components are added to the formulation according to the disclosure.

It may also be advantageous to use higher amounts of the isocyanate-containing compound, if, for example, the melt viscosity of the polymer and/or the melt viscosity of the latent-reactive adhesive film are high, and so sufficient solubility and/or migration capacity in the required application time are not ensured. The temperature-time balance can be positively influenced here by increasing the amount of isocyanate-containing compound. In this case, after the crosslinking, unreacted fractions of the isocyanate-containing compound would remain in the adhesive film. It may also be advantageous to use less than the stoichiometrically required amount of isocyanate-containing compound of the disclosure, if for example the polymer used is a branched and/or poly-isocyanate-reactive polymer, in order to prevent an excessive crosslinking density, possibly going hand in hand with embrittlement, or in order to achieve a profile of properties of the latent-reactive adhesive film that is needed for the application (for example, viscoelastic properties).

Advantageously 1 weight percent to 25 weight percent, more advantageously 2 weight percent to 15 weight percent, very advantageously 4 weight percent to 10 weight percent of the components of the formulation are selected from isocyanate-containing compounds of the disclosure.

The solvent used is not included in this calculation, being understood merely as a process aid for homogeneously combining the components of the formulation and establishing a viscosity which enables coating of the formulation by the desired coating method, to give the latent-reactive adhesive film in the desired layer thickness.

As solvent component (x) it is possible to use an organic solvent or a mixture of mutually compatible organic solvents in which the polymer component is substantially soluble and the crosslinker component is substantially insoluble. In principle the customary organic solvents may be selected; the solubility or nonsolubility of the stated components therein may be found by the skilled person in a simple way through art knowledge. Examples of solvents which can be used are acetone and 2-butanone, without wishing there naming to impose any limitation.

The preparation may optionally further comprise an adhesion promoter component (iii). This component is formed in particular of at least one organofunctional silane compound, for instance of the general formula R—$SiX_3$, where R denotes an organically functionalized radical and X denotes a hydrolyzable group. Through the organic group of the silane, attachment to the adhesive can be brought about; for example, by a newly formed covalent bond. The organically functionalized radical R frequently constitutes a relatively long molecular component (spacer, frequently comprising an alkyl chain) which in general has a functional group and whose function is to attach to the substrate surface and/or to components of the adhesive. Typical functional groups are vinyl, methacrylic acid, glycidyl, epoxy, epoxide, amino, urea or thiol groups. Hydrolyzable groups X utilized are for example alkoxy groups, more rarely halogen groups as well. Useful advantageously are, for example, epoxy- or epoxide-terminated silanes, compounds based on an epoxy- or epoxide silane, and/or alkylphosphonic acids. Examples of silane compounds which can be used alone or together in the sense of the adhesion promoter component are amino-propyltrimethoxysilane, 3-glycidyloxypropyltrimethoxysilane (available commercially under the name Glymo®) and β-(3,4-epoxycyclohexyl)ethyltriethoxysilane (available commercially under the name CoatOSil 1770®).

Since silane-containing adhesion promoters are sensitive to hydrolysis, the preparation based on organic solution—in comparison to the aqueous systems known in the prior art—offers an improved opportunity to use incorporated adhesion promoters in polyurethane-based adhesives.

The fraction of an adhesion promoter is advantageously 0.5 weight percent to 6 weight percent, more advantageously 1 weight percent to 4 weight percent, very advantageously 1.5 weight percent to 3 weight percent of the formulation of the disclosure without solvent.

In one preferred embodiment the composition of the preparation is exclusively through components (i), (ii) and (x)—that is, apart from the components (i), (ii) and (x), there are no further components or adjuvants present. A further preferred embodiment of the disclosure, in addition to components (i), (ii) and (x), also comprises component (iii), but is otherwise exclusive, thus having no further components or adjuvants beyond these four components.

One very preferred embodiment of the disclosure concerns a composition of a hydroxyl-terminated, largely linear, thermoplastic, highly crystalline polyurethane elastomer (Desmomelt 5300) (component (i)), in solution in an organic solvent (component (x)), such as acetone or 2-butanone, and TDI dimer in dispersion in the solution and present in finely divided particulate form (component (ii), especially 1,3-bis(3-isocyanato-4-methylphenyl)-1,3-diazetidine-2,4-dione (DANCURE 9990)).

The advantageous composition may be limited to the above three components (i), (ii) and (x), but in advantageous development may additionally contain one or more organofunctional silane compounds as adhesion promoter component (iii), such as glycidyloxypropyltrimethoxysilane and/or β-(3,4-epoxycyclohexyl)ethyltriethoxysilane.

The advantageous composition may be limited to the above four components (i), (ii), (iii) and (x), but in advantageous development may additionally include one or more components (iv) from the group of the epoxides and/or epoxy compounds, comprising mono-, di-, tri- or polyfunctional epoxides and/or epoxy compounds. These include, for example, compounds which are viscous/liquid at 23° C., such as N,N,N',N'-tetrakis(2,3-epoxypropyl)-m-xylene-a,a'-diamine and/or 7-oxabicyclo[4.1.0]hept-3-ylmethyl 7-oxabicyclo[4.1.0]heptane-3-carboxylates and/or compounds having a melting/softening point above 23° C. (so-called epoxy resins) such as Epiclon N-673.

The advantageously described compositions may be limited to these components, but with further advantage may also comprise further additives and/or components (v), see below, for instance, in particular, tackifier resins.

Included here are thickeners, wetting agents, defoamers, fillers (for example, thermally and/or electrically conducting fillers), organic and/or inorganic (color) pigments, organic and/or inorganic fillers, foaming agents (for example, microballoons), catalysts, aging inhibitors, light stabilizers, and further polymers for establishing specific adhesive properties. Specific adhesive properties may be brought about, for example, by admixing amorphous polymers (for example, polyetherurethanes or polyacrylates) and/or by admixing tackifier resins.

For the present disclosure it is possible here to make use, optionally, of tackifier resins in order to adjust the pressure sensitive adhesive properties of the adhesive film of the disclosure, or, indeed, to render this film pressure sensitively adhesive. Tackifier resins of the kind frequently used for adhesives differ from reactive components, the latter often also being called reactive resins. A “tackifier resin” in accordance with the general understanding of a skilled person is an oligomeric or polymeric resin which produces or else increases and/or influences the adhesion (the tack, the intrinsic stickiness) of the adhesive in comparison to the otherwise identical adhesive containing no tackifier resin. Apart from double bonds (in the case of the unsaturated resins), tackifier resins typically contain no reactive groups, since their properties are intended not to change over the lifetime of the adhesive. In particular, tackifier resins differ from the reactive component or components (reactive resins) in being oligomeric or polymeric compounds which do not participate, or not relevantly, in curing reactions.

Tackifier resins used may be, for example, resins based on terpene-phenol or on rosin, such as partially or fully hydrogenated resins based on rosin and rosin derivatives. Additionally suitable tackifier resins are hydrogenated polymers of dicyclopentadiene, partially, selectively or fully hydrogenated hydrocarbon resins based on $C_5$-, $C_5/C_9$- or $C_9$-monomer streams, polyterpene resins based on α-pinene and/or ß-pinene and/or δ-limonene and/or Δ3-carene, and hydrogenated polymers of preferably pure $C_8$ and $C_9$ aromatics. Aforesaid tackifier resins may be used either alone or in a mixture.

The abovementioned rosins include, for example, natural rosin, polymerized rosin, partly hydrogenated rosin, fully hydrogenated rosin, esterified products of these types of rosin (such as glycerol esters, pentaerythritol esters, ethylene glycol esters and methyl esters) and rosin derivatives (such as disproportionation rosin, fumaric acid-modified rosin and lime-modified rosin).

Tackifier resins based on acrylates and methacrylates may also be used in the disclosure.

Reference may be made to the depiction of the state of knowledge in “Handbook of Pressure Sensitive Adhesive Technology” by Donatas Satas (van Nostrand, 1989) chapter 25 “Tackifier Resins”.

For the production of latent-reactive adhesives, in particular the solvent is largely removed, until only a small residual solvent fraction remains in the preparation, preferably not more than 2 weight percent, more preferably not more than 1 weight percent, very preferably not more than 0.5 weight percent. This may be achieved in particular through heating, although the temperature of the adhesive ought to be below the activation temperature of the curing reaction. The solvent may be removed for example in a drying oven and/or a drying tunnel and/or by an alternative technical solution that ensures that the drying temperature (of the formulation and/or of the adhesive film) remains below the activation temperature of the latent-reactive adhesive film or is exceeded only for a time such that the latent-reactive adhesive film still after drying has the profile of properties.

Additionally suitable are heat-activatable adhesives.

They may be differentiated into two categories, which can be used outstandingly in the disclosure:

a) thermoplastic heat-activatable adhesives ("hotmelt adhesives")
b) reactive heat-activatable adhesives ("reactive adhesives")

Thermoplastic heat-activatable adhesives ("hotmelt adhesives") typically have little or no self-adhesiveness at room temperature. It is only with heat that the adhesive is activated, melts, and becomes fluid and flexible. This is the responsibility of an appropriately high glass transition temperature on the part of the adhesive, so that the activation temperature for achieving sufficient tack lies above room temperature. At the elevated temperatures a bonding effect occurs even before the adhesive has set, owing to the self-adhesive properties. After joining has taken place, these adhesives set on cooling with solidification physically (generally reversible; thermoplastic materials), optionally also chemically (generally irreversible; thermoplastic-reactive materials), and so the bonding effect is maintained in the cooled state as well, and it develops its ultimate strength in that state.

The greater the heat, pressure and time, the more solid in general becomes the connection of the tapelike plies. With such systems it is possible regularly to realize maximum assembly strengths and easy processing conditions. Thermoplastics are understood to be compounds as defined in Römpp (online version; 2016 edition, document code RD-20-01271).

Reactive heat-activatable adhesives ("reactive adhesives") are polymer systems which have functional groups such that on supply of heat there is a chemical reaction, the adhesive sets chemically and in this way the adhesive effect is evoked. Reactive heat-activatable adhesives generally do not become self-adhesive when heat is supplied, and so the bonding effect begins only after setting. Reactive heat-activatable adhesives are generally not thermoplastic. The glass transition temperature is not important to the functionality of reactive systems. Equally it may be advantageous to design the reactive adhesives such that they become softer and/or more fluid at elevated temperature, for optimal conformation to the bonded assembly.

With a particularly advantageous regime in accordance with the disclosure, heat-activatedly bondable adhesives used are those whose activation temperature is low. In this way it is possible to stiffen even heat-sensitive materials without damaging them. Since, moreover, there is no need for external pressure to be exerted, the stiffening possible through the method thus designed is particularly gentle to materials.

As a heat-activatedly bondable adhesive—and one outstandingly suitable in the sense of the layer of the heat-activatedly bondable adhesive in the present specification—with a relatively low activation temperature, it is possible advantageously to use latent adhesives of the kind described for example in WO 2013/127697 A. These adhesives, in the sense of the heat-activatedly bondable layers of adhesive, are more particularly latent-reactive adhesive films which comprise:

a) a thermoplastic component having a melting temperature $T_{melt}$ in the range of 35° C.≤$T_{melt}$ ≤90° C., more particularly 40° C.≤$T_{melt}$≤60° C., where the thermoplastic component has functional groups which are able to react with isocyanate, and
b) an isocyanate-containing component, which is present in dispersion in particulate form in the thermoplastic component and is substantially deactivated in the region of the particle surface, where the particles have an onset temperature $T_{onset}$ of 40° C.≤$T_{melt}$≤100° C., more particularly 45° C.≤$T_{melt}$≤75° C., and where $T_{onset}$≥$T_{melt}$.
C)

For the purposes of this description, $T_{melt}$ is the melting temperature of the thermoplastic component and $T_{onset}$ is the temperature at which the isocyanate groups of the particles in dispersion in the thermoplastic component are enabled to react with the functional groups of the thermoplastic polyurethane (for example, because they are distributed in the matrix with the thermoplastic polyurethane). In the case of blocked isocyanate groups, $T_{onset}$ is linked to the deblocking temperature; in the case of microencapsulation, it is linked with the release of isocyanate from the microcapsules (by melting of the microcapsule shell, for example); and, in the case of the isocyanates deactivated in the region of the surface of the isocyanate particles, it is linked with the melting of the isocyanate particles. For the purposes of this disclosure, all isocyanate-containing systems known in the prior art—blocked systems, microencapsulated systems, and isocyanate-containing systems deactivated in the region of the particle surface—are conceivable that meet the specifications for $T_{onset}$. The thermoplastic polyurethanes and the isocyanate-containing component are preferably dispersible in aqueous medium or in dispersion in aqueous medium.

The latent-reactive adhesive films comprise in particular a thermoplastic component which has a melting temperature, $T_{melt}$, and comprises functional groups which are able to react with isocyanate, and also comprise an isocyanate-containing component which is present in dispersion in particulate form, more particularly in finely divided particulate form, in the thermoplastic component, and is blocked, microencapsulated or substantially deactivated in the region of the particle surface. Finely divided particulate in this context means having a particle size distribution with $d_{50}$<50 μm, with the particle size distribution being preferably <15 μm. Latent-reactive adhesive films are based preferably on what is called 1K [1-component] latent-reactive polyurethane, obtained from aqueous polyurethane dispersion, preferably Dispercoll U® from Covestro AG; in this case the isocyanate-containing component is a component which is substantially deactivated in the region of the particle surface.

The particles have an onset temperature, $T_{onset}$, for which $T_{melt}$≤$T_{onset}$. $T_{melt}$ is between 35° C. and 90° C., preferably between 40° C. and 60° C. $T_{onset}$ is between 40° C. and 120° C., preferably at most 100° C., very preferably at most 90° C. As a lower limit, 50° C. is preferred and 60° C. particularly preferred.

More preferably $T_{melt}<T_{onset}$, since in this way unwanted triggering of the crosslinking reaction during the production of the sheetlike latent-reactive adhesive film can be reliably avoided.

Compounds employed as thermoplastic component are preferably those functionalized with OH and/or $NH_2$ groups. Very preferably the thermoplastic component comprises at least one semicrystalline polyesterpolyurethane.

The latent-reactive adhesive film here preferably comprises an anionic, high molecular mass polyurethane dispersion as thermoplastic component, which has a melting temperature (in dried form) $T_{melt}$ where 35° C.≤$T_{melt}$≤90° C., more particularly 40° C.≤$T_{melt}$≤60° C., and contains functional groups which are able to react with isocyanate, in the form, for example, of commercially available products from the abovementioned Dispercoll U family such as Dispercoll U53, Dispercoll U54, Dispercoll U56, Dispercoll U 8755, Dispercoll U XP 2815, Dispercoll VP KA 8758, Dispercoll U XP 2682, Dispercoll U 2824 XP, Dispercoll U XP 2701, Dispercoll U XP 2702, Dispercoll U XP 2710 and/or Dispercoll BL XP 2578 (Dispercoll is a registered trademark of Bayer AG).

Furthermore, the latent-reactive adhesive film preferably comprises tolylene diisocyanate compounds (TDI compounds) such as Dispercoll BL XP 2514 (TDI dimer) and/or Aqualink U (dispersion of blocked TDI dimer) and/or isophorone diisocyanates (IPDI) such as Aqualink D (dispersion of blocked IPDI trimer) as isocyanate-containing component, which is present in dispersion in particulate form, especially finely divided particulate form, in the thermoplastic component and is blocked, microencapsulated or substantially deactivated in the region of the particle surface. The diisocyanates are used in the form, for example, of the aqueous suspensions of the respective latent-reactive solid-state isocyanate. Aqualink is available from Aquaspersions. Especially in combination with anionic, high molecular mass polyurethane dispersions as thermoplastic component (such as the stated Dispercoll U products), the aforesaid diisocyanate products can be used as crosslinker component. Other isocyanates, including monomeric and oligomeric compounds and also polyisocyanates, may be used.

The latent-reactive adhesive film may additionally comprise further formulation constituents. These include thickeners, wetting agents, defoamers, fillers (thermally conducting fillers, for example), pigments (including agents for coloring, for adjusting whiteness and/or for blackening), catalysts, stabilizers, aging inhibitors, light stabilizers, and further polymers for establishing specific adhesive properties. Specific adhesive properties may be established, for example, by admixing aqueous dispersions of amorphous polymers (for example, polyetherurethanes or polyacrylates) and/or by admixing aqueous resin dispersions (especially those based on rosin esters) or liquid resins.

Preference is given to using a latent-reactive adhesive film having at least one layer of a latent-reactive adhesive formulation, with a layer thickness of between at least 10 μm and at most 500 μm, preferably between at least 20 μm and at most 250 μm.

A suitable reactive adhesive according to one further variant of the disclosure is an adhesive which is disclosed and comprehensively described in WO 2013/174650 A1.

The reactive heat-activatable adhesives used may preferably comprise one based on a mixture of at least one nitrile rubber S1 and a reactive component, especially a reactive resin.

The weight fraction of the nitrile rubber S1 is preferably between 25 and 70 wt %, more preferably between 30% and 60% of the overall composition of the reactive heat-activatable film.

The nitrile rubbers S1 preferably have an acrylonitrile fraction of 15% to 45%. A further criterion for the nitrile rubber S1 is the Mooney viscosity. Owing to the need to ensure high flexibility at low temperatures, the Mooney viscosity ought preferably to be below 100 (Mooney ML 1+4 at 100° C.; in accordance with DIN 53523). Commercial examples of such nitrile rubbers are, for example, Nipol™ N917 from Zeon Chemicals.

Reactive resins are deemed in particular to be short- to medium-chain oligomers or polymeric compounds, especially having average molecular weights in the range up to 000 g/mol. The proportion of the reactive resins in the heat-activatable adhesive is preferably between 75 and 30 wt %. One very preferred group encompasses epoxy resins. The weight-average molecular weight $M_W$ of the epoxy resins varies from 100 g/mol up to a maximum of 10 000 g/mol for polymeric epoxy resins.

The epoxy resins comprise, for example, the reaction product of bisphenol A and epichlorohydrin, epichlorohydrin, glycidyl ester, the reaction product of epichlorohydrin and p-amino phenol.

Preferred commercial examples are, for example, Araldite™ 6010, CY281™, ECN™ 1273, ECN™ 1280, MY 720, RD-2 from Ciba Geigy, DER™ 331, DER™ 732, DER™ 736, DEN™ 432, DEN™ 438, DEN™ 485 from Dow Chemical, Epon™ 812, 825, 826, 828, 830, 834, 836, 871, 872,1001, 1004, 1031 etc. from Shell Chemical and HPT™ 1071, HPT™ 1079 likewise from Shell Chemical.

Examples of commercial aliphatic epoxy resins are, for example, vinylcyclohexane dioxides, such as ERL-4206, ERL-4221, ERL 4201, ERL-4289 or ERL-0400 from Union Carbide Corp.

Novolac resins which can be used for example are Epi-Rez™ 5132 from Celanese, ESCN-001 from Sumitomo Chemical, CY-281 from Ciba Geigy, DEN™ 431, DEN™ 438, Quatrex 5010 from Dow Chemical, RE 305S from Nippon Kayaku, Epiclon™ N673 from DaiNipon Ink Chemistry or Epicote™ 152 from Shell Chemical.

Further reactive resins which can be used are melamine resins, such as, for example, Cymel™ 327 and 323 from Cytec.

Reactive resins used very preferentially are phenolic resins. Outstandingly suitable for example are novolac resins, phenolic resole resins, or combinations of novolac resins and phenolic resins. Examples of commercially available phenolic resins for use are YP 50 from Toto Kesel, PKHC from Union Carbide Corp. and BKR 2620 from Showa Union Gosei Corp.

Other reactive resins which can be used include terpene-phenol resins, such as NIREZ™ 2019 from Arizona Chemical, for example.

As reactive resins it is also possible, moreover, to use polyisocyanates, such as, for example, Coronate™ L from Nippon Polyurethan Ind., or Desmodur™ N3300 or Mondur™ 489 from Bayer.

One advantageous embodiment of the adhesive film of the disclosure involves admixing the blend additionally with peel adhesion-boosting (tackifying) resins, very advantageously in a fraction of up to 30 w %, based on the total mixture of the heat-activatable adhesive. Tackifying resins to be added and suitable for use include without exception all existing known tackifier resins described in the literature. Representatives that may be mentioned include the pinene resins, indene resins and rosins, their disproportionated, hydrogenated, polymerized, esterified derivatives and salts, the aliphatic and aromatic hydrocarbon resins, terpene resins and terpene-phenol resins, and also C5, C9 and other hydrocarbon resins. Any desired combinations of these and further resins may be used in order to bring the properties of the resultant adhesive into line with requirements. Generally speaking, it is possible to use all resins that are compatible (soluble) with the rubbers S1—more particularly, reference may be made to all aliphatic, aromatic and alkylaromatic hydrocarbon resins, hydrocarbon resins based on pure monomers, hydrogenated hydrocarbon resins, functional hydrocarbon resins, and natural resins. Express reference may be made to the depiction of the state of knowledge in "Handbook of Pressure Sensitive Adhesive Technology" by Donatas Satas (van Nostrand, 1989).

To accelerate the reaction between the two components it is also possible optionally to additize the mixture with crosslinkers and accelerators.

Examples of suitable accelerators include imidazoles, available commercially as 2M7, 2E4MN, 2PZ-CN, 2PZ-CNS, P0505, L07N from Shikoku Chem. Corp. or Curezol 2MZ from Air Products. Additionally suitable as crosslinker are additions of HMTA (hexamethylenetetramine).

Acceleration may also be accomplished using amines as well, especially tertiary amines.

Besides reactive resins it is also possible to employ plasticizers. Here, in one preferred embodiment of the disclosure, plasticizers based on polyglycol ethers, polyethylene oxides, phosphate esters, aliphatic carboxylic esters and benzoic esters may be used. It is also possible, furthermore, to use aromatic carboxylic esters, diols of relatively high molecular mass, sulfonamides, and adipic esters.

A further preferred embodiment adds further additives to the blend, such as, for example, polyvinyl formal, polyacrylate rubbers, chloroprene rubbers, ethylene-propylene-diene rubbers, methyl-vinyl-silicone rubbers, fluorosilicone rubbers, tetrafluoroethylene-propylene copolymer rubbers, butyl rubbers, styrene-butadiene rubbers.

Polyvinyl butyrals are available as Butvar™ from Solutia, as Pioloform™ from Wacker, a as Mowital™ from Kuraray. Polyacrylate rubbers are available as Nipol AR™ from Zeon. Chloroprene rubbers are available as Baypren™ from Bayer. Ethylene-propylene-diene rubbers are available as Keltan™ from DSM, as Vistalon™ from Exxon Mobil, and as Buna EP™ from Bayer. Methyl-vinyl-silicone rubbers are available as Silastic™ from Dow Corning and as Silopren™ from GE Silicones. Fluorosilicone rubbers are available as Silastic™ from GE Silicones. Butyl rubbers are available as Esso Butyl™ from Exxon Mobil. Styrene-butadiene rubbers are available as Buna S™ from Bayer, as Europrene™ from Eni Chem, and as Polysar S™ from Bayer.

Polyvinylformals are available as Formvar™ from Ladd Research.

As heat-activatable adhesive of the disclosure it is possible, in a further embodiment, to use thermoplastic polymers, preferably having a softening temperature of more than 85° C. and less than 150° C.

Examples of suitable thermoplastics are polyesters and/or copolyesters, polyamides and/or copolyamides, thermoplastic polyurethanes, polyolefins, such as, for example, polyethylene (Hostalen®, Hostalen Polyethylen GmbH), polypropylene (Vestolen PO, DSM). The listing makes no claim to completeness. Blends of different thermoplastics can also be used, as can two different thermoplastics (for example, double-sided coating or different coating on either side of a nonwoven carrier).

A suitable reactive adhesive according to a further variant of the disclosure is an adhesive which is disclosed and comprehensively described in WO 2010/145945 A1.

The adhesive therein consists at least of a. at least one acrylonitrile-butadiene copolymer, b. at least one novolac resin, and c. a formaldehyde donor as curing agent.

The proportion of the acrylonitrile-butadiene copolymers to the novolac resins in this case is advantageously in the range from 3:7 to 8:2, and so preferably the acrylonitrile-butadiene copolymers are present with a weight fraction of 30 to 80 wt % and the novolac resins with a weight fraction of 20 to 70 wt %, with the components a. and b. adding up to 100 wt %.

The novolac resin here is capable in particular of crosslinking chemically at high temperatures with the aid of the curing agent. The crosslinking is accomplished in particular solely through chemical reaction of the novolac resins with the curing agents under heat, and/or by reaction of the curing agents with the novolac resins and the polymer matrix under heat.

The activation temperatures for the thermal crosslinking here are well above room temperature, customarily at least 100° C. or more. Preferred activation temperatures for the thermal crosslinking, particularly in order to guarantee the required bonding strength, are at least 120° C., more particularly between 140° C. and 220° C.

The adhesive may be confined to the aforesaid components a. to c., but may optionally also include further constituents.

Ideally the novolac resins and the curing agents (formaldehyde donors) are used in a proportion of 50:1 to 5:1 wt % (novolac resins:curing agents), preferably 20:1 to 7:1 wt %.

The adhesive is heat-activatable, crosslinks under heat, and under heat flows well onto the substrate to be bonded, and exhibits effective adhesion to polyimide, as short-term temperature stability to at least 288° C., and in the non-crosslinked state is soluble or can be suspended in organic solvents.

As acrylonitrile-butadiene copolymers, also referred to as acrylonitrile-butadiene rubbers, nitrile-butadiene rubbers or, for short, as nitrile rubbers, it is possible in particular to employ all acrylonitrile-butadiene rubbers having an acrylonitrile content of 15 to 55 wt %. Use may also be made of copolymers of acrylonitrile-butadiene and isoprene. In this case the fraction of 1,2-linked butadiene is variable. The aforesaid polymers may be hydrogenated to different degrees; fully hydrogenated polymers having a double bond fraction of less than 1% can also be utilized.

Nitrile-butadiene rubbers are polymerized either hot or cold.

Commercially, such systems are available for example under the name Europrene™ from Eni Chem, Krynac™ and Perbunan™ from Bayer, or Nipol and Breon from Zeon; hydrogenated systems are available commercially under the name Zetpol from Zeon or as Therban from Lanxess, in different grades. The aforesaid products are examples of systems which can be used favorably in the disclosure.

It is apparent that the nitrile rubbers having relatively high acrylonitrile contents produce better bonding performances. Likewise advantageous for a strong bond is a high molecular weight, while ensuring that the polymer can still be brought into solution or suspension.

The nitrile rubbers can be dissolved or suspended in short-chain alcohols and ketones such as ethanol or butanone. Butanone is preferred here, since the rest of the components, particularly the novolac resins, can be dissolved more effectively in butanone.

Novolacs are soluble, meltable, storage-stable phenolic resins which are not self-curing. They are produced by condensation of formaldehyde and excess phenol in the presence of usually acidic catalysts.

Their crosslinking to form thermoset moldings takes place with the aid of a curing agent which eliminates formaldehyde, an example being hexamethylenetetramine (urotropin).

This crosslinking proceeds more rapidly in para position than in ortho position, owing to the steric hindrance. For particularly rapid crosslinking, therefore, preferred novolac resins used are those which contain phenol units linked to one another in ortho position.

Examples of novolac resins which can be used advantageously are, for example, the Durez products from Sumitomo Bakelite and/or the Plenco products from Plastics Engineering Company.

Suitable curing agents include various formaldehyde donors, such as, for example, hexamethylenetetramine (Hexa, HMTA, Urotropin) and/or various methylolamine derivatives such as trimethylolmelamine or hexamethylolmelamine.

The chemical crosslinking of the curing agents with the novolac resins produces very high strengths within the adhesive film. The bonding strengths to the polyimide, however, are also extremely high.

In order to increase the adhesion, a further possibility, advantageously, is to add tackifier resins ("tackifiers") that are compatible with the elastomers.

Tackifiers which can be used in the heat-activatable adhesives include, for example, unhydrogenated, partially hydrogenated or fully hydrogenated resins based on rosin and rosin derivatives, hydrogenated polymers of dicyclopentadiene, unhydrogenated or partially, selectively or fully hydrogenated hydrocarbon resins based on C5, C5/C9 or C9 monomer streams, polyterpene resins based on α-pinene and/or ß-pinene and/or δ-limonene, hydrogenated polymers of preferably pure C8 and C9 aromatics. Aforesaid tackifier resins may be used either alone or in a mixture. Tackifiers may be added advantageously at up to 20 wt %, based on the blended adhesive.

Small amounts of epoxy resins may also be used. In order to maintain the storage stability, the amount of epoxy resin ought preferably not to exceed 10 wt %.

Epoxy resins are understood to be both monomeric and oligomeric compounds having more than one epoxide group per molecule. They may be reaction products of glycidyl esters or epichlorohydrin with bisphenol A or bisphenol F or mixtures of these two. Likewise employable are epoxy novolac resins obtained by reaction of epichlorohydrin with the reaction product of phenols and formaldehyde. Use may also be made of monomeric compounds having two or more epoxy end groups, which are used as diluents for epoxy resins. It is likewise possible to employ elastically modified epoxy resins.

Examples of advantageously useful epoxy resins are Araldite™ 6010, CY-281™, ECN™ 1273, ECN™ 1280, MY 720, RD-2 from Ciba Geigy, DER™ 331, 732, 736, DEN™ 432 from Dow Chemicals, Epon™ 812, 825, 826, 828, 830 etc. from Shell Chemicals, HPT™ 1071, 1079 likewise from Shell Chemicals, Bakelite™ EPR 161, 166, 172, 191, 194 etc. from Bakelite AG.

Examples of commercial aliphatic epoxy resins that can be used advantageously are vinylcylcohexane dioxides such as ERL-4206, 4221, 4201, 4289 or 0400 from Union Carbide Corp.

Advantageously employable elastified epoxy resins are available from Noveon under the Hycar name.

Advantageously employable epoxy diluents, monomeric compounds having two or more epoxy groups, are, for example, Bakelite™ EPD KR, EPD Z8, EPD HD, EPD WF, etc., from Bakelite AG or Polypox™ R 9, R12, R 15, R 19, R 20 etc. from UCCP.

Further additives which can be optionally utilized include:

primary antioxidants such as, for example, sterically hindered phenols secondary antioxidants such as, for example, phosphites or thioethers further aging inhibitors such as sterically hindered amines in-process stabilizers such as, for example, C radical scavengers light stabilizers such as, for example, UV absorbers processing aids fillers, such as, for example, silicon dioxide, glass (ground or in the form of spheres), aluminum oxides, zinc oxides, titanium dioxides, carbon blacks, metal powders, etc.

color pigments and dyes and also optical brighteners optionally further polymers, preferably elastomeric in nature.

The aforesaid additives and possibly further additives may be used alone or in combination with one another especially when the intention of adding them is to improve the properties of the adhesive in terms of particular end uses.

Through the use of plasticizers it is possible to increase the elasticity of the crosslinked adhesive. Plasticizers which can be used in this context include, for example, low molecular weight polyisoprenes, polybutadienes, polyisobutylenes or polyethylene glycols and polypropylene glycols.

Since the nitrile rubber, even at high temperatures, does not possess too low a viscosity, there is no escape of the adhesive from the bondline during adhesive bonding and hot pressing. During this operation, the novolac resins and, where appropriate, the polymer matrix crosslink with the curing agents, producing a three-dimensional network.

Substrates particularly suitable for bonding via the adhesive system of the disclosure are metals, glass and/or plastics. The substrates to be bonded may be alike or different.

It may possibly be necessary for the surfaces of the substrates that are to be bonded to be pretreated by a physical, chemical and/or physicochemical process. Advantageous here, for example, is the application of a primer or of an adhesion promoter composition.

Suitable plastics substrates are, for example, acrylonitrile-butadiene-styrene copolymers (ABS), polycarbonates (PC), ABS/PC blends, PMMA, polyamides, glass fiber-reinforced polyamides, polyvinyl chloride, polyvinylene fluoride, cellulose acetate, cycloolefin copolymers, liquid crystal polymers (LCPs), polylactide, polyetherketones, polyetherimide, polyethersulfone, polymethacrylomethylimide, polymethylpentene, polyphenyl ethers, polyphenylene sulfide, polyphthalamide, polyurethanes, polyvinyl acetate, styrene-acrylonitrile copolymers, polyacrylates and/or polymethacrylates, polyoxymethylene, acrylate-styrene-acrylonitrile copolymers, polyethylene, polystyrene, polypropylene and/or polyesters such as, for example, polybutylene terephthalates (PBT) and/or polyethylene terephthalate (PET).

Further suitable plastics substrates are black-colored grades of Novaduran PBT from Mitsubishi Engineering-Plastics (MEP). This PBT is reinforced with glass fibers in a fraction of 30 wt % (Novaduran 510G30LW). The amount of glass fiber chosen can also be less; levels above 30 wt % are also possible.

The PBT may also have been blended with other plastics like PET, polystyrene or polycarbonate.

Substrates may have undergone coating, printing, vapor deposition, or sputtering. The substrates to be bonded may take on any desired form which is necessary for the use of the resultant assembly. In the simplest form the substrates are planar.

The substrates may also have been furnished on their surfaces with a coating material, black in particular, where at least one of the two coating materials must be laser beam-translucent.

The skilled person is of course clear that the substrates for joining and the laminate too are designed and matched to one another such that the laser beam at least from one side can penetrate all of the layers, to be able to remove the separation layer.

The laminate of the disclosure is present more particularly in the form of a double-sided adhesive tape.

In the sense of this disclosure, the general expression "adhesive tape" (pressure sensitive adhesive tape), synonymously also "adhesive strip" (pressure sensitive adhesive strip), embraces all sheetlike structures, such as two-dimensionally extended films or film sections, tapes with extended length and limited width, tape sections and the like, and also, lastly, diecuts or labels.

The adhesive tape therefore has a longitudinal extent (x direction) and a lateral extent (y direction). The adhesive tape also has a thickness (z direction) which runs perpendicularly to the two extents, with the lateral extent and longitudinal extent being greater by a multiple than the thickness. The thickness is very largely the same, preferably exactly the same, over the entire superficial extent of the adhesive tape as defined by length and width.

In order to adjust the properties of the double-sided adhesive tape, it is possible to use various layers of pressure sensitive adhesive. The properties which can be influenced in this way include thickness, stiffness, flexibility, temperature resistance, elasticity, and flame retardance of the adhesive tape. It is, however, also possible to use the same pressure sensitive adhesives for the two layers of pressure sensitive adhesive.

The laminate of the disclosure or the adhesive tapes of the disclosure are usually wound at the end of the production process to give a roll in the form of an Archimedean spiral. In order to prevent the pressure sensitive adhesives coming into contact with one another in the case of double-sidedly adhesive tapes, the adhesive tapes before being wound are applied to a covering material (also referred to as release material) which is wound up together with the adhesive tape. The skilled person knows of such covering materials under the names of liners or release liners. As well as the covering of double-sidedly adhesive tapes, liners are also used to envelop labels.

A liner (release paper, release film) is not part of an adhesive tape or label, but rather only an auxiliary to the production or storage thereof or for further processing by diecutting. Furthermore, a liner, in contrast to an adhesive tape carrier, is not firmly joined to a layer of adhesive.

The laminate or adhesive tape may be made available in fixed lengths such as product by the meter, for example, or else in the form of a continuous product on rolls (Archimedean spiral), i.e., disk-shaped rolls of adhesive tape, referred to in the language of the art as "pancakes".

The adhesive tape may alternatively be coiled like a textile yarn onto a core, its length being substantially greater than the width of the adhesive tape. By the overlaying of a rotary movement of the core and an axial movement of the core or of the adhesive tape guiding member, the adhesive tape initially forms a first, radially innermost ply of helical turns. To finish off the first ply and enter into the second ply, the orientation of the axial movement is inverted, with the rotary movement unchanged. To finish off the second ply and enter into the third ply, the orientation of the axial movement is again inverted, i.e., it reverts to the original orientation, while the rotary movement continues to be unchanged. The pitch angle remains constant between each of the orientation inversion points. In this way, numerous plies of turns can be formed, their turns intersecting one another (cross-wound coils).

Laminates of the disclosure are used preferably in widths of 9 to 50 mm, more particularly 19 to 25 mm. The roll widths selected are customarily 10, 15, 19, 25 and 30 mm. The laminates may alternatively be sold as rod product, in widths of 1000 to 1300 mm, for example.

There are a great multiplicity of possible applications for the laminate of the disclosure. The disassembly of touch panels has already been mentioned. In view of the major importance of cell phones, this is a particularly important area of use. On the one hand, there is a desire for very strong and also, in particular, sealing bonding of the displays of cell phones. On the other hand, though, it is frequently necessary for the display to be removed. The laminate of the disclosure is outstandingly suitable for this intended use.

A topic of increasing importance, lastly, is that of "reworkability". In the automotive industry, for example, the requirements with regard to disposal of the products, individualized by material, at the end of their life cycle are increasing. It is therefore important that components which consist of different materials must be separated into the individual components again before they are disposed of, even if these components were joined to one another "inseparably" beforehand. The present disclosure enables a very strong and long-term bond between different components, while nevertheless allowing these components to be separated on demand.

Measurement Methods

The measurements are carried out—unless expressly otherwise mentioned—under test conditions of 23±1° C. and 50±5% relative humidity.

Molecular Weight

The molecular weight determinations for the number-average molecular weights $M_n$ and the weight-average molecular weights $M_w$ are made by means of gel permeation chromatography (GPC). The eluent used is THF (tetrahydrofuran) with 0.1 vol % of trifluoroacetic acid. The measurement takes place at 23° C. The precolumn used is PSS-SDV, 10μ, $10^3$ Å, ID 8.0 mm×50 mm. Separation takes place using the columns PSS-SDV, 10μ, $10^3$ and also $10^5$ and $10^7$ each with ID 8.0 mm×300 mm. The sample concentration is 0.5 g/l, the flow rate 0.5 ml per minute. Calibration is carried out using the commercially available ReadyCal Poly(styrene) high kits from PSS Polymer Standard Service GmbH, Mainz, Germany. Using the Mark-Houwink parameter K and alpha, this is converted universally into polymethyl methacrylate (PMMA), so that the data are reported in PMMA mass equivalents.

The disclosure is elucidated in more detail below by examples and two figures, without wishing the disclosure to be restricted as a result.

EXAMPLES

An FAYb (fiber laser) laser is used which emits at 1.06 μm. The manufacturer of the laser is SUNX/Panasonic Electric Works. The laser is marketed under the designation LP-V10.

The laser is distinguished by the following parameters:

| Panasonic LP-V10 Series | |
|---|---|
| Wavelength | 1060 nm |
| Laser type | Y fiber laser |
| Laser class | 4 |
| Focal length | 190 mm |
| Marking field | 90 × 90 mm |
| Laser mode | 12 watts |
| Laser power | single mode |
| Q-switch | pulsed |
| Beam quality | M2 = 1.2 |
| Peak pulse power | 20 kW |
| Pulse frequency | 1-200 Hz |
| Pulse duration | 30 ns |
| Focus size | 50 μm |
| Deflection rate | 6000 mm/s |

Production of Specimens

To produce specimens of laminates of the disclosure, in formulations A to D below, a coating material layer as separation layer was first coated on the bottom face of a film having a thickness of 50 μm and consisting of a transparent PET film.

To produce the coating material layer, the raw materials specified were combined in an automatic disperser (Dissolver CN10 from VMA Getzmann) with water-cooled dispersing vessel (capacity 1 L) and with a 60 mm dissolver disk, and homogenized at a temperature of 40° C. for 20 minutes at 8000 rpm. The resulting composition was applied by doctor blade in a layer thickness of 15 μm to the film surface, and crosslinked by electron beam curing at 80 kGy and 240 kV to form a solid coating material layer.

Composition A: Composition of the Coating Material Layer (Black)

| | | |
|---|---|---|
| 84 parts | Ebecryl 284 ® | Difunctional urethane acrylate (oligomer) from Cytec (contains around 12% HDDA), $M_n$ 1200 g/mol |
| 4 parts | Laromer HDDA ® | Difunctional acrylate (reactive diluent) from BASF hexanediol diacrylate, $M_n$ 226 g/mol |
| 8 parts | DVE-3 ® | Triethylene glycol divinyl ether (reactive diluent) from BASF, $M_n$ 202 g/mol |
| 7 parts | Printex 25 ® | Carbon black |

Composition B: Composition of the Coating Material Layer (White)

| | | |
|---|---|---|
| 51 parts | Ebecryl 284 ® | Difunctional urethane acrylate (oligomer) from Cytec (contains around 12% HDDA), $M_n$ 1200 g/mol |
| 3 parts | Laromer HDDA ® | Difunctional acrylate (reactive diluent) from BASF hexanediol diacrylate, $M_n$ 226 g/mol |
| 6 parts | DVE-3 ® | Triethylene glycol divinyl ether (reactive diluent) from BASF, $M_n$ 202 g/mol |
| 40 parts | Kronos 2160 ® | Titanium dioxide |

Composition C: Composition of the Coating Material Layer (Black)

| | | |
|---|---|---|
| 69 parts | CN 9260 ® | Trifunctional urethane acrylate (oligomer) from Sartomer, $M_n$ 2000 g/mol |
| 12 parts | SR9020 ® | Trifunctional acrylate (reactive diluent) from Sartomer Propoxylated glyceryl triacrylate, $M_n$ 428 g/mol |
| 12 parts | SR 272 ® | Difunctional acrylate (reactive diluent), from Sartomer Triethylene glycol diacrylate, $M_n$ 258 g/mol |
| 7 parts | Printex 25 ® | Carbon black |

Composition D: Composition of the Coating Material Layer (White)

| | | |
|---|---|---|
| 55 parts | CN 9260 ® | Trifunctional urethane acrylate (oligomer) from Sartomer, $M_n$ 2000 g/mol |
| 10 parts | SR9020 ® | Trifunctional acrylate (reactive diluent) from Sartomer Propoxylated glyceryl triacrylate, $M_n$ 428 g/mol |
| 10 parts | SR 272 ® | Difunctional acrylate (reactive diluent), from Sartomer Triethylene glycol diacrylate, $M_n$ 258 g/mol |
| 25 parts | Kronos 2160 ® | Titanium dioxide |

Example 1

The free surface of the coating material layer was coated with a reactive adhesive, described below, at an application weight of 50 g/$m^2$.

This layer of adhesive was covered with a liner. The PET film was subsequently removed.

The now exposed surface of the coating material layer was coated with the same reactive adhesive, again with an application weight of 50 g/$m^2$.

Table 2 lists the base substances and materials used for producing the light-curing, pressure sensitive adhesive, reactive adhesive film, in each case with trade name, manufacturer or acquisition source reference, and the technical data relevant to this disclosure.

TABLE 2

Base substances and materials used for producing the light-curing, pressure sensitive adhesive, reactive adhesive film

| Trade name | Description/detail/abbreviation/CAS No. | Manufacturer/ supplier |
|---|---|---|
| Monomers | | |
| 2-Hydroxy-3-phenoxy-propyl acrylate | CAS No.: 16969-10-1 | Sigma-Aldrich |
| GENOMER ® 1122TF | 2-[[(Butylamino)carbonyl]oxy]ethyl acrylate, CAS No.: 63225-53-6 | Rahn Chemie |
| Visiomer ® HEMATMDI | Diurethane dimethacrylate, isomer mixture, CAS No.: 72869-86-4 | Evonik |
| 4-Acryloylmorpholine | CAS No.: 5117-12-4 | Sigma-Aldrich |
| N-Vinylcaprolactam | CAS No.: 2235-00-9 | Sigma-Aldrich |
| Di(trimethylolpropane) tetraacrylate | CAS No.: 94108-97-1 | Sigma-Aldrich |
| SR ® 531 | (5-Ethyl-1,3-dioxan-5-yl)methyl acrylate, CAS No.: 66492-51-1 | Sartomer-Arkema |
| 2-Ethylhexyl acrylate | CAS No.: 103-11-7 | Brenntag |
| Initiator | | |
| Peroxan ® IHP-50 | 50 weight percent solution of diisopropyl hydroperoxide (CAS No.: 26762-93-6) in diisopropylbenzene | Pergan GmbH |
| Photoredox catalyst | | |
| Tris(2,2'-bipyridyl) ruthenium(II) chloride hexahydrate | $Ru(bpy)_3Cl_2$•$6H_2O$; CAS No.: 50525-27-4 | Chemos GmbH |
| Tris[2-(2,4-difluoro-phenyl)pyridine]-iridium(III) | $Ir(Fppy)_3$; CAS No.: 387859-70-3 | Strem Chemicals |
| Tris(2-phenylpyridinato) iridium(III) | $Ir(ppy)_3$; CAS No.: 94928-86-6 | Chemos GmbH |
| Polymer | | |
| N-Vinylcaprolactam | CAS No.: 2235-00-9 | Sigma-Aldrich |
| n-Butyl acrylate | CAS No.: 141-32-2 | Rohm and Haas |
| Vazo ® 67 | 2,2'-Azobis(2-methylbutyronitrile); CAS No.: 13472-08-7, initiator for preparation of the polymer | Chemours |
| Sokalan ® K30P | Poly(N-vinylpyrrolidone) in powder form, linear homopolymer, Mw: 50 000 g/mol; CAS No.: 9003-39-8 | BASF |
| Film-forming polymer | | |
| IROSTIC ® S-6558-06 | Linear polyurethane, very low crystallization rate | Huntsman Holland B.V. |
| Desmomelt ® 530 | Largely linear, highly crystalline polyurethane elastomer | Covestro |
| n-Butyl acrylate | CAS No.: 141-32-2 | Rohm and Haas |
| Ethyl acrylate | CAS No.: 140-88-5 | Sigma-Aldrich |
| Acrylic acid | CAS No.: 79-10-7 | BASF |
| Carrier film | | |
| Kemafoil ® HPH 100 12μ | Polyester film etched with trichloroacetic acid, thickness: 12 μm | Coveme S.P.A |
| Further constituents | | |
| Aerosil ® R202 | Hydrophobized fumed silica; CAS No.: 7631-86-9 | Evonik AG, |
| Dynasylan ® MEMO | Trimethoxysilylpropyl methacrylate, CAS No.: 2530-85-0 | Evonik AG |

Also used were commercial siliconized release liners (release films). Solvents used in the inventive and comparative examples were acetone (CAS No.: 67-64-1), methyl ethyl ketone (CAS No.: 78-93-3), isopropanol (CAS No.: 67-63-0), and fully demineralized water.

Producing a Solution of the Film-Forming Polymer

For practical reasons a solution of the film-forming polymer was first produced.

Polyurethane (PU) Solution:

A 20% solution of the film-forming polymer was produced by first weighing out 120 g of Desmomelt® 530 with 240 g of acetone and 240 g of methyl ethyl ketone into a screw-top glass vessel and closing the vessel. The vessel was rolled for several days on a commercial roller bed, to bring the polyurethane completely into solution. Depending on the rolling speed, the procedure took about one to seven days. Alternatively the solution may also be produced by stirring the polyurethane pellets in the mixture of acetone and methyl ethyl ketone using a commercial laboratory stirrer.

Production of a Film-Forming Acrylate Copolymer Solution (Designation of the copolymer: AC-1; designation of the copolymer solution: AC-1 solution)

A 10 L glass reactor conventional for radical polymerizations was charged with 3.48 kg of n-butyl acrylate, 0.4 kg of ethyl acrylate, 0.12 kg of acrylic acid, 3.84 kg of acetone and 0.16 kg of isopropanol. Nitrogen gas was passed through the reactor, which was heated up with stirring (70 rpm) to a jacket temperature of 65° C. When the internal temperature reached 58° C., 2.0 g of Vazo® 67 were added. After an hour of further stirring at 65° C. jacket temperature, a further 2.0 g of Vazo® 67 were added. After 6 hours of further stirring at 65° C. jacket temperature, the speed of the stirrer was lowered to 35 rpm. The reaction time was 20 hours. After this time, the solution was cooled to room temperature and diluted with acetone to a solids content of 40.0 weight percent. The molar mass of the copolymer obtained was determined by means of thermal field flow fractionation. Result: Mn=155 000 g/mol. Mw=183 000 g/mol.

Production of a Polymer from Monomers Comprising N-Vinyl Compounds

In the case of poly(N-vinylpyrrolidone), the examples used the commercial pulverulent product Sokalan® K30P.

The rest of the polymers were produced by radical polymerization from the commercially available monomers. To produce the reactive adhesive film of the disclosure, in these cases the polymer solution produced in each case was used without removal of the solvent beforehand.

Poly(N-Vinylcaprolactam) Solution:

A 10 L glass reactor conventional for radical polymerizations was charged with 4.0 kg of N-vinylcaprolactam, 3.84 kg of acetone and 0.16 kg of isopropanol. Nitrogen gas was passed through the reactor, which was heated up with stirring (70 rpm) to a jacket temperature of 65° C. When the internal temperature reached 58° C., 2.0 g of Vazo® 67 were added. After an hour of further stirring at 65° C. jacket temperature, a further 2.0 g of Vazo® 67 were added. After 6 hours of further stirring at 65° C. jacket temperature, the speed of the stirrer was lowered to 35 rpm. The reaction time was 20 hours. After this time, the solution was cooled to room temperature and diluted with acetone to a solids content of 40.0 weight percent. The molar mass of the poly(N-vinylcaprolactam) obtained was determined by means of thermal field flow fractionation. Result: Mn=74 000 g/mol. Mw=116 500 g/mol.

Poly(N-Vinylcaprolactam/Butyl Acrylate) (50/50) Solution:

A 10 L glass reactor conventional for radical polymerizations was charged with 2.0 kg of N-vinylcaprolactam, 2.0 kg of butyl acrylate, 3.84 kg of acetone and 0.16 kg of isopropanol. Nitrogen gas was passed through the reactor, which was heated up with stirring (70 rpm) to a jacket temperature of 65° C. When the internal temperature reached 58° C., 2.0 g of Vazo® 67 were added. After an hour of further stirring at 65° C. jacket temperature, a further 2.0 g of Vazo® 67 were added. After 6 hours of further stirring at 65° C. jacket temperature, the speed of the stirrer was lowered to 35 rpm. The reaction time was 20 hours. After this time, the solution was cooled to room temperature and diluted with acetone to a solids content of 40.0 weight percent. The molar mass of the N-vinylcaprolactam/butyl acrylate copolymer obtained was determined by means of thermal field flow fractionation. Result: Mn=83 000 g/mol. Mw=124 000 g/mol.

Poly(N-Vinylcaprolactam/Butyl Acrylate) (80/20) Solution:

A 10 L glass reactor conventional for radical polymerizations was charged with 3.2 kg of N-vinylcaprolactam, 0.8 kg of butyl acrylate, 3.84 kg of acetone and 0.16 kg of isopropanol. Nitrogen gas was passed through the reactor, which was heated up with stirring (70 rpm) to a jacket temperature of 65° C. When the internal temperature reached 58° C., 2.0 g of Vazo® 67 were added. After an hour of further stirring at 65° C. jacket temperature, a further 2.0 g of Vazo® 67 were added. After 6 hours of further stirring at 65° C. jacket temperature, the speed of the stirrer was lowered to 35 rpm. The reaction time was 20 hours. After this time, the solution was cooled to room temperature and diluted with acetone to a solids content of 40.0 weight percent. The molar mass of the N-vinylcaprolactam/butyl acrylate copolymer obtained was determined by means of thermal field flow fractionation. Result: Mn=78 000 g/mol. Mw=120 500 g/mol.

Production of an Aqueous Photoredox Catalyst Solution

First of all a 5 weight percent aqueous solution of this photoredox catalyst was produced.

Aqueous tris(2,2'-bipyridyl)ruthenium(II) Chloride Hexahydrate Solution

Under yellow light, 5 g of tris(2,2'-bipyridyl)ruthenium (II) chloride hexahydrate and 95 g of fully demineralized water were weighed out into a brown, screw-top glass vessel. The vessel was closed. The vessel was rolled for 8 hours on a roller bed, to bring the tris(2,2'-bipyridyl)ruthenium(II) chloride hexahydrate completely into solution.

The reactive adhesive film was produced by weighing out 70.66 g of a 20 wt % solution of Desmomelt® 530 in acetone/methyl ethyl ketone (PU solution), 13.25 g of the 40 wt % poly(N-vinylcaprolactam) solution, 13.66 g of 2-hydroxy-3-phenoxypropyl acrylate and 1.34 g of Aerosil® R202 into a brown, screw-top glass vessel and mixing these ingredients using a commercial laboratory stirrer for 15 minutes at medium speed (500-1000 rpm). Then 0.88 g of Peroxan® IHP-50 (containing 50 wt % diisopropyl hydroperoxide) was added. It was incorporated by mixing at medium speed for 5 minutes.

All further operations took place under yellow light. The blanket yellow-light lighting selected was the fluorescent lamp LT35WT5EQ Yellow Special from NARVA Lichtquellen GmbH (NARVA Lichtquellen GmbH+Co. KG, Brand-Erbisdorf, Germany, www.narva-bel.de) which blocks wavelengths less than 500 nm. In order to mask residual light still present from other light sources, the yellow film Metolight SFLY-5 (ASMETEC GmbH, Kirchheimbolanden, Germany, www.asmetec.de) was chosen, and filters out wavelengths less than 470 nm.

0.21 g of the 5 wt %, aqueous tris(2,2'-bipyridyl)ruthenium(II) chloride hexahydrate solution was added and was incorporated by mixing with the laboratory stirrer at medium speed for 5 minutes. The mixture was thereafter mixed further on a commercial roller bed for 24 hours.

The homogeneous mixture obtained was coated out three times in succession on a siliconized polyester film (release liner) by means of a commercial laboratory coating bench (for example, from SMO, Sondermaschinen Oschersleben GmbH, Oschersleben, Germany) with a coating knife, to give three films. The solvent was subsequently evaporated off in a forced-air drying cabinet at 60° C. for 15 minutes. The slot width during coating was varied. It was twice set such that the film obtained after evaporation of the solvent was 50 µm thick. In the third coating experiment, the slot width was set such that the film obtained after evaporation of the solvent was 100 µm thick. The light-curing, reactive, pressure sensitive adhesive film 100 µm thick that was obtained was lined with a second siliconized polyester film (release liner). Then circular diecuts (coupons) having a diameter of 21 mm were punched out from this product and kept in a light-proof plastic canister prior to testing. Testing took place two weeks after production of the diecuts and also after six months' storage of the diecuts at 23° C. and 50% relative humidity.

The percentage composition of the initial weighings for producing the solution/mixture of the light-curing, reactive, pressure sensitive adhesive film, and also the percentage composition of the light-curing, reactive pressure sensitive adhesive film itself, are set out in the following two tables:

Percentage Composition of the Solution/Mixture for Producing the Reactive Adhesive Film

| Base substances and base substance preparations including solvent | Weight percent initial weighing |
|---|---|
| 20 weight percent Desmomelt ® 530 solution | 70.66 |
| 40 weight percent poly(N-vinylcaprolactam) solution | 13.25 |
| 2-Hydroxy-3-phenoxypropyl acrylate | 13.66 |
| Aerosil ® R202 | 1.34 |
| Peroxan ® IHP-50 | 0.88 |
| 5 wt % tris(2,2'-bipyridyl)ruthenium(II) chloride hexahydrate solution | 0.21 |
| Total | 100.00 |

Percentage Composition of the Reactive Adhesive Film

| Base substances without solvent | Weight percent solids |
|---|---|
| Desmomelt ® 530 | 40.50 |
| Poly(N-vinylcaprolactam) | 15.19 |
| 2-Hydroxy-3-phenoxypropyl acrylate | 39.16 |
| Aerosil ® R202 | 3.85 |
| Diisopropyl hydroperoxide | 1.27 |
| Tris(2,2'-bipyridyl)ruthenium(II) chloride hexahydrate | 0.03 |
| Total | 100.00 |

Example 2

The free surface of the coating material layer was coated with a reactive adhesive described below, with an applied weight of 50 g/m$^2$.

This layer of adhesive was lined with a liner. Thereafter the PET film was removed.

The surface of the coating material layer now exposed was coated with the same reactive adhesive, again with an applied weight of 50 g/m$^2$.

The composition is as follows:

| | |
|---|---|
| 92 wt % | Desmomelt ® 530 (Covestro AG) |
| 5 wt % | dicumyl peroxide (CAS 80-43-3) |
| 3 wt % | 3-methacryloyloxypropyltriethoxysilane (CAS 21142-29-0) |

Desmomelt® 530 is a largely linear, thermoplastic, highly crystalline polyurethane elastomer. Reference is made to the following product datasheet: Desmomelt® 530 product datasheet, issued 2016 Jan. 19, Covestro AG, Leverkusen.

The respective components were dissolved homogeneously in accordance with the respective composition in methyl ethyl ketone (CAS 78-93-3), so that the total amount of the aforesaid compositions in the solvent was 25 wt %. The solution was then coated in each case by known methods onto a release paper known to the skilled person to be suitable for silane-containing compositions, with subsequent drying in a suitable forced-air drying cabinet at 70° C. for 30 min, to give a 100 μm adhesive film (dry film thickness) in each case.

Example 3

The free surface of the coating material layer was coated with a reactive adhesive described below, with an applied weight of 50 g/m$^2$.

This layer of adhesive was lined with a liner. Thereafter the PET film was removed.

The surface of the coating material layer now exposed was coated with the same reactive adhesive, again with an applied weight of 50 g/m$^2$.

The composition is as follows:

| | |
|---|---|
| 83.0 wt % | Desmomelt 530 |
| 10.0 wt % | Dancure 999 |
| 5.0 wt % | Epiclon N-673 |
| 2.0 wt % | CoatOsil 1770 |

Desmomelt 530 is dissolved in a suitable way known to the skilled person in 2-butanone. On the laboratory scale, the solution has ben found to have good processability at a solids content (Desmomelt 530 content) of 20 weight percent to 25 weight percent.

This precursor and 2-butanone are introduced in the required amount into a commercial wide-neck screw-top glass vessel.

The required amount of solvent for the required viscosity of the corresponding overall formulation is dependent on the coating process chosen by the skilled person. Using a commercial film-drawing apparatus, overall solids contents in the respective formulations of 20 weight percent to 30 weight percent have proven advantageous on the laboratory scale. The viscosities required correspondingly for a chosen coating process are well known to the skilled person.

Using a dispersing disk (diameter 4 cm), the corresponding precursor is homogenized with the added solvent, the particulate isocyanate is added, and then the whole is dispersed for 10 minutes at 2000 1/min. Then all of the further components are added, homogeneous dispersion continues at 2000 1/min for 10 minutes, and the wide-neck screw-top glass vessel is subsequently closed and rolled to homogeneity on a commercial roller mixer for 24 h.

After 24 h on the roller mixer, the corresponding formulation is coated to a dry film thickness of 100 μm on a suitable release paper known to the skilled person and is dried in a commercial forced-air drying cabinet at 40° C. for 20 minutes. Other film thicknesses are reported correspondingly with the results.

A portion of the corresponding formulation is correspondingly stored further on the roller mixer and coated again after a further 24 h and 48 h. If the formulations after three days can no longer be homogeneously coated, then the pot life of the corresponding formulation is shown separately with the results.

Example 4

The free surface of the coating material layer was coated with a reactive adhesive described below, with an applied weight of 50 g/m$^2$.

This layer of adhesive was lined with a liner. Thereafter the PET film was removed.

The surface of the coating material layer now exposed was coated with the same reactive adhesive, again with an applied weight of 50 $g/m^2$.

The latent-reactive adhesive film was produced from 100 parts of Dispercoll U53 (from Bayer AG), 10 parts of Dispercoll BL XP 2514 (from Bayer AG) and 1.5 parts of Borchigel 0625 (from OMG Borchers). The formulation constituents were mixed as an aqueous dispersion in a drum with an anchor stirrer at 60 1/min over a period of 15 min at room temperature. The solids content was adjusted to 46 wt % by addition of demineralized water.

Using a web coating unit, a doctor knife was used to produce a coating on various temporary carriers. Water was subsequently removed in a drying tunnel at 40° C. for 15 min.

Example 5

The free surface of the coating material layer was coated with a reactive adhesive described below, with an applied weight of 50 $g/m^2$.

50 wt % of Nipol 1001CG (nitrile rubber) from Zeon, 40 wt % of phenolic novolac resin Durez 33040 blended with 8% HMTA (Rohm and Haas) and 10 wt % of the phenolic resol resin 9610 LW from Bakelite were used to produce a 30% solution in methyl ethyl ketone in a compounder. The kneading time was 20 h. The pigment preparation was subsequently incorporated by stirring with a paddle stirrer, giving the adhesive a carbon black fraction of 2.4 wt %. The heat-activatable adhesive was then coated out from solution onto a glassine release paper and dried at 100° C. for 10 minutes.

Example 6

The free surface of the coating material layer was coated with a reactive adhesive described below, with an applied weight of 50 $g/m^2$.

100 parts of Nipol 1001CG (nitrile rubber from Zeon with 41% acrylonitrile) and 100 parts of Durez 12687 (novolac resin from Sumitomo-Bakelite, already containing 7.4% of hexamethylenetetramine) were produced as a 30% suspension in butanone in a compounder. The kneading time was 20 h. The heat-activatable composition was subsequently coated out from solution onto a siliconized PET film ("liner") and dried at 100° C.

Investigation of the Examples

The resultant double-sided adhesive tape from all of the examples is bonded—with the liner being removed—between two glass bodies, so that these bodies are joined to one another. The glass bodies each have a thickness of 2 mm. The one or two adhesives are activated using heat or light, and so cure.

A test matrix composed of laser power, frequency, and deflection rate is used to establish the optimal ablation of the separation layer between the two layers of adhesive.

The following parameters are set on the laser:

| Parameter | |
|---|---|
| Laser power | 45.0% |
| Scan speed | 1000 mm/sec. |
| Laser pulse cycle | 50 µs |

-continued

| Parameter | |
|---|---|
| Line width | 0.15 mm |
| Marking pitch | 0.15 mm |

Figure 2:
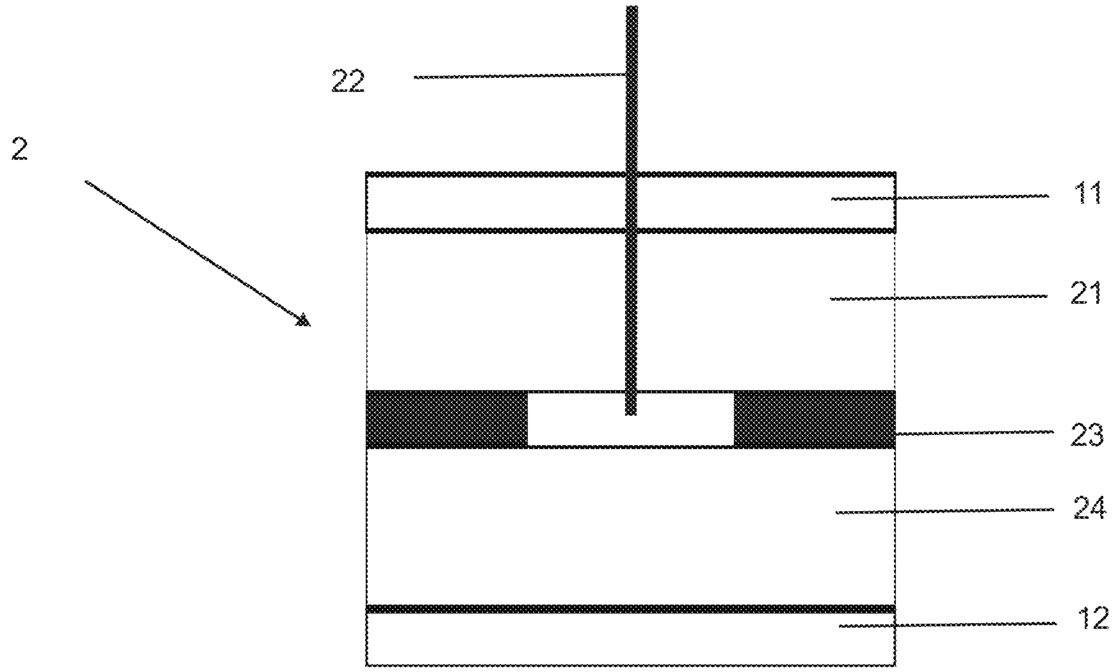
FIG. 2 is a sideview of a double-sided adhesive tape in an embodiment of the present disclosure.

FIG. 2 shows the construction of the double-sided adhesive tape 2 and also the use thereof. The laminate 2 is located between two substrates 11 and 12, which in this case both consist of glass layers.

The adhesive tape 2 has a 15 µm separation layer 23. Respective layers 21 and 24 of adhesive are applied to the top and bottom faces of the separation layer 23.

The laser beam 22 ablates the separation layer 23.

What is claimed is:

1. A laminate configured to be separated after long-term bonding, the laminate comprising:
- a) a first adhesive layer;
- b) a separation layer; and
- c) a second adhesive layer, wherein the separation layer comprises
- a laser-sensitive pigment which at the same time is coloring,
- a cured coating material which is at least partly removable by laser irradiation, the first adhesive layer and/or the second adhesive layer is laser beam-translucent, the first adhesive layer or the second adhesive layer comprises, or the first adhesive layer and the second adhesive layer comprise, a reactive or latent-reactive adhesive, and the cured coating material of the separation layer comprises a cured acrylate coating material composition comprising:
- 30 to 80 wt % of a trifunctional oligomer A comprising three unsaturated (meth)acrylate units per molecule, with a number-average molecular weight Mn (determined by gel permeation chromatography (GPC) of between 1000 and 5000 g/mol,
- 0 to 20 wt % of a trifunctional monomer B contains three unsaturated (meth)acrylate units per molecule and in one preferred embodiment of the disclosure has a molecular weight Mn of between 300 to 1000 g/mol,
- 1 to 30 wt % of a difunctional monomer C comprising a monomer having two unsaturated acrylate units per molecule and a molecular weight Mn of between 100 to 1000 g/mol, and
- 2 to 40 wt % of a coloring pigment.

2. The laminate according to claim 1, wherein the laser-sensitive pigment is admixed in an amount of 1 wt % up to not more than 40 wt %, based on a total weight of the coating material layer.

3. The laminate according to claim 1, wherein the laser-sensitive pigment comprises carbon black or titanium dioxide.

4. The laminate according to claim 3, wherein when carbon black is present as the laser-sensitive pigment, the carbon black is used at 2 to 7 wt %.

5. The laminate according to claim 3, wherein when titanium dioxide is present as the laser-sensitive pigment, the titanium dioxide is used at 15 to 40 wt %.

6. The laminate according to claim 1, wherein the separation layer is applied in a thickness of 0.5 to 100 µm.

7. The laminate according to claim 1, wherein the separation layer consists of a single coating material layer.

8. The laminate according to claim 1, wherein at least one adhesive layer of the first and second adhesive layers contains at least 40 wt % of one or more poly(meth) acrylates.

9. The laminate according to claim 1, wherein one adhesive layer of the first and second adhesive layers is a pressure sensitive adhesive comprising at least the following two components:

at 60 wt % to 90 wt %, in the adhesive, a first polymer component based on polyacrylate or a polyacrylate component; and at 10 wt % to 40 wt %, in the adhesive, a second polymer component, substantially immiscible with the polyacrylate component, based on elastomer, more particularly on a synthetic rubber or an elastomer component.

10. The laminate according to claim 1, wherein the first adhesive layer comprises a reactive or latent-reactive adhesive and the second adhesive layer comprises a reactive or latent-reactive adhesive or a pressure sensitive adhesive.

11. The laminate according to claim 10, wherein the first adhesive layer consists of the reactive or latent-reactive adhesive and the second adhesive layer consists of the reactive or latent-reactive adhesive or the pressure sensitive adhesive.

12. The laminate according to claim 11, wherein the first adhesive layer consists of the reactive or latent-reactive adhesive and the second adhesive layer consists of the pressure sensitive adhesive.

13. A method for parting a long-term structural bond produced by means of the laminate according to claim 1, wherein at least part of the area of the separation layer is removed by means of laser irradiation and the film laminate is separated into a first part-laminate and a second part-laminate.

14. The method according to claim 13, wherein forces are applied to at least one of the part-laminates that increase the spacing of the two part-laminates from one another.

15. The method according to claim 13, wherein an infrared laser is used for the laser irradiation.

16. The method according to claim 13, wherein the whole area of the separation layer is removed.

17. A method comprising:

long-term structurally bonding at least two components together with the laminate according to claim 1.

18. The method according to claim 17, wherein the at least two components are at least two automotive industry components or at least two electronics industry components.

* * * * *